United States Patent
Zhang et al.

(10) Patent No.: US 12,377,550 B2
(45) Date of Patent: Aug. 5, 2025

(54) VISUAL POSITIONING SYSTEM, BATTERY SWAPPING DEVICE, AND BATTERY SWAPPING CONTROL METHOD

(71) Applicants: AULTON NEW ENERGY AUTOMOTIVE TECHNOLOGY GROUP, Guangdong (CN); SHANGHAI DIANBA NEW ENERGY TECHNOLOGY CO., LTD., Shanghai (CN)

(72) Inventors: Jianping Zhang, Shanghai (CN); Zhimin Chen, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 260 days.

(21) Appl. No.: 17/925,305

(22) PCT Filed: May 17, 2021

(86) PCT No.: PCT/CN2021/094226
§ 371 (c)(1),
(2) Date: Mar. 17, 2023

(87) PCT Pub. No.: WO2021/228266
PCT Pub. Date: Nov. 18, 2021

(65) Prior Publication Data
US 2023/0234234 A1 Jul. 27, 2023

(30) Foreign Application Priority Data

May 15, 2020 (CN) .......................... 202010414832.3
May 15, 2020 (CN) .......................... 202010414847.X
May 15, 2020 (CN) .......................... 202010415431.X

(51) Int. Cl.
*G06T 7/73* (2017.01)
*B25J 9/16* (2006.01)
(Continued)

(52) U.S. Cl.
CPC ............. *B25J 9/1697* (2013.01); *B60L 53/80* (2019.02); *B60S 5/06* (2013.01); *G06T 7/74* (2017.01); *G06T 2207/30108* (2013.01)

(58) Field of Classification Search
CPC ........... B25J 9/1697; B60L 53/80; B60S 5/06; G06T 7/74; G06T 2207/30108; G01B 11/002; Y02T 10/70; Y02T 10/7072
See application file for complete search history.

(56) References Cited

U.S. PATENT DOCUMENTS 9,041,776 B2  5/2015 Chou et al.
2011/0262004 A1 10/2011 Murakami
(Continued)

FOREIGN PATENT DOCUMENTS

CN  102490694 A  6/2012
CN  102700513 A  10/2012
(Continued)

OTHER PUBLICATIONS

Aug. 19, 2021 International Search Report issued in International Patent Application No. PCT/CN2021/094226.
(Continued)

*Primary Examiner* — Santosh R Poudel

(57) ABSTRACT

A visual positioning system, comprising a first visual sensor (501), a second visual sensor (502), and a position obtaining unit (503), wherein the first visual sensor (501) is used for obtaining a first image (G11) of a first position (A) of a target apparatus (7), a second visual sensor (502) is used for
(Continued)

obtaining a second image of a second position (B) of the target apparatus (7), and the position obtaining unit (503) is used for obtaining position information of the target apparatus (7) according to the first image (G11) and the second image. Further disclosed are a battery swapping device and a battery swapping control method. Relatively high positioning accuracy is obtained in a visual manner, and accurate positioning between the battery swapping device and a vehicle for battery swap is implemented.

27 Claims, 25 Drawing Sheets

(51) Int. Cl.
  *B60L 53/80* (2019.01)
  *B60S 5/06* (2019.01)

(56) References Cited

U.S. PATENT DOCUMENTS

| | | |
|---|---|---|
| 2012/0251281 A1 | 10/2012 | Mulato |
| 2013/0321580 A1 | 12/2013 | Chou et al. |
| 2016/0368464 A1 | 12/2016 | Hassounah |
| 2017/0106397 A1* | 4/2017 | Akaishi ............. A46B 13/02 |
| 2019/0327393 A1 | 10/2019 | Yang et al. |
| 2020/0317081 A1* | 10/2020 | Chen ............. B60L 53/80 |

FOREIGN PATENT DOCUMENTS

| | | | | |
|---|---|---|---|---|
| CN | 102712243 | A | | 10/2012 |
| CN | 102806898 | A | | 12/2012 |
| CN | 104417382 | A | | 3/2015 |
| CN | 104613939 | A | | 5/2015 |
| CN | 104700385 | A | | 6/2015 |
| CN | 107886545 | A | | 4/2018 |
| CN | 108012143 | A | | 5/2018 |
| CN | 109501747 | A | * 3/2019 ............ B60K 1/04 |
| CN | 109987550 | A | | 7/2019 |
| CN | 110774934 | A | | 2/2020 |
| CN | 210237447 | U | | 4/2020 |
| EP | 3564080 | A1 | | 11/2019 |
| EP | 3705356 | B1 | * 11/2023 ............ B60K 1/04 |
| WO | WO-2019000955 | A1 | * 1/2019 ............ B60L 53/80 |
| WO | WO-2020020372 | A1 | * 1/2020 ............ B60S 5/06 |
| WO | WO-2020057862 | A1 | * 3/2020 ........ B62D 15/0285 |
| WO | WO-2020064003 | A1 | * 4/2020 ............ B60L 53/80 |

OTHER PUBLICATIONS

Aug. 19, 2021 Written Opinion of the International Searching Authority issued in International Patent Application No. PCT/CN2021/094226.

Sep. 11, 2022 International Preliminary Report on Patentability issued in International Patent Application No. PCT/CN2021/094226.

Extended European Search Report Issued on Aug. 12, 2024 for Corresponding European Patent Application No. 21802934.6.

First Office Action Issued on Mar. 26, 2024 for Corresponding Japanese Patent Application No. 2022-569144.

* cited by examiner

VISUAL POSITIONING SYSTEM, BATTERY SWAPPING DEVICE, AND BATTERY SWAPPING CONTROL METHOD

The present application claims the priority of Chinese patent applications 202010414847X, 2020104148323 and 202010415431X filed on May 15, 2020. The present application cites the above-mentioned Chinese patent applications in its entirety.

TECHNICAL FIELD

The present invention relates to the technical field of visual positioning, and more particularly to a visual positioning system, a battery swapping device and a battery swapping control method.

BACKGROUND

Electric vehicles have been widely used with the rapid development thereof. The user can drive the electric vehicle into a battery swapping station to swap the battery pack when it is short of electric power. In order to ensure the safety of the operation process, the battery pack is securely locked on a battery bracket of the electric vehicle. Therefore, in the battery swapping process, the battery pack short of electric power is first removed to install the battery pack having full electric power. The key to disassemble the battery pack is to realize accurate positioning between the battery swapping device and the battery bracket, so that the battery pack can be unlocked and taken out. However, in the existing battery swapping process, it is often difficult to quickly and accurately achieve accurate positioning of the battery swapping device and the battery bracket, resulting in inefficient battery swap.

SUMMARY

The technical problem to be solved by the present invention is in order to overcome the defect of the prior art that the fixing degree of a locking mechanism for locking the position of a battery pack is poor.

The present invention provides a visual positioning system comprising a first visual sensor, a second visual sensor and a position obtaining unit;
- a first visual sensor for obtaining a first image of a first position of a target apparatus;
- a second visual sensor for obtaining a second image of a second position of the target apparatus; and
- a position obtaining unit for obtaining a position information of the target apparatus according to the first image and the second image.

The visual positioning system obtains the image of the target apparatus based on the visual sensor, obtains the position information of the target apparatus based on the image processing algorithm, and obtains the higher positioning accuracy through the vision mode.

Preferably, the position obtaining unit obtains a position adjustment amount based on the position information of the target apparatus and a reference position information of the target apparatus.

In this solution, a position adjustment amount is obtained according to the position information of the target apparatus and reference position information of the target apparatus, wherein the position adjustment amount can be used as a reference for adjusting a position, and after moving the position according to the position adjustment amount, accurate positioning with the target apparatus can be achieved.

Preferably, the position adjustment amount comprises a horizontal displacement amount;
- the position obtaining unit obtains a horizontal displacement amount according to the first image and the first reference image, or the position obtaining unit obtains a horizontal displacement amount according to the second image and the second reference image; and the first reference image is a reference image comprising a first position and the second reference image is a reference image comprising a second position.

In this solution, by obtaining the horizontal displacement amount, a corresponding horizontal displacement can be achieved to achieve positional alignment with the target apparatus in the horizontal direction. In this solution, the visual positioning system can obtain the horizontal displacement amount by comparing with the reference image, and can not only realize the positioning control in the horizontal direction, but also further improve the positioning control accuracy in the horizontal direction.

Preferably, the position adjustment amount comprises a first vertical displacement amount and a second vertical displacement amount;
The position obtaining unit obtains a first vertical displacement amount according to the first image and the first reference image, and the position obtaining unit obtains a second vertical displacement amount according to the second image and the second reference image; and the first reference image is a reference image comprising a first position and the second reference image is a reference image comprising a second position.

In this solution, by obtaining the vertical displacement amount, a corresponding vertical displacement can be achieved to achieve a positioning alignment with the target apparatus in the vertical direction. Obtaining two vertical displacement amounts can facilitate using two sets of vertical displacement units to respectively implement vertical displacement operations. In this solution, the visual positioning system can obtain the vertical displacement amount through comparing with the reference image, and can not only realize the positioning control in the vertical direction, but also further improve the positioning control accuracy in the vertical direction.

Preferably, the position adjustment amount comprises a rotation angle amount;
- a position obtaining unit obtains a rotation angle amount according to a first depth of field value and a second depth of field value; a first depth of field value, a depth of field value at a first position in a first image, and a second depth of field value, a depth of field value at a second position in a second image.

In this solution, the visual positioning system can obtain the rotation angle amount through at least two collected depth of field values to achieve the parallelism with the target apparatus, and at the same time ensure the control accuracy of the rotation angle.

Preferably, the first position and the second position have a preset space therebetween, the first visual sensor is provided at a position corresponding to the first position, and the second visual sensor is provided at a position corresponding to the second position.

In this solution, images at different positions of the target apparatus can be obtained by a plurality of image acquisition modules having a preset space from each other to improve the positioning control accuracy.

Preferably, the position adjustment amount comprises a horizontal displacement amount;

the position obtaining unit obtains a horizontal displacement amount according to the first image and the first reference image, or the position obtaining unit obtains a horizontal displacement amount according to the second image and the second reference image; and the first reference image is a reference image comprising a first position and the second reference image is a reference image comprising a second position;

the position adjustment amount comprises a first vertical displacement amount and a second vertical displacement amount;

the position obtaining unit obtains a first vertical displacement amount according to the first image and the first reference image, and the position obtaining unit obtains a second vertical displacement amount according to the second image and the second reference image; and the first reference image is a reference image comprising a first position and the second reference image is a reference image comprising a second position;

the position adjustment amount comprises a rotation angle amount; and a position obtaining unit obtains a rotation angle amount according to a first depth of field value and a second depth of field value; a first depth of field value, a depth of field value at a first position in a first image, and a second depth of field value, a depth of field value at a second position in a second image.

In this solution, the positioning control system can realize positioning control in multiple directions through at least one of a horizontal displacement amount, a vertical displacement amount and a rotation angle amount, and perform position adjustment from multiple dimensions to ensure positioning accuracy requirements.

Preferably, the visual positioning system further comprises at least two distance sensors;

at least two distance sensors are respectively used for acquiring a distance between a battery swapping device and the target apparatus and at least obtaining a first distance and a second distance;

the position adjustment amount comprises a rotation angle amount, and the position obtaining unit is further used for obtaining the rotation angle amount according to at least the first distance and the second distance;

the target apparatus is a battery swapping vehicle; and the position obtaining unit is an image processing module.

In this solution, the positioning control system may obtain the rotation angle amount by obtaining at least two distances from the battery swapping vehicle so that the battery swapping device and the battery swapping vehicle remain parallel, while also ensuring the control accuracy of the rotational angle.

The present invention also provides a battery swapping device including the visual positioning system of the present invention for positioning to align the battery swapping device with a battery bracket on which the battery pack is locked.

In this solution, according to the first position and the second position of the image of the battery bracket respectively captured by the two visual sensors, the first position and the second position are further compared with the reference position corresponding to the battery bracket respectively, so that the position adjustment amount of the unlocking mechanism can be obtained, and the adjustment control module further adjusts the position of the unlocking mechanism according to the position adjustment amount, thereby further improving the accuracy of positioning the unlocking mechanism before unlocking.

Preferably, the battery swapping device is configured to move from a side of the electric vehicle and along the length direction of the body of the electric vehicle and to remove the battery from the side of the electric vehicle after the positioning is completed.

In this solution, the battery swapping operation is convenient and efficient when it is performed on the side surface of the battery swapping vehicle.

Preferably, the battery swapping device further comprises an unlocking mechanism for unlocking the battery pack locked on the battery bracket.

In this solution, it is not necessary to add other detection components in the electric vehicle or the battery outer box of the electric vehicle, and the position of the unlocking mechanism can be further accurately adjusted only by the visual positioning system, so that the unlocking mechanism is located at an accurate unlocking position, so that the unlocking mechanism can effectively unlock the battery pack of the electric vehicle, thereby ensuring the efficiency, success and safety of the battery swap.

Preferably, the battery swapping device further comprises a position adjustment mechanism;

the position adjustment mechanism is used for adjusting the position of the unlocking mechanism according to at least one of the horizontal displacement amount, the vertical displacement amount and the rotation angle amount obtained by the visual positioning system until the unlocking mechanism completes positioning with the unlocking member on the battery bracket.

In this solution, the positioning of the unlocking mechanism is accomplished by adjusting the position adjustment mechanism in the three directions of the horizontal direction, the vertical direction, and the angle according to at least one of the horizontal displacement amount, the vertical displacement amount, and the rotation angle amount by the position adjusting mechanism, so that the unlocking mechanism is precisely aligned with the unlocking member on the battery bracket.

Preferably, the position adjustment mechanism comprises a control unit, a horizontal movement unit, a vertical movement unit, and a rotation unit, wherein the control unit is communicatively connected to the visual positioning system to control the horizontal movement unit, the vertical movement unit, or the rotation unit to correspondingly move to the adjustment position according to at least one of the horizontal displacement amount, the vertical displacement amount, and the rotation angle amount.

In this solution, the battery swapping device can achieve position adjustment in a corresponding direction by at least one of a horizontal displacement amount, a vertical displacement amount and an angular rotation amount, and perform position adjustment from multiple dimensions to ensure positioning accuracy requirements.

Preferably, the vertical displacement amount comprises a first vertical displacement amount and a second vertical displacement amount;

The vertical movement unit comprises a first lifting mechanism and a second lifting mechanism;

The first lifting mechanism is used for lifting according to a first vertical displacement amount, and the second lifting mechanism is used for lifting according to a second vertical displacement amount.

In this solution, the first lifting mechanism and the second lifting mechanism are lifted to drive the lifting of both ends of the unlocking mechanism to adjust the position of the unlocking mechanism in the vertical direction, thereby further improving the stability of the unlocking mechanism when adjusting the position in the vertical direction.

Preferably, the vertical displacement amount comprises a first vertical displacement amount and a second vertical displacement amount;

The vertical movement unit comprises a first vertical driver, a second vertical driver, a first lifting mechanism, a second lifting mechanism and a battery swapping actuating mechanism, wherein the first vertical driver is connected to the first lifting mechanism, the second vertical driver is connected to the second lifting mechanism, and the first lifting mechanism and the second lifting mechanism are respectively connected to two ends of the battery swapping actuating mechanism to drive the two ends of the battery swapping actuating mechanism to lift and move;

the first vertical driver is used for driving the first lifting mechanism according to the first vertical displacement amount, and the second vertical driver is used for driving the second lifting mechanism according to the second vertical displacement amount.

In this solution, the first vertical driver and the second vertical driver can automatically drive the first lifting mechanism and the second lifting mechanism to lift according to the first vertical displacement amount and the second vertical displacement amount, respectively to drive the two ends of the battery swapping actuating mechanism to lift, thereby further driving the two ends of the unlocking mechanism connected thereto to lift to adjust the position of the unlocking mechanism in the vertical direction, and further improving the stability of the unlocking mechanism when adjusting the position in the vertical direction.

Preferably, the rotation unit comprises a turntable sleeved at the bottom of the battery swapping actuating mechanism, and a rotation driver connected to the turntable and used for driving the turntable to rotate the battery swapping actuating mechanism according to the rotation angle amount.

In this solution, the rotation driver can automatically drive the turntable to rotate according to the rotation angle amount to drive the battery swapping actuating mechanism to rotate, thereby further driving the unlocking mechanism connected thereto to rotate to adjust the position of the unlocking mechanism in the angle, and further improving the stability of the unlocking mechanism when adjusting the angle.

Preferably, the horizontal movement unit comprises a rail, a guide wheel, and a horizontal driver for driving the guide wheel to move along the rail according to the horizontal displacement amount.

In this solution, the movement of the unlocking mechanism in the horizontal direction can be automatically driven by the horizontal driver according to the horizontal displacement amount, and the efficiency and stability of the movement of the unlocking structure in the horizontal direction can be improved by the cooperation of the rail and the guide rail.

Preferably, the unlocking mechanism comprises: a drive mechanism and an unlocking rod, and the unlocking rod is used for driving the unlocking member on the battery bracket to rotate to unlock the battery pack;

the drive mechanism is used for driving the unlocking rod to rotate to rotate the unlocking member.

In this solution, the unlocking of the battery pack is achieved by driving the unlocking rod to rotate via the drive mechanism to automatically drive the locking member to rotate, and at the same time, the accuracy of unlocking is improved and the battery swapping efficiency is further improved; at the same time, even if the touch occurs, the unlocking of the locking member will not be caused, thus effectively avoiding the occurrence of mis-operation and greatly improving the safety and stability of the battery swapping device.

Preferably, the unlocking mechanism further comprises an elastic member, both ends of the elastic member are connected to the drive mechanism and the unlocking rod, respectively, and the elastic member is adapted to the radial displacement of the unlocking rod, and the drive mechanism drives the unlocking rod to rotate along the axis of the unlocking rod through the elastic member.

In this solution, the stability of the unlocking mechanism during unlocking is further improved by the fact that the unlocking rod can be in place inserted into the unlocking mating member by means of the elastic member being displaceable in the radial direction.

Preferably, the unlocking rod comprises an insertion end, the outer surface of the insertion end has at least one abutting surface, the battery bracket is provided with an unlocking sleeve, the unlocking sleeve is connected to the unlocking member, the insertion end is used to be inserted into the unlocking sleeve, and the abutting surface matches the inner wall surface of the unlocking sleeve to drive the unlocking sleeve to rotate to achieve unlocking.

In this solution, the unlocking mating member is driven to rotate by applying a force to the inner wall surface facing the unlocking mating member at an insertion end of the unlocking rod, thereby improving the rotational stability.

The present invention also provides a battery swapping control method comprising the steps of:
  obtaining a position information of a battery bracket;
  obtaining a position adjustment amount according to the position information and a corresponding reference position information; and
  adjusting the position of the unlocking mechanism according to the position adjustment amount to align the unlocking mechanism with the unlocking member on the battery bracket.

In this solution, the battery swapping control method can accurately obtain the position information of the battery bracket to accurately position the battery swapping device and the battery bracket, and improve the battery swapping efficiency.

Preferably, the step of obtaining a position information of the battery bracket comprises:
  obtaining a first image of a first position of a battery bracket;
  obtaining a second image of a second position of the battery bracket; and
  obtaining the position information of the battery bracket according to the first image and the second image.

In this solution, according to a first image of a first position of the battery bracket and a second image of a second position of the battery bracket, position information of the battery bracket is obtained based on an image processing algorithm, and a higher positioning accuracy is obtained by means of vision.

Preferably, the step of obtaining a position adjustment amount according to the position information and a corresponding reference position information comprises:
  obtaining a horizontal displacement amount according to a first image and a first reference image corresponding to a first position or a second image and a second reference image corresponding to a second position; or
  respectively obtaining a first vertical displacement amount and a second vertical displacement amount according to the first image and the first reference image and the second image and the second reference image; or obtaining a rotation angle amount based on the depth of field value of the first position in the first image and the depth of field value of the second position in the second image.

In this solution, positioning control in multiple directions can be realized through at least one of horizontal displacement amount, vertical displacement amount and angular rotation amount, and position adjustment from multiple dimensions can ensure positioning accuracy requirements.

Preferably, the step of adjusting the position of the unlocking mechanism according to the position adjustment amount to align the unlocking mechanism with the unlocking member on the battery bracket comprises:

adjusting the position of the unlocking mechanism according to the horizontal displacement amount or the vertical displacement amount or the rotation angle amount until the unlocking mechanism and the unlocking member on the battery bracket complete the positioning.

In this solution, the positioning of the unlocking mechanism is completed by adjusting the position of the unlocking mechanism in the horizontal direction, the vertical direction or the angular direction according to the horizontal displacement amount, the vertical displacement amount or the rotation angle amount, so that the unlocking mechanism is accurately aligned with the unlocking member on the battery bracket.

Preferably, before the step of obtaining the position information of the battery bracket, the method further comprises the following steps:

controlling the unlocking mechanism to move to a coarse positioning position according to a preset value.

In this solution, controlling the unlocking mechanism to move to a coarse positioning position according to a preset value can improve the efficiency of positioning and battery swap.

Preferably, after the step of adjusting the position of the unlocking mechanism according to the position adjustment amount to align the unlocking mechanism with the unlocking member on the battery bracket, the method further comprises the following steps:

stretching out of the unlocking mechanism until engaging the unlocking member in place and unlocking.

In this solution, through accurate positioning, efficient and accurate unlocking operation is realized.

Preferably, stretching out of the unlocking mechanism until engaging the unlocking member in place and unlocking comprises:

stretching out of the unlocking mechanism from a side of the battery swapping vehicle toward the battery swapping vehicle until engaging the unlocking member in place and unlocking.

In this solution, the battery swapping operation is convenient and efficient when it is performed on the side surface of the battery swapping vehicle.

Preferably, stretching out of the unlocking mechanism until engaging the unlocking member in place and unlocking comprises:

controlling the unlocking mechanism to move toward the battery bracket until the unlocking rod engages the unlocking sleeve in place; and driving the unlocking rod to rotate to drive the unlocking member to rotate the unlocking sleeve to unlock the locking member of the battery pack.

In this solution, by controlling the unlocking mechanism to move towards the battery bracket until the unlocking rod and the unlocking sleeve engage in place, the stability of subsequent rotation is improved, and by driving the unlocking rod to rotate and automatically driving the unlocking member to rotate the unlocking sleeve, the locking member of the battery pack can be unlocked, thereby unlocking the battery pack. Meanwhile, the accuracy of unlocking is improved, and the battery swapping efficiency is further improved; at the same time, even if the touch occurs, the unlocking of the locking member will not be caused, thus effectively avoiding the occurrence of mis-operation and greatly improving the efficiency and safety and stability of the battery swapping device.

The preferred embodiments of the present invention can be obtained by any combination of the above-mentioned preferred conditions on the basis of common knowledge in the art.

A positive effect of the present invention is that the present invention achieves accurate positioning between the battery swapping device and the battery swapping vehicle by visually obtaining a high positioning accuracy, so that the battery swapping device can automatically and accurately obtain the accurate position of the battery swapping vehicle and the battery bracket thereof, so that the battery swapping device can be accurately positioned with the battery bracket of the battery swapping vehicle for the disassembly and assembly of the battery pack, thereby greatly improving the battery swapping accuracy and efficiency.

DETAILED DESCRIPTION OF THE PREFERRED EMBODIMENT

Embodiment 1

Figure 1:
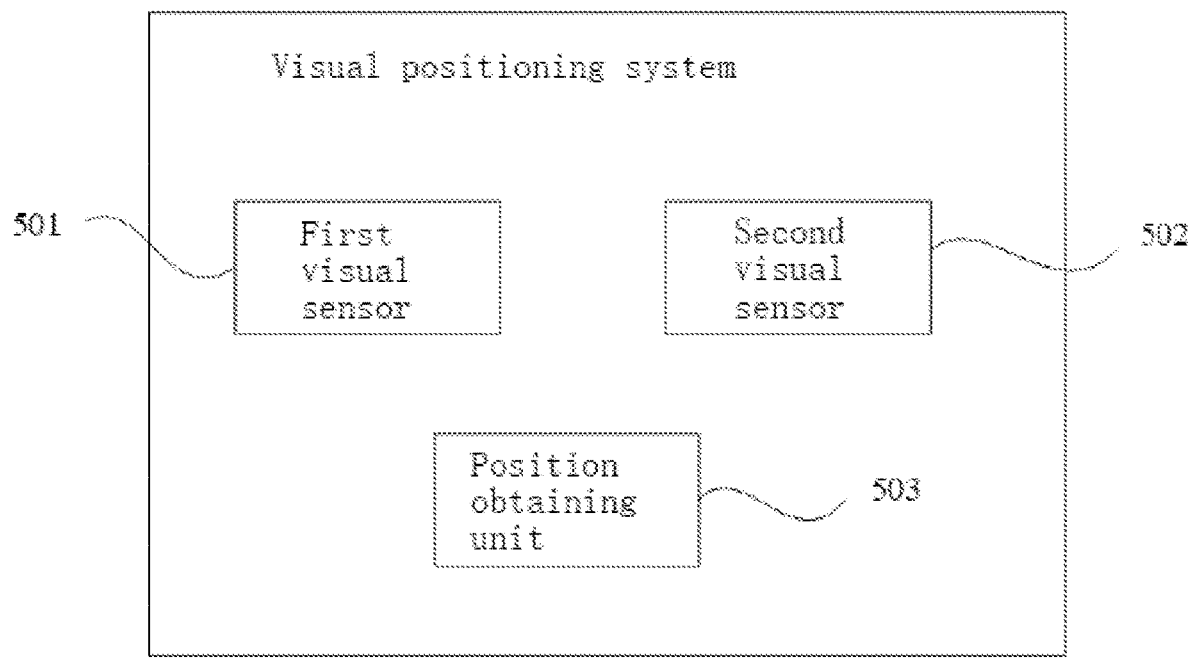
FIG. 1 is a structural schematic diagram of a visual positioning system according to Embodiment 1 of the present invention.

This embodiment provides a visual positioning system. Referring to FIG. 1, the visual positioning system comprises a first visual sensor 501, a second visual sensor 502, and a position obtaining unit 503.

The first visual sensor 501 is used for obtaining a first image of a first position of a target apparatus; the second visual sensor 502 is used for obtaining a second image of a second position of the target apparatus. The position obtaining unit 503 is used for obtaining the position information of the target apparatus according to the first image and the second image.

Figure 2:
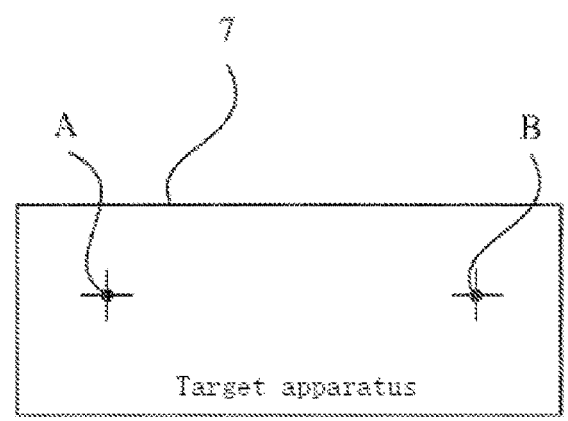
FIG. 2 is a schematic diagram of obtaining a position information of a target apparatus of the visual positioning system according to Embodiment 1 of the present invention.
Figure 2:
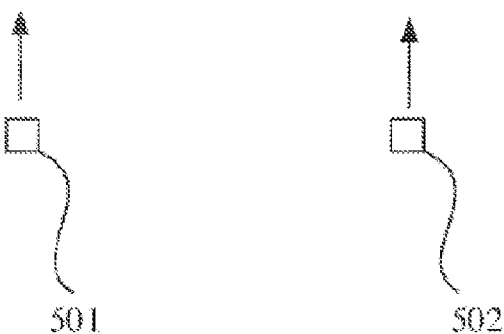

In particular, referring to FIG. 2, the first visual sensor 501 obtains a first image of the target apparatus in the direction indicated by the arrow, the first image including a first position A on the target apparatus; the second visual sensor 502 obtains a second image of the target apparatus in the direction indicated by the arrow, including a second position B on the target apparatus. After receiving the first image and the second image, the position obtaining unit 503 performs image processing to obtain position information of the target apparatus.

The visual positioning system of this embodiment obtains the image of the target apparatus based on the visual sensor, obtains the position information of the target apparatus based on the image processing algorithm, and obtains the higher positioning accuracy through the vision mode. When the visual positioning system of this embodiment is applied to the field of electric vehicle battery swap, it can help to quickly and accurately achieve accurate positioning of the battery swapping device and the battery bracket.

Embodiment 2

On the basis of Embodiment 1, this embodiment provides a visual positioning system. In this embodiment, the position obtaining unit 503 also obtains the position adjustment amount based on the position information of the target apparatus and a reference position information of the target apparatus.

As an alternative implementation, the position obtaining unit 503 performs image processing to obtain the position adjustment amount based on the images obtained in real time by the first visual sensor 501 and the second visual sensor 502 and a preset reference image of the target apparatus.

Figure 3:
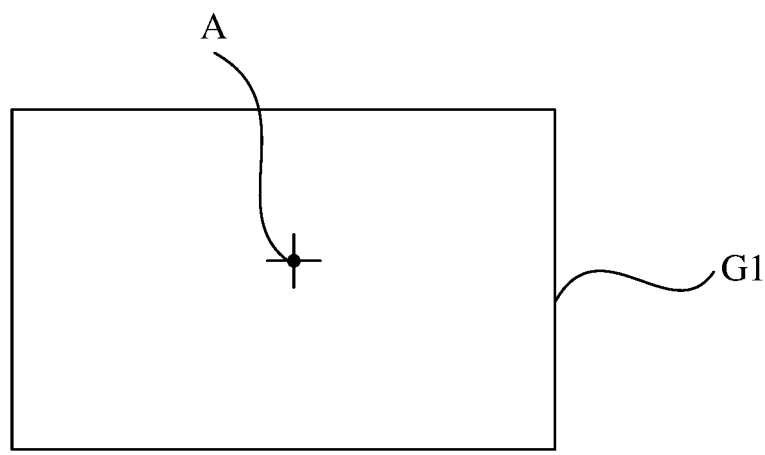
FIG. 3 is a schematic diagram of a first reference image of the visual positioning system according to Embodiment 2 of the present invention.

In an alternative implementation, the position obtaining unit 503 obtains the horizontal displacement amount based on the first image and the first reference image. FIG. 3 gives an illustration of the first reference image G1. The first reference image G1 is pre-stored in the position obtaining unit 503. The first reference image G1 comprises a first position A on the target apparatus. By analyzing the first reference image G1, the position obtaining unit 503 obtains the position of the corresponding pixel in the first reference image G1 of the first position A on the target apparatus in the first reference image G1 as a reference for positioning, which is referred to as "target position" for convenience of explanation. The process of obtaining the target position by the position obtaining unit 503 can be implemented by using an algorithm disclosed in the art, which can be implemented by a person skilled in the art and will not be described in detail herein.

Figure 4:
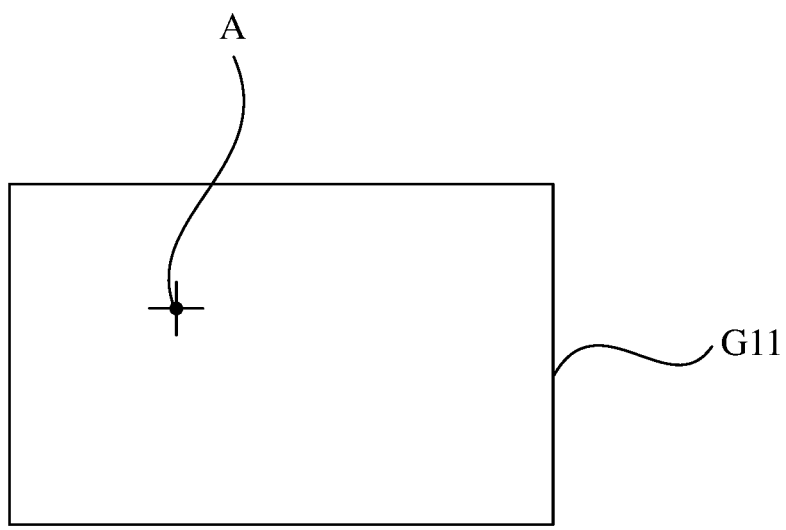
FIG. 4 is a schematic diagram of a first image of the visual positioning system according to Embodiment 2 of the present invention.

FIG. 4 gives an illustration of the first image G11. A first position A on the target apparatus is included in the first image G11. By analyzing the first image G11, the position obtaining unit 503 obtains the position of the corresponding pixel in the first image G11 of the first position A on the target apparatus in the first image G11, which is referred to as a real-time position for convenience of explanation. The process of obtaining the target position by the position obtaining unit 503 can be implemented by using an algorithm disclosed in the art, which can be implemented by a person skilled in the art and will not be described in detail herein.

In an alternative implementation, the position obtaining unit obtains the horizontal displacement amount based on the first image and the first reference image. According to the image processing algorithm, the position obtaining unit 503 obtains the first horizontal displacement amount and the first vertical displacement amount according to the target position and the real-time position. By moving the first visual sensor 501 by the first horizontal displacement amount and the first vertical displacement amount, it is possible for the first visual sensor 501 to capture an image that is consistent with the first reference image G1. The process of obtaining the first horizontal displacement amount and the first vertical displacement amount of the first visual sensor 501 by the position obtaining unit 503 can be realized by using an algorithm disclosed in the art, which can be realized by a person skilled in the art and will not be described in detail herein. A position obtaining unit takes a first horizontal displacement amount as a horizontal displacement amount, and can realize a corresponding horizontal displacement by moving a corresponding horizontal displacement amount to match a target apparatus in a horizontal direction; similarly, by moving the corresponding amount of direct displacement, a corresponding direct displacement can be achieved to match the target apparatus in the direct direction.

In another alternative implementation, the position obtaining unit obtains the horizontal displacement amount from the second image and the second reference image. The position obtaining unit 503 obtains a second horizontal displacement amount and a second vertical displacement amount from the second image and the pre-stored second reference image. By moving the second visual sensor 502 by a second horizontal displacement amount and a second vertical displacement amount, it is possible for the second visual sensor 502 to capture an image that is consistent with the second reference image. A position obtaining unit takes a second horizontal displacement amount as a horizontal displacement amount, and can realize a corresponding horizontal displacement by moving a corresponding horizontal displacement amount to match a target apparatus in a horizontal direction; similarly, by moving the corresponding amount of direct displacement, a corresponding direct displacement can be achieved to match the target apparatus in the direct direction.

In another alternative implementation, the reference position information of the target apparatus is stored in advance in the position obtaining unit 503. The position obtaining unit 503 obtains the position adjustment amount according to the pre-stored reference position information of the target apparatus and the position information of the target apparatus obtained in real time. Adjusting the first visual sensor 501 and the second visual sensor 502 according to the position adjustment amount may enable the first visual sensor 501 to capture an image that is consistent with the first reference image and enable the second visual sensor 502 to capture an image that is consistent with the second reference image.

Figure 5:
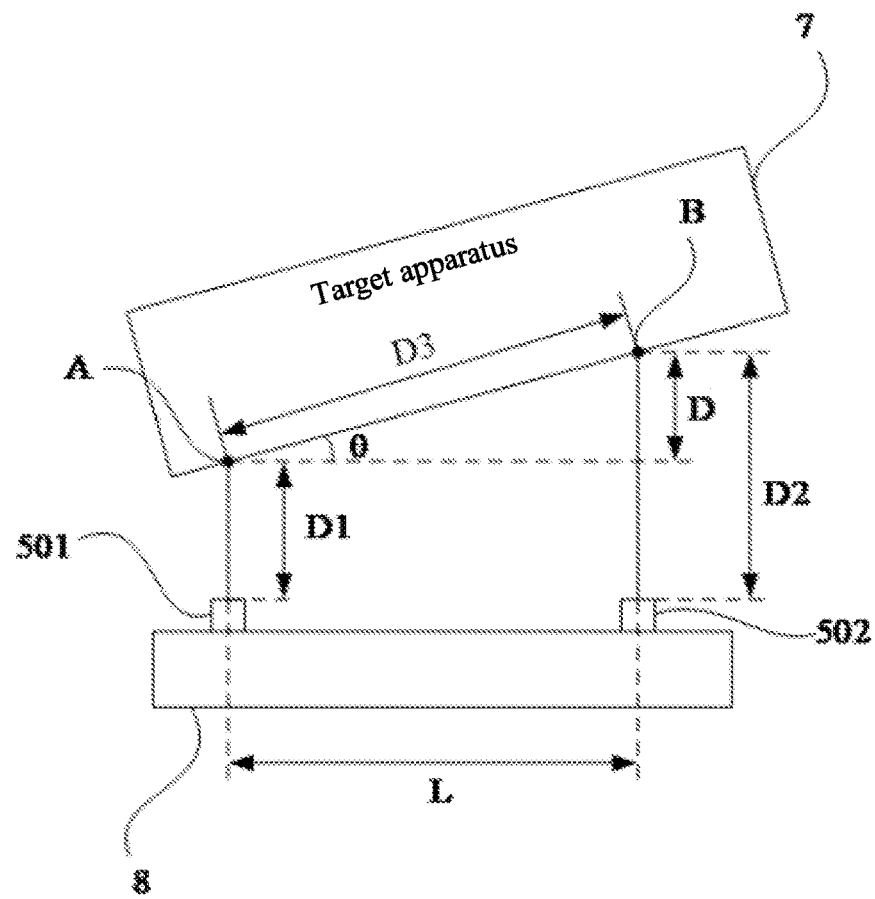
FIG. 5 is a schematic diagram of obtaining a first depth of field and a second depth of field of the visual positioning system according to Embodiment 2 of the present invention.

As an alternative implementation, referring to FIG. 5, when the first visual sensor 501 and the second visual sensor 502 are provided on the position adjustment mechanism 8, the first visual sensor 501 is provided at a position corresponding to the first position A, the second visual sensor 502 is provided at a position corresponding to the second position B, the first position A and the second position B have a first preset space D3 therebetween, and the first visual sensor 501 and the second visual sensor 502 have a second preset distance L therebetween. The position obtaining unit 503 performs image processing on the first image to obtain a first depth of field and a first depth of field value D1 of a first position A in the first image; the position obtaining unit 503 performs image processing on the second image to obtain a second depth of field and a second depth of field value D2 of a second position B in the second image. The specific way for the position obtaining unit 503 to obtain the depth of field value can be implemented using an algorithm disclosed in the art, which can be implemented by a person skilled in the art and will not be described in detail herein. The position obtaining unit 503 obtains the difference D=|D2−D1| of the two depth of field values. The position the difference D of the depth of field values, the distance L between the first visual sensor 501 and the second visual sensor 502, and the distance D3 between the first position A and the second position B, the position obtaining unit 503 can obtain the rotation angle amount θ according to the trigonometric function principle. The position adjusting mechanism 8 is rotated in the corresponding direction by the rotation angle amount θ, so that the target apparatus 7 and the position adjusting mechanism 8 can be made parallel.

The visual positioning system may implement positioning control in a plurality of directions by at least one of a horizontal displacement amount, a vertical displacement amount, and an angular rotation amount to ensure a multi-dimensional positioning control requirement.

Embodiment 3

On the basis of Embodiment 2, this embodiment provides a visual positioning system. In this embodiment, the visual positioning system further comprises at least two distance sensors comprising a first distance sensor and a second distance sensor.

In this embodiment, the number and the position of the distance sensors are not specifically limited, and can be adjusted and selected accordingly according to actual requirements.

As an alternative implementation, when the first image acquisition module and the second image acquisition module are provided on the position adjustment mechanism, the first distance sensor (assuming overlapping with the position of the first image acquisition module) is provided at a position corresponding to the first position A, the second distance sensor (assuming overlapping with the position of the second image acquisition module) is provided at a position corresponding to the second position B, a first preset space D3 is provided between the first position A and the second position B, and a second preset distance L is provided between the first distance sensor and the second distance sensor.

A first distance sensor for detecting a distance value D1 to a target apparatus; the second distance sensor is used to detect a distance value D2 from the target apparatus. The way for the distance sensor to detect distance can be implemented using algorithms disclosed in the art and can be implemented by a person skilled in the art and will not be described in detail herein.

The image processing module obtains the difference D=|D2−D1| of the two distance values. The image processing module D, the distance L between the first distance sensor and the second distance sensor, and the distance D3 between the first position A and the second position B, the image processing module can obtain the rotation angle amount θ according to the trigonometric function principle. The position adjusting mechanism 8 is controlled to rotate in the corresponding direction by the rotation angle amount θ, so that the target apparatus 7 and the position adjusting mechanism 8 can be made parallel.

In this Embodiment 3, the structure and function of the first image acquisition module are the same as those of the first visual sensor in Embodiment 1, and the structure and function of the second image acquisition module in this embodiment are the same as those of the second visual sensor in Embodiment 1.

Embodiment 4

Figure 6:
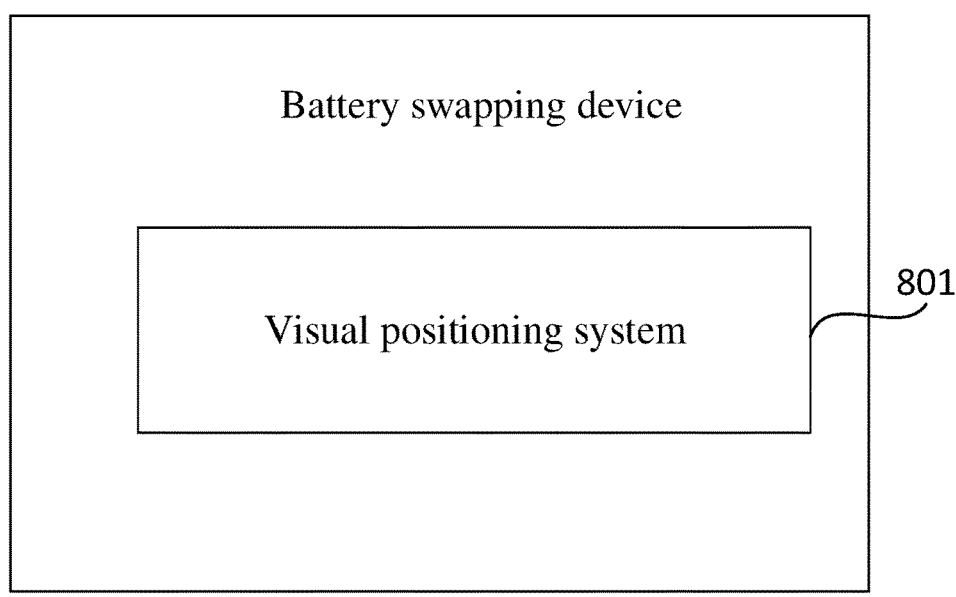
FIG. 6 is a schematic diagram of a battery swapping device according to Embodiment 4 of the present invention.

The present embodiment provides a battery swapping device for exchanging power for an electric vehicle. Referring to FIG. 6, the battery swapping device comprises the visual positioning system 801 of Embodiment 1 or Embodiment 2. Taking a battery bracket of an electric vehicle as a target apparatus, and a first visual sensor obtaining a first image of a first position of the battery bracket; a second visual sensor obtains a second image of a second position of the battery bracket; the position obtaining unit obtains a position information of the battery bracket according to the first image and the second image. The visual positioning system visually accurately positions the battery bracket to align the battery swapping device with the battery bracket on which the battery pack is locked, thereby achieving accurate battery swap.

Embodiment 5

Figure 7:
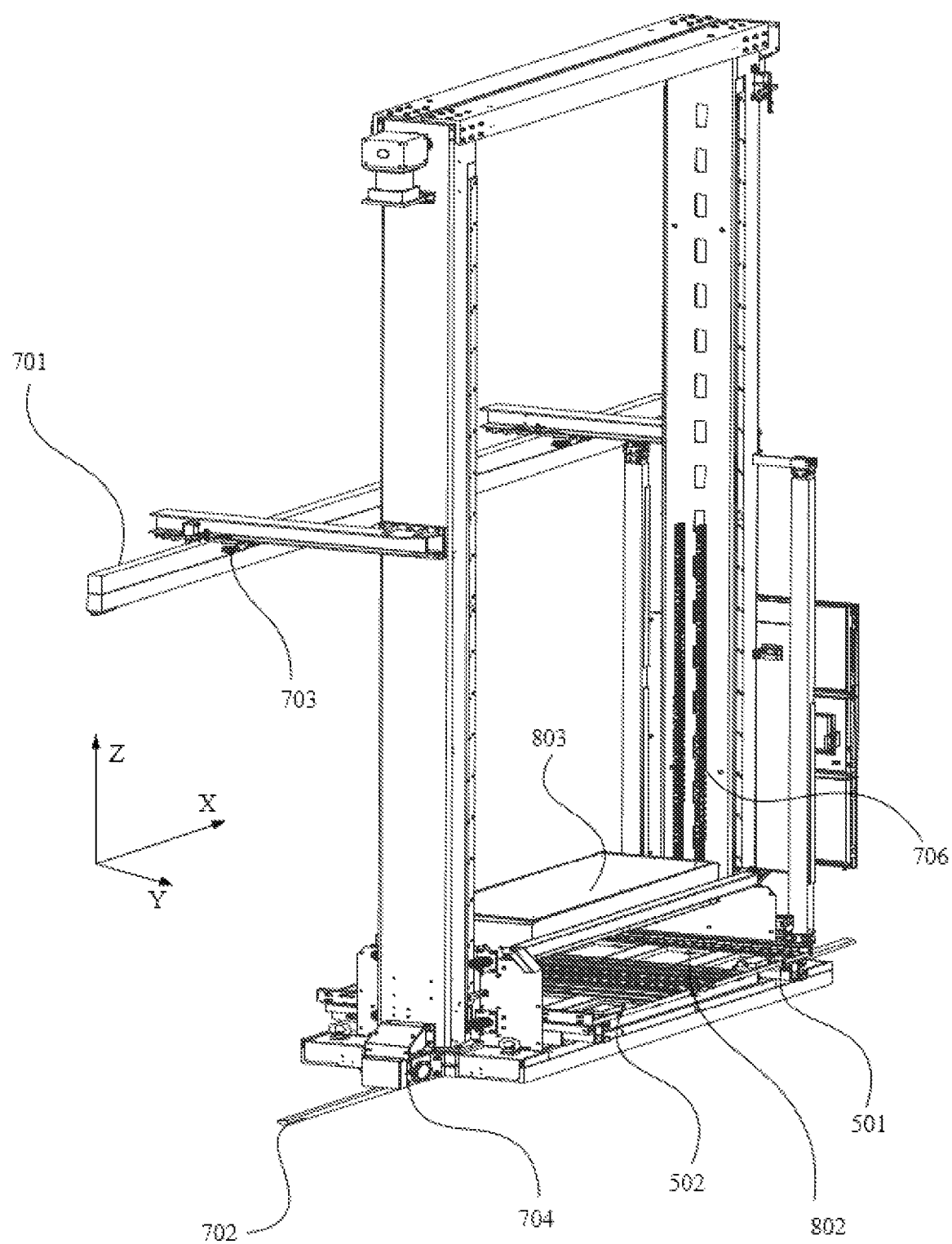
FIG. 7 is a perspective view of a battery swapping device according to Embodiment 5 of the present invention.

On the basis of Embodiment 4, this embodiment provides a battery swapping device. Referring to FIG. 7, the battery swapping device further comprises an unlocking mechanism 802 and a position adjustment mechanism. The unlocking mechanism 802 is used for unlocking the battery pack locked on the battery bracket, and the position adjustment mechanism is used for adjusting the position of the unlocking mechanism 802 according to at least one of the horizontal displacement amount, the vertical displacement amount and the rotation angle amount obtained by the visual positioning system until the unlocking mechanism 802 and the unlocking member on the battery bracket complete positioning.

The battery swapping device of this embodiment is provided at the battery swapping station, and when the electric vehicle enters the battery swapping station and is parked to a preset parking space, the battery swapping device of this embodiment moves to the electric vehicle under the control of the position adjustment mechanism, specifically moves from the side face of the electric vehicle along the length direction of the body of the electric vehicle, and adjusts the position of the unlocking mechanism 802 according to at least one of the horizontal displacement amount, the vertical displacement amount and the rotation angle amount obtained by the visual positioning system until the unlocking mechanism 802 completes the positioning with the unlocking member on the battery bracket; the battery swapping device is located on the side of the electric vehicle and the position of the battery mounted on the electric vehicle corresponds to perform a battery swapping operation from the side of the electric vehicle, specifically comprising a battery removal and mounting operation.

As an alternative implementation, a first visual sensor 501 and a second visual sensor 502 are provided on the unlocking mechanism 802. The position of the unlocking mechanism 802 is adjusted and unlocked according to the position adjustment amount obtained by the visual positioning system, so that the unlocking mechanism 802 and the unlocking member on the battery bracket are positioned. When the first visual sensor 501 and the second visual sensor 502 are provided on the unlocking mechanism 802, the position information of the battery bracket obtained by the visual positioning system directly reflects the position relationship between the unlocking mechanism and the battery bracket, which is helpful for improving the positioning accuracy and facilitating the battery swapping operation.

In particular embodiments, the position adjustment mechanism comprises a control unit, a horizontal movement unit, a vertical movement unit, and a rotation unit, wherein the control unit is communicatively connected to the visual positioning system to control the horizontal movement unit, the vertical movement unit, or the rotation unit to correspondingly move to the adjustment position according to at least one of the horizontal displacement amount, the vertical displacement amount, and the rotation angle amount.

In an alternative implementation, the initial position of the battery swapping device of this embodiment is matched to the parking space in the battery swapping station. When an electric vehicle is parked in a parking space for battery swap, it is difficult for the parking state of the electric vehicle to coincide with the accurate battery swapping position, but there is a deviation. At this time, the device can position the battery swapping device according to the parking state of the electric vehicle and adjust the position of the battery swapping device to achieve accurate alignment with the electric vehicle to achieve fast and efficient positioning without adjusting the parking position of the electric vehicle and improve the battery swapping efficiency.

Figure 8:
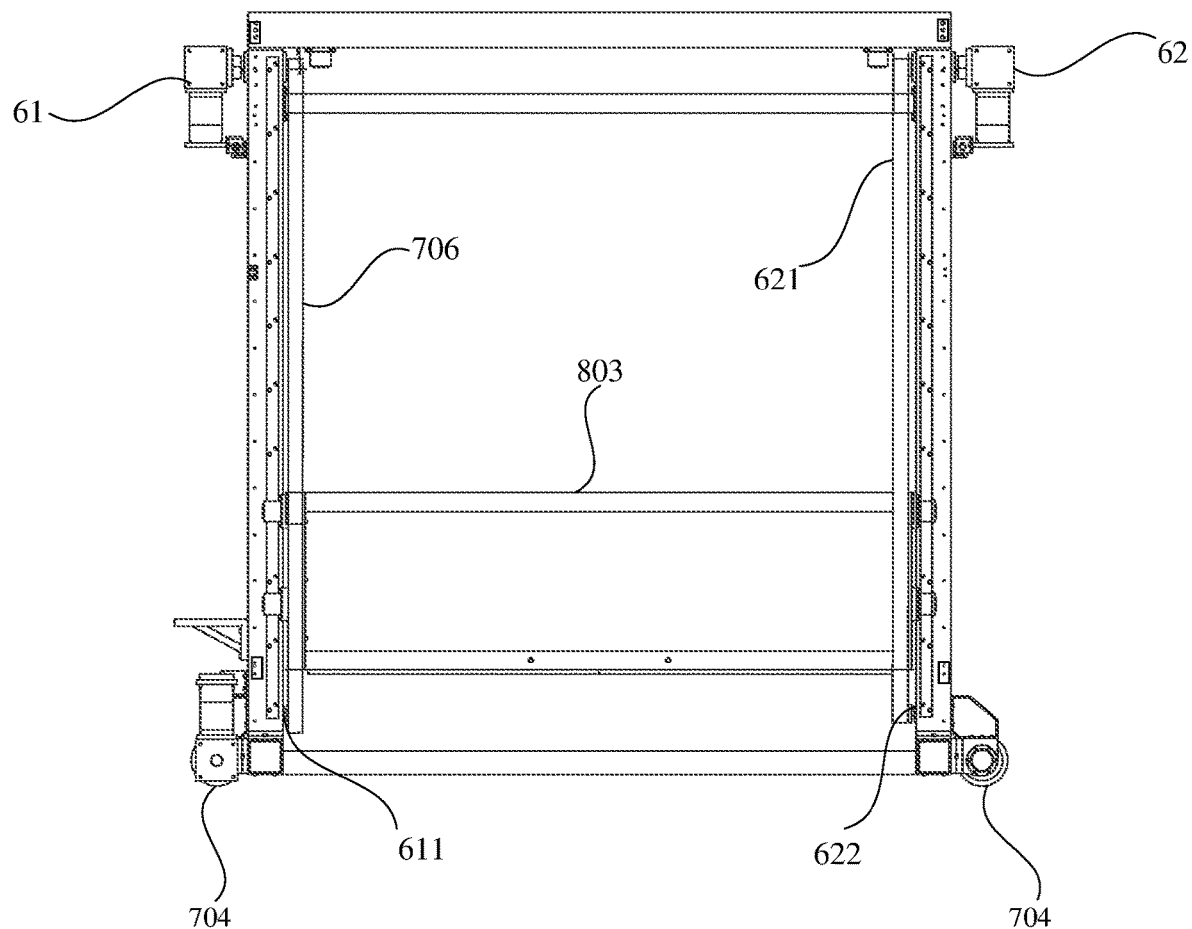
FIG. 8 is a partial front view of a battery swapping device according to Embodiment 5 of the present invention.

To achieve the horizontal movement, the horizontal movement unit comprises a rail, a guide wheel, and a horizontal driver for driving the guide wheel to move along the rail according to the horizontal displacement amount. As an alternative implementation, referring to FIGS. 7 and 8, the track comprises a top rail 701 and a ground rail 702, and the guide wheel comprises a top rail guide wheel 703 and a ground rail guide wheel 704. A top rail guide wheel 703 is provided corresponding to the top rail 701, and a ground rail guide wheel 704 is provided corresponding to the ground rail 702. The horizontal drivers respectively drive the top rail guide wheels 703 to move along the top rail 701 in the X-axis direction (i.e. horizontal direction) and drive the ground rail guide wheels 704 to move along the ground rail 702, thereby achieving horizontal movement of the unlocking mechanism. In FIG. 7, the X-axis, the Y-axis, and the Z-axis are perpendicular to each other. The frame of the battery swapping actuating mechanism 803 is shown in FIG. 8, and a specific structure is not shown. The specific structure of the battery swapping actuating mechanism can be realized by a person skilled in the art and will not be described in detail herein.

When the electric vehicle is parked in the parking space for battery swap, if there is a deviation between the parking state of the electric vehicle and the accurate battery swapping position in the horizontal direction, the unlocking mechanism is moved according to the horizontal displacement amount, so that the unlocking mechanism can match the position of the battery bracket of the electric vehicle in the horizontal direction, and has a higher accuracy, which provides a guarantee for accurate unlocking.

In this embodiment, the movement of the unlocking mechanism in the horizontal direction can be automatically driven by the horizontal driver according to the horizontal displacement amount, and the efficiency and stability of the movement of the unlocking structure in the horizontal direction can be improved by the cooperation of the rail and the guide rail.

The vertical displacement amount obtained by the visual positioning system comprises a first vertical displacement amount and a second vertical displacement amount, wherein the first vertical displacement amount is obtained according to the first image, and the second vertical displacement amount is obtained according to the second image.

As a specific implementation, the vertical movement unit comprises a first vertical driver 61, a second vertical driver 62, a first lifting mechanism, a second lifting mechanism and a battery swapping actuating mechanism 803, wherein the first vertical driver is connected to the first lifting mechanism, the second vertical driver is connected to the second lifting mechanism, and the first lifting mechanism and the second lifting mechanism are respectively connected to two ends of the battery swapping actuating mechanism to drive the two ends of the battery swapping actuating mechanism to lift and move; the first vertical driver is used for driving the first lifting mechanism according to the first vertical displacement amount, and the second vertical driver is used for driving the second lifting mechanism according to the second vertical displacement amount.

In particular implementation, the first lifting mechanism comprises a first chain 706 and a correspondingly provided first sprocket 611, wherein the first chain 706 drives the first sprocket 611 to move in a vertical direction (i.e., a Z-axis direction) under the drive of the first vertical driver 61 to drive the battery swapping actuating mechanism 803 to move in the vertical direction. The second lifting mechanism comprises a second chain 621 and a correspondingly provided second sprocket 622, wherein the second chain 621 drives the second sprocket 622 to move in a vertical direction under the drive of the second vertical driver 62 to drive the battery swapping actuating mechanism 803 to move in the vertical direction.

When the electric vehicle is parked in the parking space to battery swap, if there is a deviation between the parking state of the electric vehicle and the accurate battery swapping position in the vertical direction, the unlocking mechanism is moved according to the vertical displacement amount, so that the unlocking mechanism can match the position of the battery bracket of the electric vehicle in the vertical direction, and has a higher accuracy, which provides a guarantee for accurate unlocking.

In this embodiment, the first vertical driver and the second vertical driver can automatically drive the first lifting mechanism and the second lifting mechanism to lift according to the first vertical displacement amount and the second vertical displacement amount, respectively, to drive the two ends of the battery swapping actuating mechanism to lift, thereby further driving the two ends of the unlocking mechanism connected thereto to lift to adjust the position of the unlocking mechanism in the vertical direction, and further improving the stability of the unlocking mechanism when adjusting the position in the vertical direction.

Figure 9:
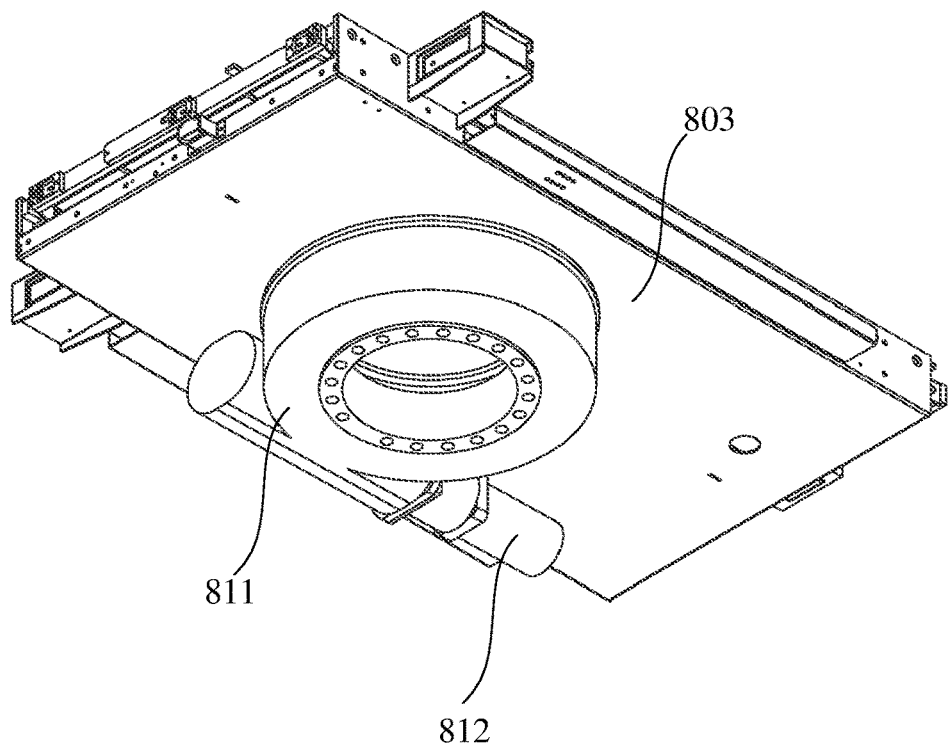
FIG. 9 is a schematic diagram of a rotation unit of the battery swapping device according to Embodiment 5 of the present invention.

In an alternative implementation, referring to FIG. 9, the rotation unit comprises a turntable 811 sleeved at the bottom of the battery swapping actuating mechanism 803, and a rotation driver 812 connected to the turntable 811 and used for driving the turntable 811 to rotate the battery swapping actuating mechanism 803 according to the rotation angle amount.

When the electric vehicle is parked in the parking space for battery swap, if there is an angular deviation between the parking state of the electric vehicle and the accurate battery swapping position, it is difficult to align the unlocking target after the unlocking apparatus or the like is extended, or it is difficult to align the battery bracket after the battery swapping actuating mechanism is extended. The battery swapping device of this embodiment is capable of obtaining a parking state of the electric vehicle and an accurate angular deviation of the battery swapping position, for example, the angle θ shown in FIG. 5, by the visual positioning system, and the posture of the battery swapping device is adjusted with the angle θ as the rotation angle amount, so that the posture of the battery swapping device matches the parking state of the electric vehicle. so that the unlocking mechanism is aligned with the unlocking member on the battery bracket, thereby achieving an efficient and accurate battery swapping operation.

In this embodiment, the rotation driver can automatically drive the turntable to rotate according to the rotation angle amount to drive the battery swapping actuating mechanism to rotate, thereby further driving the unlocking mechanism connected thereto to rotate to adjust the position of the unlocking mechanism in the angle, and further improving the stability of the unlocking mechanism when adjusting the angle.

Embodiment 6

Figure 10:
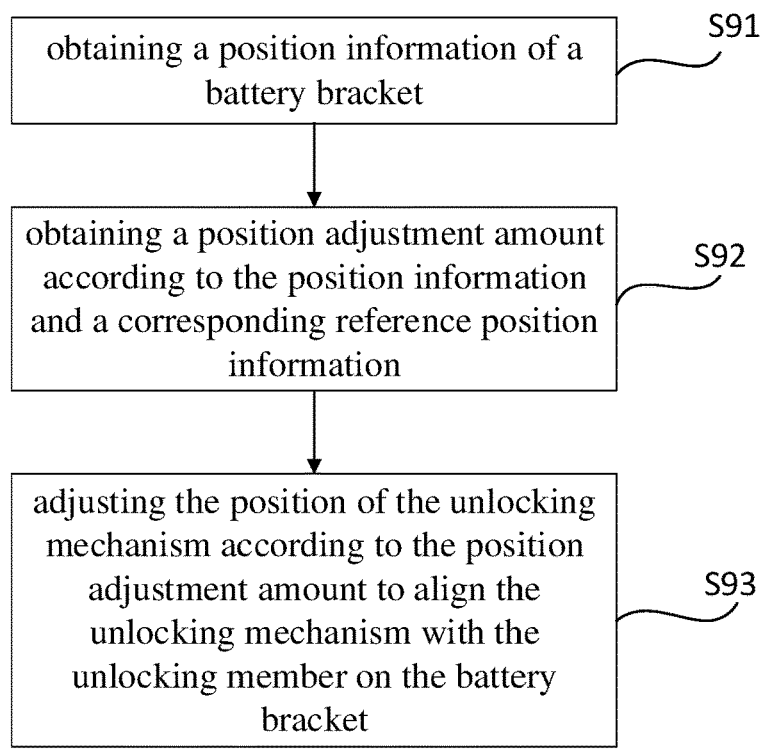
FIG. 10 is a flow diagram of a battery swapping control method according to Embodiment 6 of the present invention.

The present embodiment provides a battery swapping control method. Referring to FIG. 10, the battery swapping control method comprises the following steps:

Step S91, obtaining a position information of a battery bracket.

Step S92, obtaining a position adjustment amount according to the position information and a corresponding reference position information.

Step S93, adjusting the position of the unlocking mechanism according to the position adjustment amount to align the unlocking mechanism with the unlocking member on the battery bracket.

In an alternative implementation, the battery swapping control method is implemented using the battery swapping device of Embodiment 5. Wherein the visual positioning system obtains a position information of the battery bracket, and obtains a position adjustment amount according to the position information and a corresponding reference position information. Then, the position adjustment mechanism adjusts the position of the unlocking mechanism 802 according to the position adjustment amount to align the unlocking mechanism 802 with the unlocking member on the battery bracket to realize unlocking and battery swap.

The battery swapping control method of this embodiment can accurately obtain the position information of the battery bracket, thereby achieving accurate battery swap.

Embodiment 7

On the basis of Embodiment 6, this embodiment provides a battery swapping control method. As an alternative implementation, the battery swapping control method is implemented using the battery swapping device of Embodiment 5.

Figure 11:
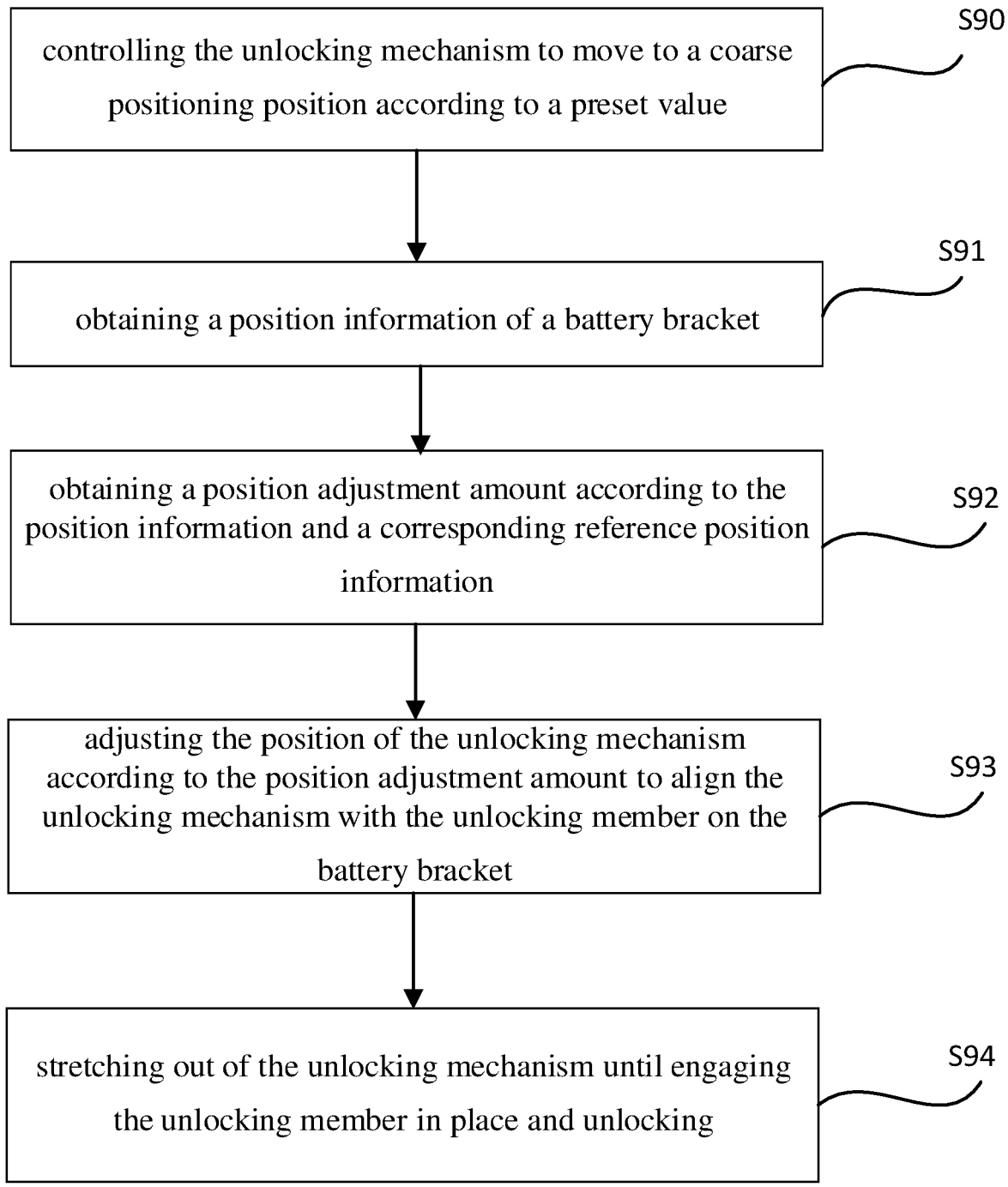
FIG. 11 is a flow diagram of a battery swapping control method according to Embodiment 7 of the present invention.

Referring to FIG. 11, before step S91, the battery swapping control method further comprises the following steps:

Step S90, controlling the unlocking mechanism to move to a coarse positioning position according to a preset value.

By driving the horizontal movement unit and the vertical movement unit, the unlocking mechanism can be controlled to move to a preset coarse positioning position. In specific implementations, the battery swapping device is provided in a battery swapping station. When the vehicle enters the battery swapping station to swap the battery, the vehicle is parked to the corresponding parking space. The preset coarse positioning position corresponds to a corresponding parking space. When the unlocking mechanism 802 is moved to the preset coarse positioning position, the positional relationship between the unlocking mechanism 802 and the battery bracket of the vehicle has reached the estimated range. Next, the positioning of the battery bracket according to the above-described visual positioning system enables the unlocking mechanism 802 and the unlocking member on the battery bracket to achieve accurate positioning.

Figure 12:
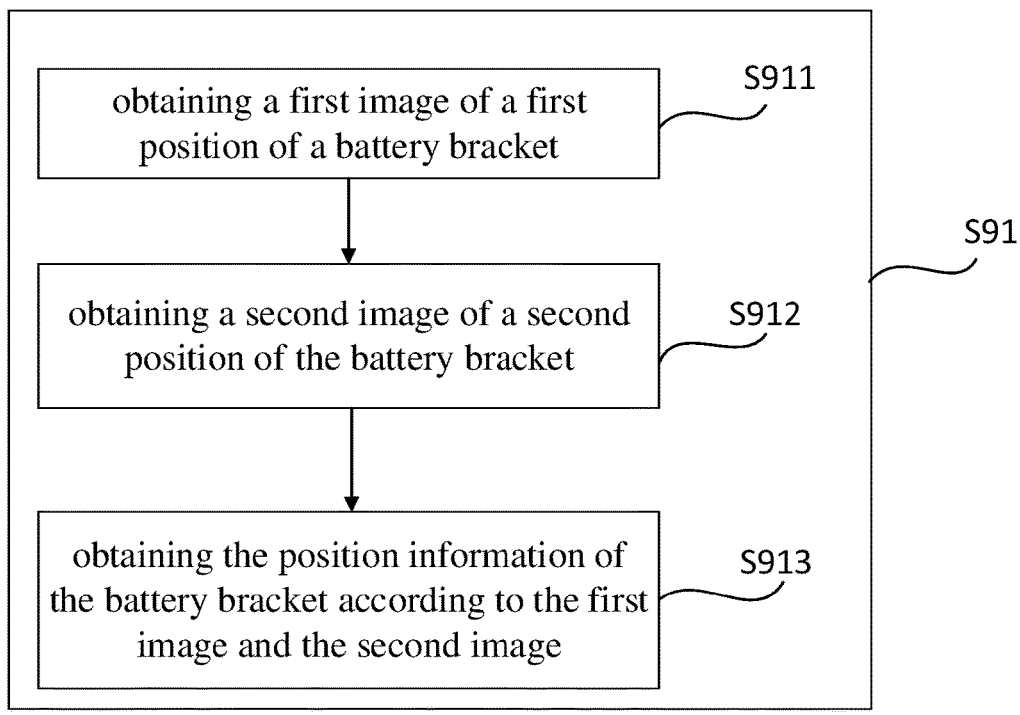
FIG. 12 is a flow diagram of step S91 of the battery swapping control method according to Embodiment 7 of the present invention.

In an alternative implementation, referring to FIG. 12, step S91 comprises:
step S911, obtaining a first image of a first position of a battery bracket;
step S912, obtaining a second image of a second position of the battery bracket; and
step S913, obtaining the position information of the battery bracket according to the first image and the second image.

During the battery swap, the battery bracket serves as a target apparatus to be positioned by the visual positioning system, and a first position A and a second position B are preset on the battery bracket. Referring to FIG. 2, the first visual sensor 501 obtains a first image of the target apparatus in the direction indicated by the arrow, the first image including a first position A on the target apparatus; the second visual sensor 502 obtains a second image of the target apparatus in the direction indicated by the arrow, including a second position B on the target apparatus. After receiving the first image and the second image, the position obtaining unit 503 performs image processing to obtain a position information of the target apparatus.

When an electric vehicle is parked in a parking space for battery swap, it is difficult for the parking state of the electric vehicle to coincide with the accurate battery swapping position, but there is a deviation. At this time, according to the battery swapping control method of this embodiment, the battery swapping device can be positioned according to the parking state of the electric vehicle and the position of the battery swapping device can be adjusted to achieve accurate alignment with the electric vehicle, so that fast and efficient positioning can be achieved without adjusting the parking position of the electric vehicle and the battery swapping efficiency can be improved.

In specific implementation, step S92 comprises:
obtaining a horizontal displacement amount according to a first image and a first reference image corresponding to a first position or a second image and a second reference image corresponding to a second position; or
respectively obtaining a first vertical displacement amount and a second vertical displacement amount according to the first image and the first reference image and the second image and the second reference image; or
obtaining a rotation angle amount based on the depth of field value of the first position in the first image and the depth of field value of the second position in the second image.

As an alternative implementation, in step S92, by analyzing the first reference image G1, the position obtaining unit 503 obtains the position of the corresponding pixel in the first reference image G1 of the first position A on the target apparatus in the first reference image G1 as a reference for positioning, for convenience of explanation, referred to as "target position". By analyzing the first image G11, the position obtaining unit 503 obtains the position of the corresponding pixel in the first image G11 of the first position A on the target apparatus in the first image G11, which is referred to as a real-time position for convenience of explanation. According to the image processing algorithm, the position obtaining unit 503 obtains the first horizontal displacement amount and the first vertical displacement amount of the first visual sensor 501 according to the target position and the real-time position. By moving the first visual sensor 501 by the first horizontal displacement amount and the first vertical displacement amount, it is possible for the first visual sensor 501 to capture an image that is consistent with the first reference image G1.

Similarly, the position obtaining unit 503 obtains a second horizontal displacement amount and a second vertical displacement amount from the second image and the pre-stored second reference image. By moving the second visual sensor 502 by a second horizontal displacement amount and a second vertical displacement amount, it is possible for the second visual sensor 502 to capture an image that is consistent with the second reference image.

Referring to FIGS. 7 and 8, horizontal drivers respectively drive the top rail guide wheels 703 to move along the top rail 701 in the X-axis direction (i.e. horizontal direction) and drive the ground rail guide wheels 704 to move along the ground rail 702, thereby achieving horizontal movement of the unlocking mechanism 802.

When the electric vehicle is parked in the parking space for battery swap, if there is a deviation between the parking state of the electric vehicle and the accurate battery swapping position in the horizontal direction, the unlocking mechanism is moved according to the horizontal displacement amount, so that the unlocking mechanism can match the position of the battery bracket of the electric vehicle in the horizontal direction, and has a higher accuracy, which provides a guarantee for accurate unlocking.

Referring to FIGS. 7 and 8, the first chain 706 moves the first sprocket 611 in the vertical direction (i.e. the Z-axis direction) by being driven by the first vertical driver 61, and the second chain 621 moves the second sprocket 622 in the vertical direction by being driven by the second vertical driver 62 to move the battery swapping actuating mechanism 803 in the vertical direction.

When the electric vehicle is parked in the parking space to battery swap, if there is a deviation between the parking state of the electric vehicle and the accurate battery swapping position in the vertical direction, the unlocking mechanism is moved according to the vertical displacement amount, so that the unlocking mechanism can match the position of the battery bracket of the electric vehicle in the vertical direction, and has a higher accuracy, which provides a guarantee for accurate unlocking.

The position obtaining unit 503 obtains a rotation angle amount based on the depth of field value of the first position in the first image and the depth of field value of the second position in the second image. Referring to FIG. 9, the rotation driver 812 drives the turntable 811 according to the amount of battery swapping actuating mechanism 803 according to the rotation angle amount.

When the electric vehicle is parked in the parking space for battery swap, if there is an angular deviation between the parking state of the electric vehicle and the accurate battery swapping position, it is difficult to align the unlocking target after the unlocking apparatus or the like is extended, or it is difficult to align the battery bracket after the battery swapping actuating mechanism is extended. According to the battery swapping control method of this embodiment, it is possible to obtain a parking state of the electric vehicle and an accurate angular deviation of the battery swapping position, for example, the angle θ shown in FIG. 5, by the visual positioning system, and the posture of the battery swapping device is adjusted with the angle θ as the rotation angle amount, so that the posture of the battery swapping device matches the parking state of the electric vehicle, so that the unlocking mechanism is aligned with the unlocking member on the battery bracket, thereby achieving an efficient and accurate battery swapping operation.

After the step of adjusting the position of the unlocking mechanism according to the position adjustment amount to align the unlocking mechanism with the unlocking member on the battery bracket, in step 94, the unlocking mechanism 802 is extended until it is engaged with the unlocking member and unlocked, thereby performing a battery swapping operation.

Embodiment 8

In order to overcome the above drawbacks currently existing, this embodiment provides a positioning control system of a battery swapping device comprising: at least two image acquisition modules, which are respectively provided at different positions on one side of the battery swapping device facing a battery swapping position, wherein the at least two image acquisition modules are used for performing image acquisition on different positions of the battery swapping vehicle to obtain at least a first image and a second image; an image processing module connected to the at least two image acquisition modules and at least used for performing image processing on the first image and the second image to obtain a position adjustment amount; and an adjustment control module for controlling adjustment of the position of the battery swapping device according to the position adjustment amount so that the battery swapping device completes positioning with the battery swapping vehicle.

In this embodiment, the number and setting position of the image acquisition modules are not limited, and can be adjusted and selected accordingly according to actual requirements.

In this embodiment, the positioning control system can automatically and accurately obtain an accurate position of the battery swapping vehicle, so that the battery swapping device can be accurately positioned with the battery bracket of the battery swapping vehicle for the disassembly and assembly of the battery pack, thereby greatly improving the accuracy and efficiency of the battery exchange.

In this example, the positioning control system of the battery swapping device as an implementation in a specific scenario of the visual positioning system in Example 1 uses the same technical structure and achieves the same technical function as the visual positioning system in Example 1.

Embodiment 9

Figure 13:
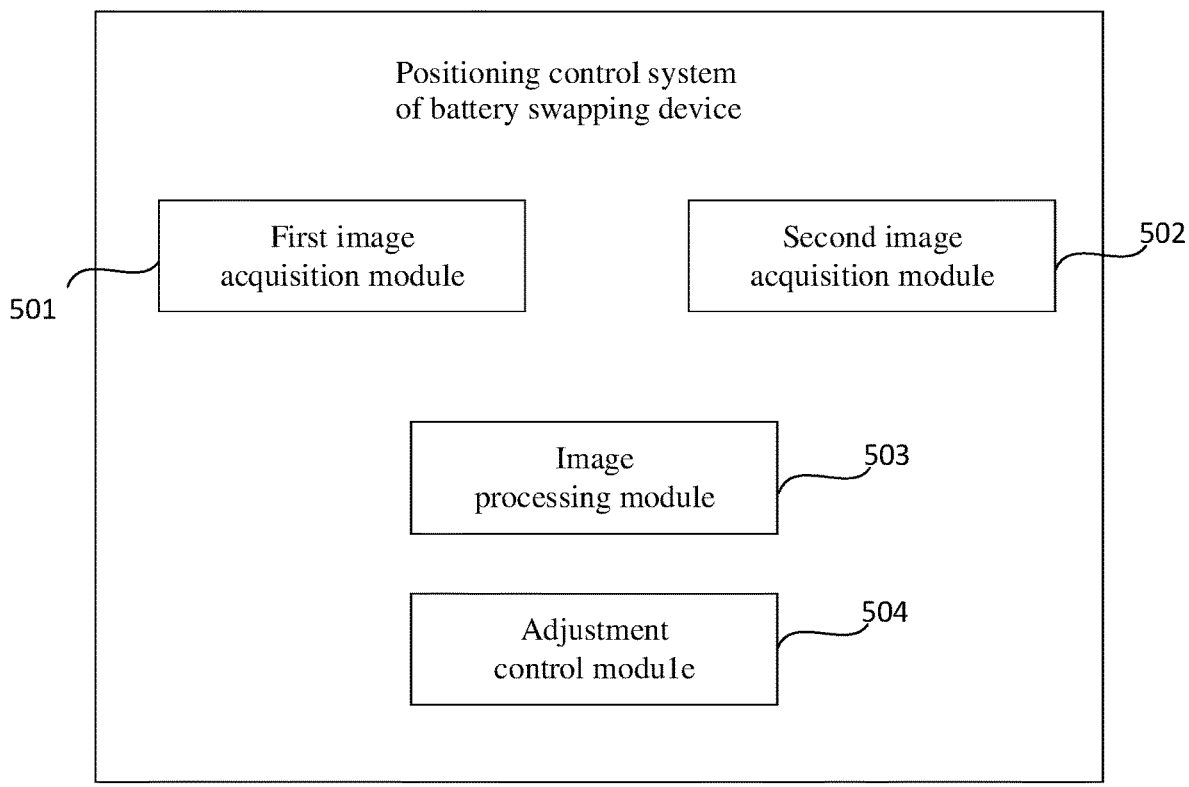
FIG. 13 is a schematic diagram of a configuration of a positioning control system of a battery swapping device according to Embodiment 9 of the present invention.

As shown in FIG. 13, this embodiment provides a visual positioning system, in particular a positioning control system of a battery swapping device, the positioning control system mainly comprising a first image acquisition module 501, a second image acquisition module 502, an image processing module 503 and an adjustment control module 504.

In this embodiment, the image acquisition module can use a visual sensor, but the type thereof is not particularly limited, and can be selected and adjusted accordingly according to actual requirements.

The first image acquisition module 501 is used for performing image acquisition on a first position of the battery swapping vehicle to obtain a first image, and the second image acquisition module 502 is used for performing image acquisition on a second position of the battery swapping vehicle to obtain a second image.

Specifically, referring to FIG. 2, the first image acquisition module 501 obtains a first image of the target apparatus 7 (i.e. the battery swapping vehicle or its associated components) in the direction indicated by the arrow, including a first position A on the target apparatus 7; the second image acquisition module 502 obtains a second image of the target apparatus 7, including a second position B on the target apparatus, in the direction indicated by the arrow. After receiving the first image and the second image, the image processing module 503 performs image processing to obtain a position information of the target apparatus 7.

In this embodiment, the image processing module 503 also obtains the position adjustment amount based on the position information of the target apparatus and a reference position information of the target apparatus.

As an alternative implementation, the image processing module 503 performs image processing to obtain the position adjustment amount according to the images obtained in real time by the first image acquisition module 501 and the second image acquisition module 502 and a preset reference image of the target apparatus.

In an alternative implementation, the image processing module 503 obtains the horizontal displacement amount from the first image and the first reference image. The reference image is a reference image obtained by an image acquisition module when the battery swapping device is located at a battery swapping position.

Figure 15:
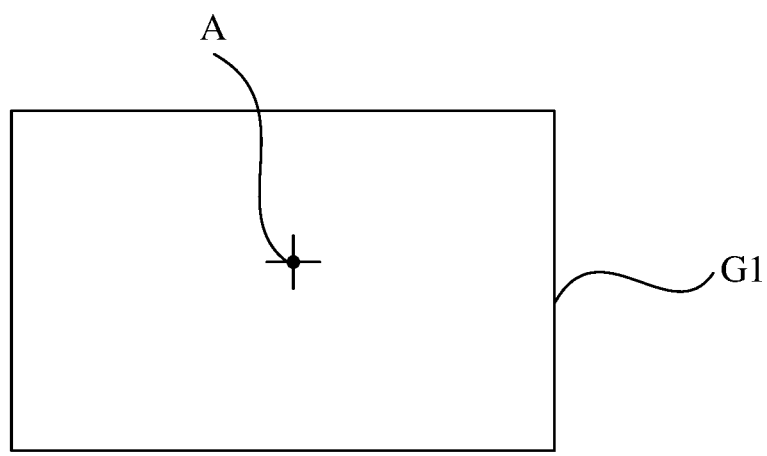
FIG. 15 is a schematic diagram of a first reference image of the positioning control system according to Embodiment 9 of the present invention.

In particular, FIG. 15 gives an illustration of the first reference image G1. The first reference image G1 is prestored in the image processing module 503. The first reference image G1 comprises a first position A on the target apparatus. By analyzing the first reference image G1, the image processing module obtains the position of the corresponding pixel in the first reference image G1 of the first position A on the target apparatus in the first reference image G1 as a reference for positioning, for convenience of description, referred to as "target position". The process of obtaining the target position by the position obtaining unit can be implemented by using an algorithm disclosed in the art, which can be implemented by a person skilled in the art and will not be described in detail herein.

Figure 16:
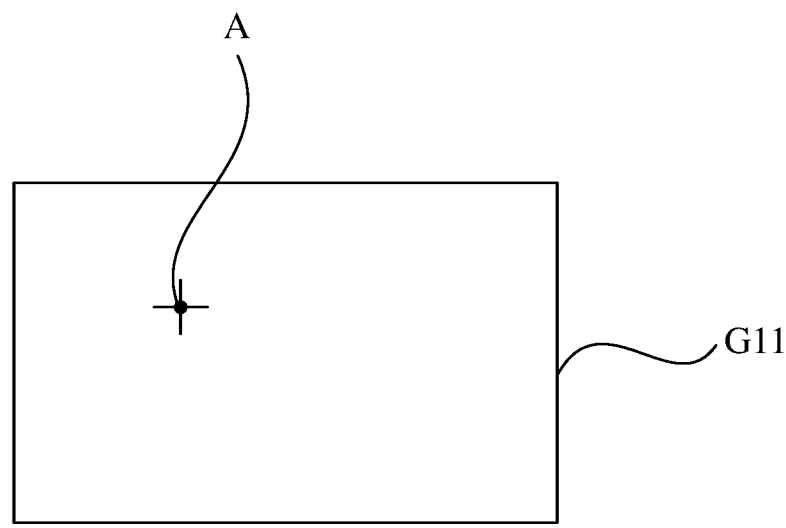
FIG. 16 is a schematic diagram of a first image of a positioning control system according to Embodiment 9 of the present invention.

FIG. 16 gives an illustration of the first image G11. A first position A on the target apparatus is included in the first image G11. By analyzing the first image G11, the image processing module obtains the position of the corresponding pixel in the first image G11 of the first position A on the target apparatus in the first image G11, referred to as "real-time position" for ease of explanation. The process of obtaining the target position by the position obtaining unit 503 can be implemented by using an algorithm disclosed in the art, which can be implemented by a person skilled in the art and will not be described in detail herein.

In an alternative implementation, the position obtaining unit obtains the horizontal displacement amount based on the first image and the first reference image. According to the image processing algorithm, the image processing module obtains the first horizontal displacement amount and the first vertical displacement amount according to the target position and the real-time position. By moving the first image acquisition module by the first horizontal displacement amount and the first vertical displacement amount, it is possible for the first image acquisition module to take an image that is consistent with the first reference image G1. The process of the image processing module obtaining the first horizontal displacement amount and the first vertical displacement amount can be implemented by using an algorithm disclosed in the art, which can be implemented by a person skilled in the art and will not be described in detail herein. The adjustment control module takes a first horizontal displacement amount as a horizontal displacement amount, and can realize a corresponding horizontal displacement by moving a corresponding horizontal displacement amount to match a target apparatus in a horizontal direction; similarly, by moving the corresponding amount of direct displacement, a corresponding direct displacement can be achieved to match the target apparatus in the direct direction.

In another alternative implementation, the image processing module obtains the horizontal displacement amount from the second image and the second reference image. The image processing module obtains a second horizontal displacement amount and a second vertical displacement amount from the second image and the pre-stored second reference image. By moving the second image acquisition module a second horizontal displacement amount and a second vertical displacement amount, the second image acquisition module may be caused to capture an image that is consistent with the second reference image. The adjustment control module takes a second horizontal displacement amount as a horizontal displacement amount, and can realize a corresponding horizontal displacement by moving a corresponding horizontal displacement amount to match a target apparatus in a horizontal direction; similarly, by moving the corresponding amount of direct displacement, a corresponding direct displacement can be achieved to match the target apparatus in the direct direction.

In another alternative implementation, the reference position information of the target apparatus is pre-stored in the image processing module. The image processing module obtains a position adjustment amount according to pre-stored reference position information of the target apparatus and position information of the target apparatus obtained in real time. The first image acquisition module and the second image acquisition module are adjusted according to the position adjustment amount, so that the first image acquisition module captures an image that is consistent with the first reference image, and the second image acquisition module captures an image that is consistent with the second reference image.

Figure 17:
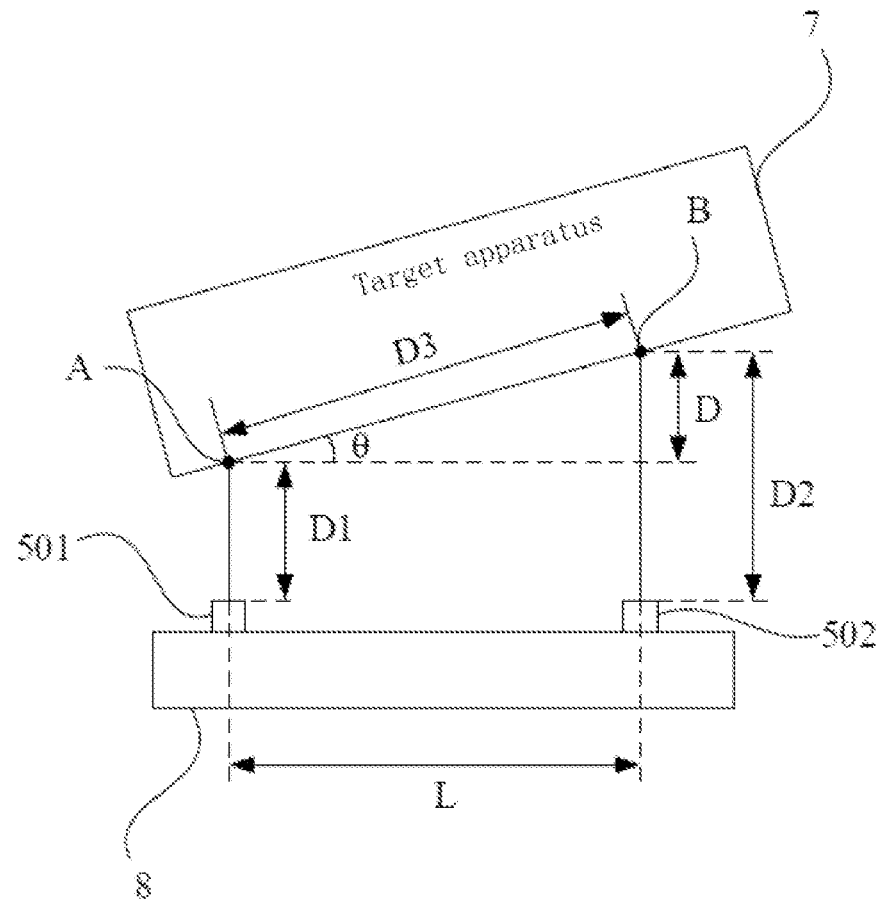
FIG. 17 is a schematic diagram of obtaining a first depth of field and a second depth of field for the positioning control system according to Embodiment 9 of the present invention.

As an alternative implementation, with reference to FIG. 17, when the first image acquisition module and the second image acquisition module are provided on the position adjustment mechanism 8, the first image acquisition module is provided at a position corresponding to the first position A, the second image acquisition module is provided at a position corresponding to the second position B, the first position A and the second position B have a first preset space D3, and a second preset distance L is provided between the first image acquisition module and the second image acquisition module.

The image processing module performs image processing on the first image to obtain a first depth of field, wherein the first depth of field value is a depth of field value D1 of a first position A in the first image; the image processing module performs image processing on the second image to obtain a second depth of field, wherein the second depth of field value is a depth of field value D2 of a second position B in the second image. The specific way for the image processing module to obtain the depth of field value can be implemented using an algorithm disclosed in the art, which can be implemented by a person skilled in the art and will not be described in detail herein.

The image processing module obtains the difference D=|D2−D1| of the two depth of field values. According to the difference D of the depth of field value, the distance L between the first image acquisition module and the second image acquisition module and the distance D3 between the first position A and the second position B, the image processing module can obtain the rotation angle amount θ according to the trigonometric function principle. The adjustment control module 504 is used to control the position adjustment mechanism 8 to rotate in the corresponding direction by the rotation angle amount θ, so that the target apparatus 7 and the position adjusting mechanism 8 can be made parallel.

Figure 19:
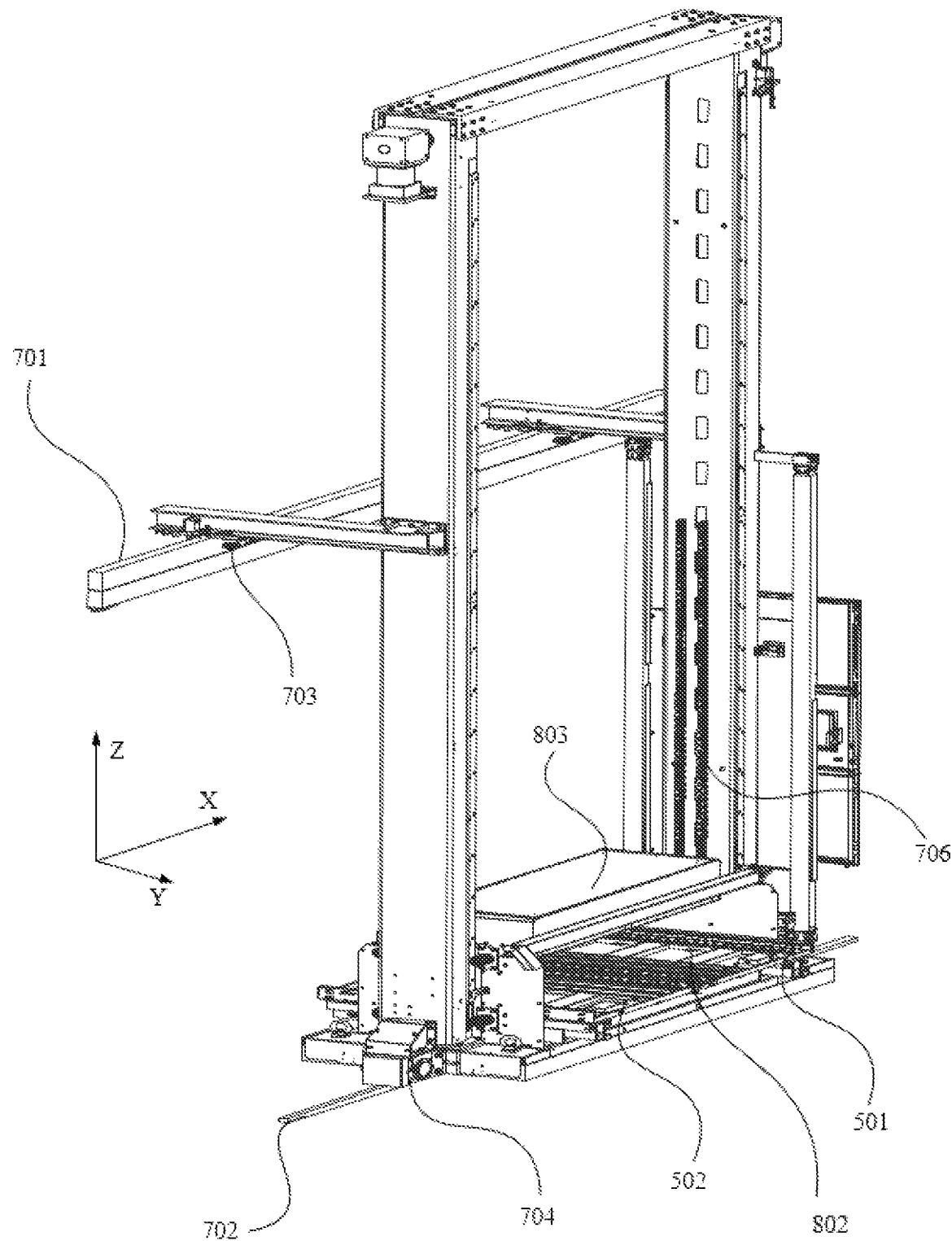
FIG. 19 is a perspective view of a battery swapping device according to Embodiment 9 of the present invention.

This embodiment also provides a battery swapping device for swapping a battery pack for an electric vehicle and including a positioning control system as described above. As shown in FIG. 19, the battery swapping device further comprises an unlocking mechanism 802 and a position adjustment mechanism. The unlocking mechanism is used for unlocking the battery pack locked on the battery bracket, and the adjustment control module is used for at least one of the horizontal displacement amount, the vertical displacement amount and the rotation angle amount obtained by the image processing module to control the position adjustment mechanism to adjust the position of the unlocking mechanism until the unlocking mechanism completes positioning with the unlocking member on the battery bracket.

As an alternative implementation, the first image acquisition module and the second image acquisition module are provided on the unlocking mechanism. The position of the unlocking mechanism is adjusted and unlocked according to the position adjustment amount obtained by the visual positioning system, so that the unlocking mechanism and the unlocking member on the battery bracket are positioned.

The battery swapping device of this embodiment is provided at the battery swapping station, and when the electric vehicle enters the battery swapping station and is parked to a preset parking space, the battery swapping device of this embodiment moves to the electric vehicle under the control of the position adjustment mechanism, and adjusts the position of the unlocking mechanism 802 according to at least one of the horizontal displacement amount, the vertical displacement amount and the rotation angle amount obtained by the positioning control system until the unlocking mechanism 802 and the unlocking member on the battery bracket complete positioning.

As an alternative implementation, a first image acquisition module 501 and a second image acquisition module 502 are provided on the unlocking mechanism 802. The position of the unlocking mechanism 802 are adjusted and unlocked according to the position adjustment amount obtained by the positioning control system, i.e., the unlocking mechanism 802 and the unlocking member on the battery bracket can be positioned. The first image acquisition module 501 and the second image acquisition module 502 are provided on the unlocking mechanism 802, and then the position information of the battery bracket obtained by the positioning control system directly reflects the position relationship between the locking mechanism and the battery bracket, which is helpful to improve the positioning accuracy and facilitate the battery swapping operation.

Specifically, the position adjustment mechanism comprises a control unit, a horizontal movement unit, a vertical movement unit, and a rotation unit; the control unit is communicatively connected to the visual positioning system to control the horizontal movement unit, the vertical movement unit, or the rotation unit to correspondingly move to the adjustment position according to at least one of the horizontal displacement amount, the vertical displacement amount, and the rotation angle amount.

In an alternative implementation, the initial position of the battery swapping device of this embodiment is matched to the parking space in the battery swapping station. When an electric vehicle is parked in a parking space for battery swap, it is difficult for the parking state of the electric vehicle to coincide with the accurate battery swapping position, but there is a deviation. At this time, the device can position the battery swapping device according to the parking state of the electric vehicle and adjust the position of the battery swapping device to achieve accurate alignment with the electric vehicle to achieve fast and efficient positioning without adjusting the parking position of the electric vehicle and improve the battery swapping efficiency.

Figure 20:
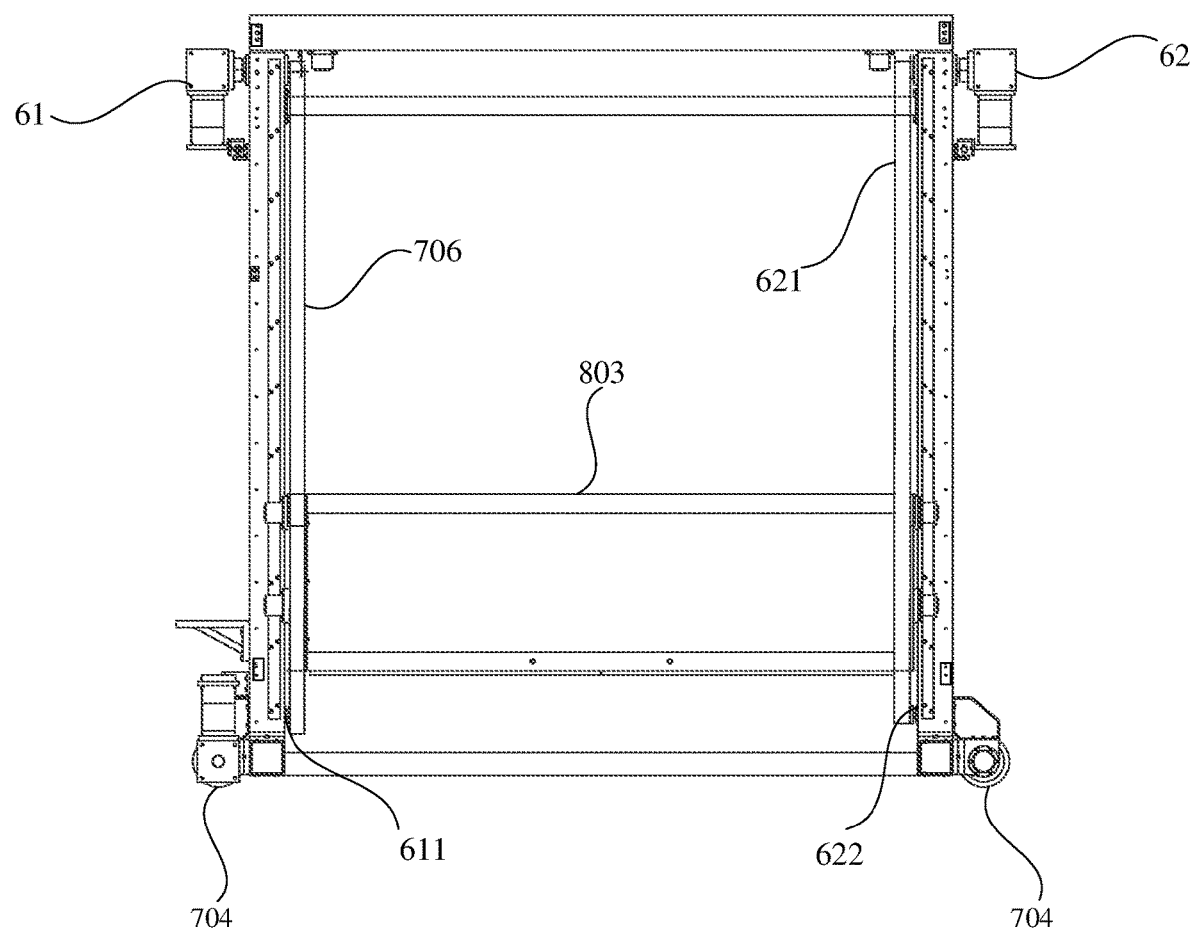
FIG. 20 is a partial front view of a battery swapping device according to Embodiment 9 of the present invention.

To achieve the horizontal movement, the horizontal movement unit comprises a rail, a guide wheel, and a horizontal driver for driving the guide wheel to move along the rail according to the horizontal displacement amount. As an alternative implementation, with reference to FIGS. 19 and 20, the track comprises a top rail 701 and a ground rail 702, and the guide wheel comprises a top rail guide wheel 703 and a ground rail guide wheel 704. A top rail guide wheel 703 is provided corresponding to the top rail 701, and a ground rail guide wheel 704 is provided corresponding to the ground rail 702. The horizontal drivers respectively drive the top rail guide wheels 703 to move along the top rail 701 in the X-axis direction (i.e. horizontal direction) and drive the ground rail guide wheels 704 to move along the ground rail 702, thereby achieving horizontal movement of the unlocking mechanism. In FIG. 19, the X-axis, the Y-axis, and the Z-axis are perpendicular to each other. The frame of the battery swapping actuating mechanism 803 is shown in FIG. 20, and a specific structure is not shown. The specific structure of the battery swapping actuating mechanism can be realized by a person skilled in the art and will not be described in detail herein.

When the electric vehicle is parked in the parking space for battery swap, if there is a deviation between the parking state of the electric vehicle and the accurate battery swapping position in the horizontal direction, the unlocking mechanism is moved according to the horizontal displacement amount, so that the unlocking mechanism can match the position of the battery bracket of the electric vehicle in the horizontal direction, and has a higher accuracy, which provides a guarantee for accurate unlocking.

In this embodiment, the movement of the unlocking mechanism in the horizontal direction can be automatically driven by the horizontal driver according to the horizontal displacement amount, and the efficiency and stability of the movement of the unlocking structure in the horizontal direction can be improved by the cooperation of the rail and the guide rail.

The vertical displacement amount obtained by the visual positioning system comprises a first vertical displacement amount and a second vertical displacement amount, wherein the first vertical displacement amount is obtained according to the first image, and the second vertical displacement amount is obtained according to the second image.

As a specific implementation, the vertical movement unit comprises a first vertical driver 61, a second vertical driver 62, a first lifting mechanism, a second lifting mechanism and a battery swapping actuating mechanism 803, wherein the first vertical driver is connected to the first lifting mechanism, the second vertical driver is connected to the second lifting mechanism, and the first lifting mechanism and the second lifting mechanism are respectively connected to two ends of the battery swapping actuating mechanism to drive the two ends of the battery swapping actuating mechanism to lift and move; the first vertical driver is used for driving the first lifting mechanism according to the first vertical displacement amount, and the second vertical driver is used for driving the second lifting mechanism according to the second vertical displacement amount.

Specifically, the first lifting mechanism comprises a first chain 706 and a correspondingly provided first sprocket 611, wherein the first chain 706 drives the first sprocket 611 to move in a vertical direction (i.e., a Z-axis direction) under the drive of the first vertical driver 61 to drive the battery swapping actuating mechanism 803 to move in the vertical direction. The second lifting mechanism comprises a second chain 621 and a correspondingly provided second sprocket 622, wherein the second chain 621 drives the second sprocket 622 to move in a vertical direction under the drive of the second vertical driver 62 to drive the battery swapping actuating mechanism 803 to move in the vertical direction.

When the electric vehicle is parked in the parking space to battery swap, if there is a deviation between the parking state of the electric vehicle and the accurate battery swapping position in the vertical direction, the unlocking mechanism is moved according to the vertical displacement amount, so that the unlocking mechanism can match the position of the battery bracket of the electric vehicle in the vertical direction, and has a higher accuracy, which provides a guarantee for accurate unlocking.

In this embodiment, the first vertical driver and the second vertical driver can automatically drive the first lifting mechanism and the second lifting mechanism to lift according to the first vertical displacement amount and the second vertical displacement amount, respectively to drive the two ends of the battery swapping actuating mechanism to lift, thereby further driving the two ends of the unlocking mechanism connected thereto to lift to adjust the position of the unlocking mechanism in the vertical direction, and further improving the stability of the unlocking mechanism when adjusting the position in the vertical direction.

Figure 21:
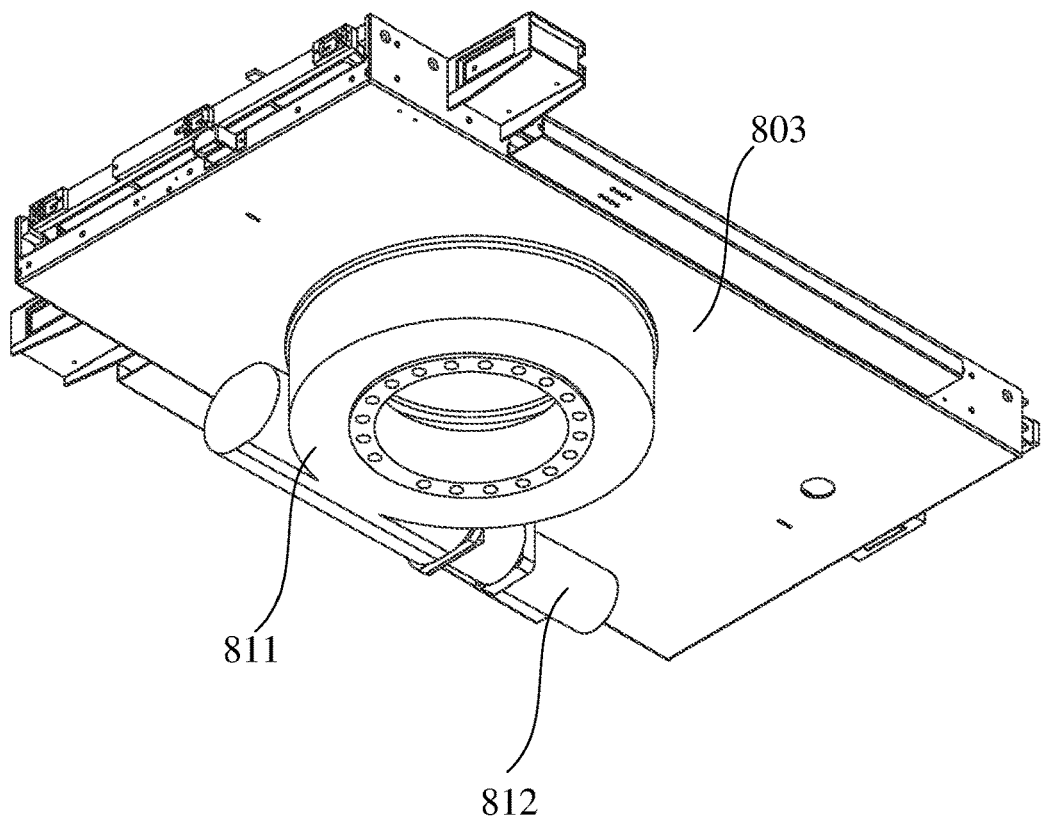
FIG. 21 is a schematic view of a rotation unit of the battery swapping device according to Embodiment 9 of the present invention.

In an alternative implementation, shown with reference to FIG. 21, the rotation unit comprises a turntable 811 sleeved at the bottom of the battery swapping actuating mechanism 803, and a rotation driver 812 connected to the turntable 811 and used for driving the turntable 811 to rotate the battery swapping actuating mechanism 803 according to the rotation angle amount.

When the electric vehicle is parked in the parking space for battery swap, if there is an angular deviation between the parking state of the electric vehicle and the accurate battery swapping position, it is difficult to align the unlocking target after the unlocking apparatus or the like is extended, or it is difficult to align the battery bracket after the battery swapping actuating mechanism is extended. The battery swapping device of the present embodiment is capable of obtaining a parking state of the electric vehicle and an accurate angular deviation of the battery swapping position, for example, the angle θ shown in FIG. 17, by the visual positioning system, and the posture of the battery swapping device is adjusted with the angle θ as the rotation angle amount, so that the posture of the battery swapping device matches the parking state of the electric vehicle, so that the unlocking mechanism is aligned with the unlocking member on the battery bracket, thereby achieving an efficient and accurate battery swapping operation.

In this embodiment, the rotation driver can automatically drive the turntable to rotate according to the rotation angle amount to drive the battery swapping actuating mechanism to rotate, thereby further driving the unlocking mechanism connected thereto to rotate to adjust the position of the unlocking mechanism in the angle, and further improving the stability of the unlocking mechanism when adjusting the angle.

The present embodiment provides a battery swapping device and a positioning control system thereof, which can automatically and accurately obtain the accurate position of a battery swapping vehicle and a battery bracket thereof, so that the battery swapping device can accurately perform a corresponding operation on a battery pack of the battery swapping vehicle, thereby greatly improving the accuracy of battery swapping and thus greatly improving the efficiency of battery swap.

In this Embodiment 9, the structure and function of the first image acquisition module are the same as those of the first visual sensor in Embodiment 1, and the structure and function of the second image acquisition module in this embodiment are the same as those of the second visual sensor in Embodiment 1.

In this Embodiment 9, the structure and function of the image processing module are the same as those of the position obtaining unit in the Embodiment 1.

Embodiment 10

Figure 18:
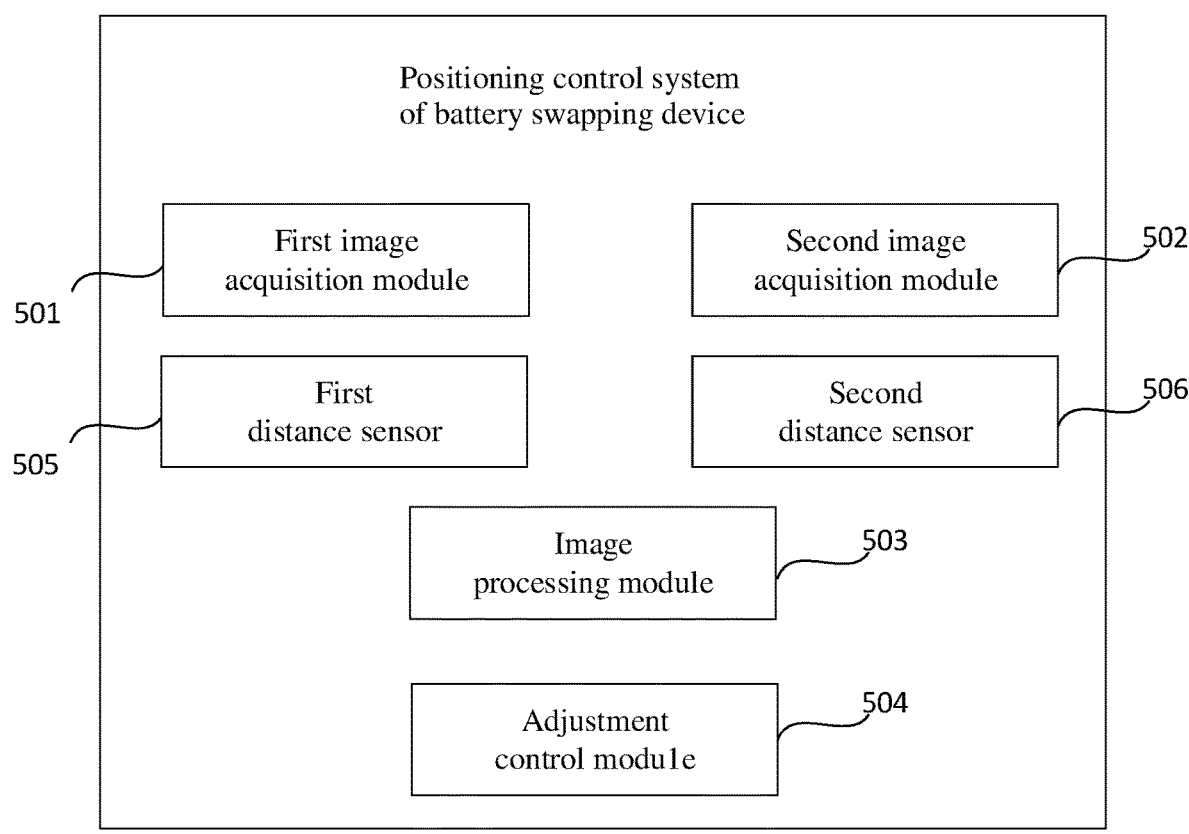
FIG. 18 is a schematic diagram of a configuration of a positioning control system of a battery swapping device according to Embodiment 10 of the present invention.

On the basis of Embodiment 9, the positioning control system further comprises at least two distance sensors, as shown in FIG. 18, the at least two distance sensors comprising a first distance sensor 505 and a second distance sensor 506.

In this embodiment, the number and the position of the distance sensors are not specifically limited, and can be adjusted and selected accordingly according to actual requirements.

As an alternative implementation, as shown with reference to FIG. 17, in a manner similar to the rotation angle amount θ in Embodiment 9, when the first image acquisition module and the second image acquisition module are provided on the position adjustment mechanism 8, the first distance sensor 505 (assuming overlapping with the position of the first image acquisition module) is provided at a position corresponding to the first position A, the second distance sensor 506 (assuming overlapping with the position of the second image acquisition module) is provided at a position corresponding to the second position B, a first preset space D3 is provided between the first position A and the second position B, and a second preset distance L is provided between the first distance sensor and the second distance sensor.

A first distance sensor for detecting a distance value D1 to a target apparatus; the second distance sensor is used to detect a distance value D2 from the target apparatus. The way for the distance sensor to detect distance can be implemented using algorithms disclosed in the art and can be implemented by a person skilled in the art and will not be described in detail herein.

The image processing module obtains the difference $D=|D2-D1|$ of the two distance values. The image processing module D, the distance L between the first distance sensor and the second distance sensor, and the distance D3 between the first position A and the second position B, the image processing module can obtain the rotation angle amount θ according to the trigonometric function principle. The adjustment control module 504 is used to control the position adjustment mechanism 8 to rotate in the corresponding direction by the rotation angle amount θ, so that the target apparatus 7 and the position adjusting mechanism 8 can be made parallel.

Embodiment 11

In order to overcome the above drawbacks currently existing, this embodiment provides a battery swapping control method, in particular a positioning control method of a battery swapping device, the method comprising the steps of: image capturing a first position and a second position of the vehicle to obtain a first image and a second image; performing image processing on the first image and the second image to obtain a position adjustment amount; and controlling adjustment of the position of the battery swapping device in accordance with the position adjustment amount to complete positioning of the battery swapping device with the battery swapping vehicle.

In this embodiment, the positioning control method can automatically and accurately obtain an accurate position of the battery swapping vehicle, so that the battery swapping device can be accurately positioned with the battery bracket of the battery swapping vehicle for the disassembly and assembly of the battery pack, thereby greatly improving the accuracy and efficiency of the battery exchange.

Embodiment 12

Figure 22:
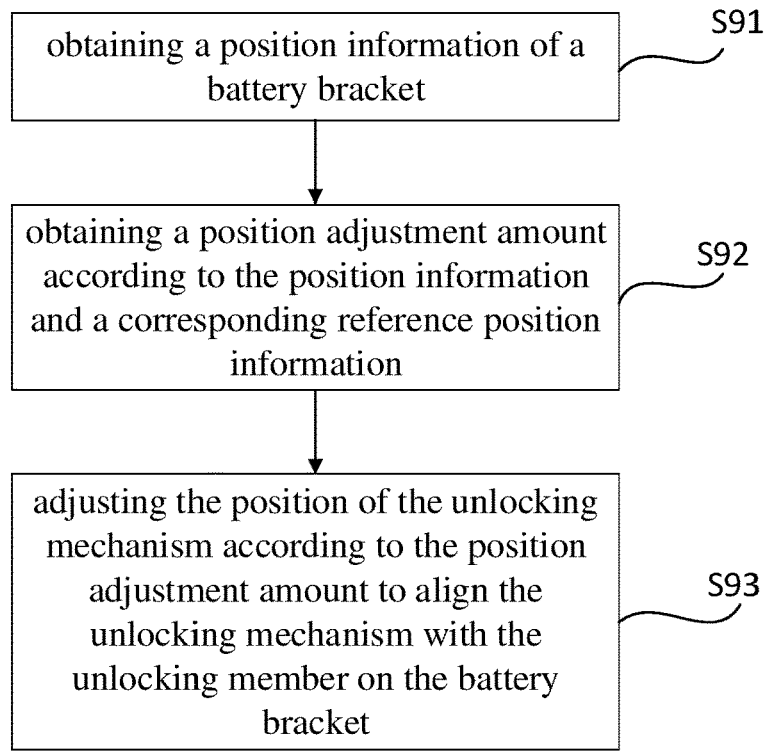
FIG. 22 is a flow diagram of a positioning control method for a battery swapping device according to Embodiment 12 of the present invention.

The present embodiment provides a battery swapping control method, in particular, a positioning control method of a battery swapping device. Referring to FIG. 22, the positioning control method comprises the following steps:
  step S91, obtaining a position information of a battery bracket.
  Step S92, obtaining a position adjustment amount according to the position information and a corresponding reference position information.

Step S93, adjusting the position of the unlocking mechanism according to the position adjustment amount to align the unlocking mechanism with the unlocking member on the battery bracket.

In an alternative implementation, the positioning control method is implemented using the battery swapping device of Embodiment 10. Wherein the positioning control system obtains a position information of the battery bracket, and obtains a position adjustment amount according to the position information and a corresponding reference position information. Then, the position adjustment mechanism adjusts the position of the unlocking mechanism 802 according to the position adjustment amount to align the unlocking mechanism 802 with the unlocking member on the battery bracket to realize unlocking and battery swap.

Embodiment 13

On the basis of Embodiment 12, this embodiment provides a battery swapping control method, in particular, a positioning control method of a battery swapping device. As an alternative implementation, the positioning control method is implemented using the battery swapping device of Embodiment 10.

Figure 23:
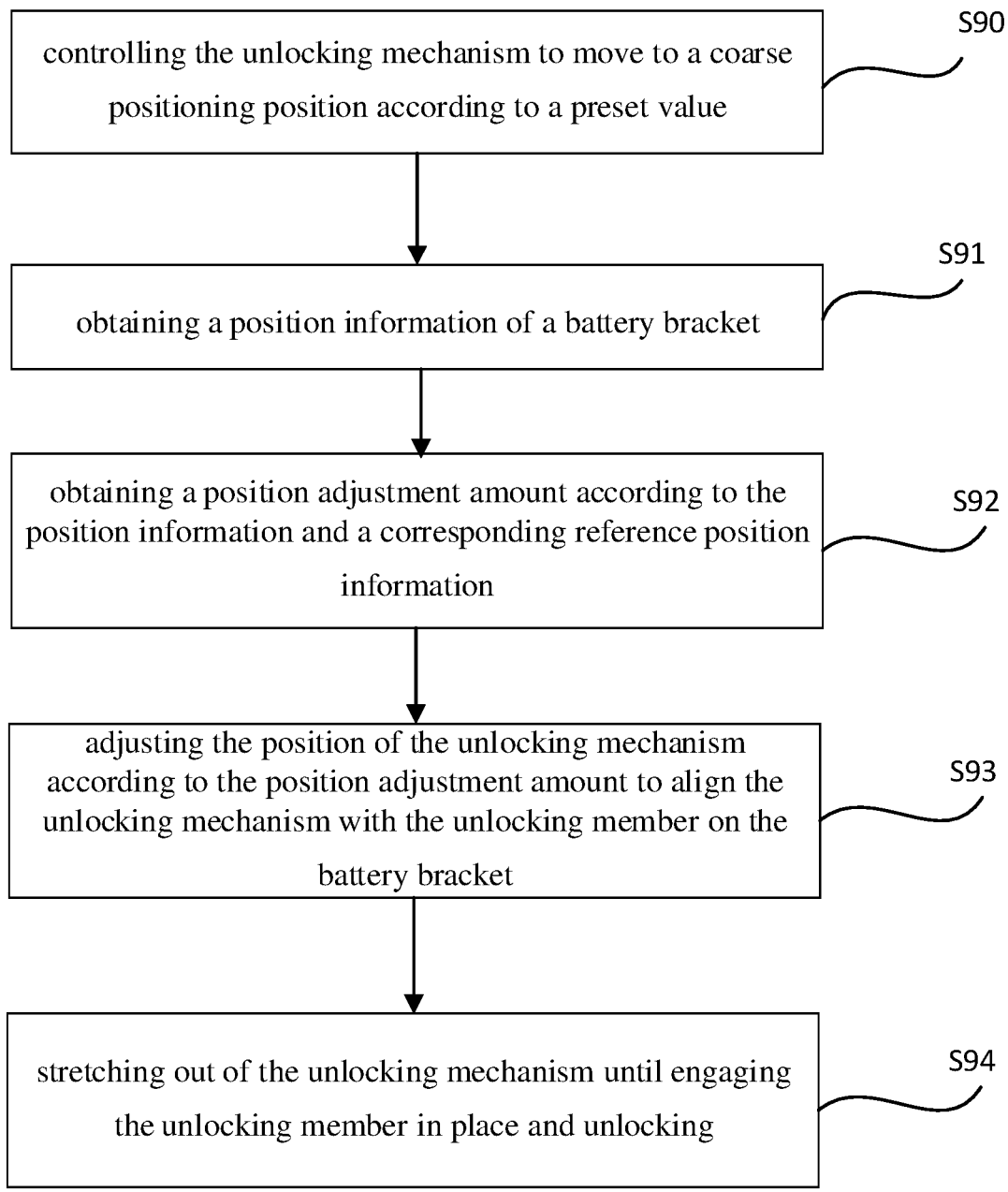
FIG. 23 is a flow diagram of a positioning control method for a battery swapping device according to Embodiment 13 of the present invention.

Referring to FIG. 23, before step S91, the positioning control method further comprises the following steps:

step S90, controlling the unlocking mechanism to move to a coarse positioning position according to a preset value.

By driving the horizontal movement unit and the vertical movement unit, the unlocking mechanism can be controlled to move to a preset coarse positioning position. In particular, the battery swapping device is provided at a battery swapping station. When the vehicle enters the battery swapping station to swap the battery, the vehicle is parked to the corresponding parking space. The preset coarse positioning position corresponds to a corresponding parking space. When the unlocking mechanism 802 is moved to the preset coarse positioning position, the positional relationship between the unlocking mechanism 802 and the battery bracket of the vehicle has reached the estimated range. Then, according to the positioning of the battery bracket by the positioning control system, the unlocking mechanism 802 and the unlocking member on the battery bracket can be accurately positioned.

Figure 24:
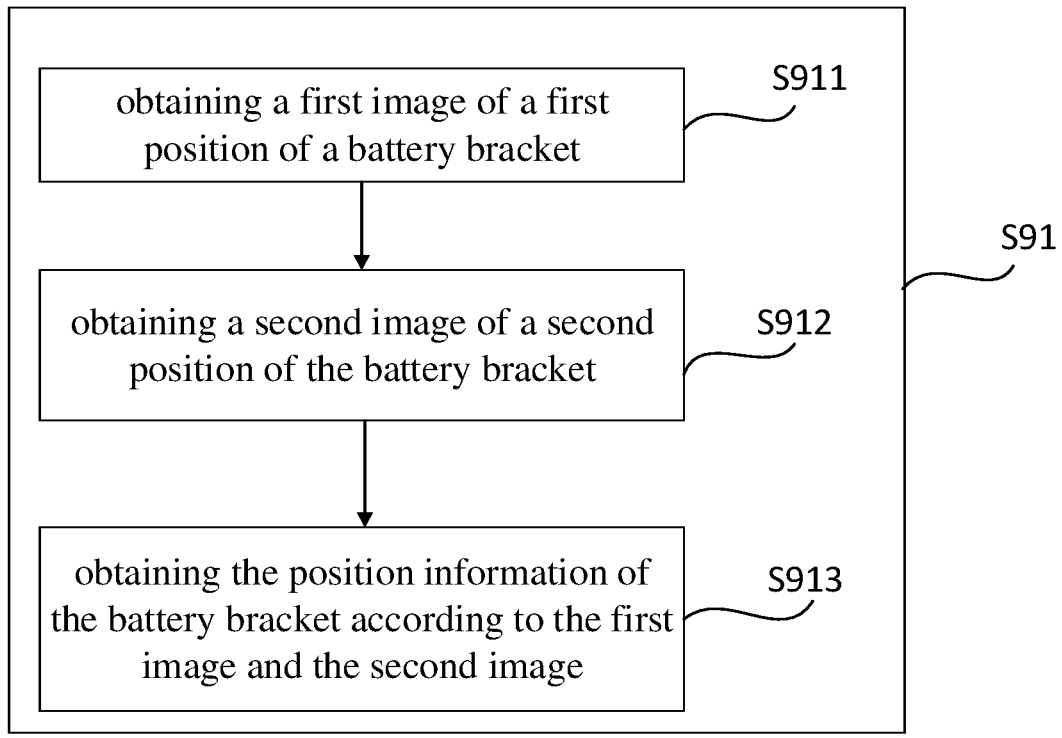
FIG. 24 is a flow diagram of step S91 of the positioning control method of the battery swapping device according to Embodiment 13 of the present invention.

In an alternative embodiment, as shown in FIG. 24, step S91 comprises:

step S911, obtaining a first image of a first position of a battery bracket;

step S912, obtaining a second image of a second position of the battery bracket; and step S913, obtaining the position information of the battery bracket according to the first image and the second image.

Figure 14:
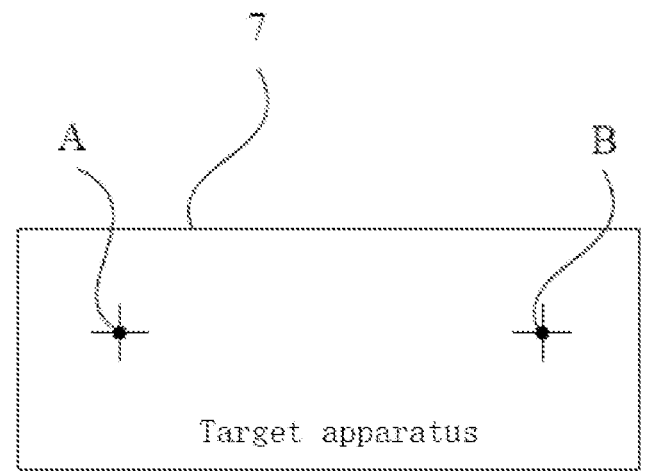
FIG. 14 is a schematic diagram of obtaining a position information of a target apparatus of the positioning control system according to Embodiment 9 of the present invention.

During the battery swap, the battery bracket serves as a target apparatus to be positioned by the visual positioning system, and a first position A and a second position B are preset on the battery bracket. With reference to FIG. 14, a first image acquisition module 501 obtains a first image of a target apparatus in the direction indicated by an arrow, wherein the first image comprises a first position A on the target apparatus; the second image acquisition module 502 obtains a second image of the target apparatus in the direction indicated by the arrow, the second image including a second position B on the target apparatus. After receiving the first image and the second image, the image processing module 503 performs image processing to obtain a position information of the target apparatus.

When an electric vehicle is parked in a parking space for battery swap, it is difficult for the parking state of the electric vehicle to coincide with the accurate battery swapping position, but there is a deviation. At this time, according to the positioning control method of this embodiment, the battery swapping device can be positioned according to the parking state of the electric vehicle and the position of the battery swapping device can be adjusted to achieve accurate alignment with the electric vehicle, so that fast and efficient positioning can be achieved without adjusting the parking position of the electric vehicle and the battery swapping efficiency can be improved.

Specifically, step S92 comprises:
  obtaining a horizontal displacement amount according to a first image and a first reference image corresponding to a first position or a second image and a second reference image corresponding to a second position; or
  respectively obtaining a first vertical displacement amount and a second vertical displacement amount according to the first image and the first reference image and the second image and the second reference image; or
  obtaining a rotation angle amount based on the depth of field value of the first position in the first image and the depth of field value of the second position in the second image.

As another alternative implementation, step S92 further comprises:
  obtaining the rotation angle amount based on the first distance obtained by the first distance sensor 505 and the second distance obtained by the second distance sensor 506.

As an alternative implementation, in step S92, by analyzing the first reference image G1, the image processing module obtains the position of the corresponding pixel in the first reference image G1 of the first position A on the target apparatus in the first reference image G1 as a reference for positioning, for convenience of description, referred to as "target position".

By analyzing the first image G11, the image processing module obtains the position of the corresponding pixel in the first image G11 of the first position A on the target apparatus in the first image G11, referred to as "real-time position" for case of explanation.

According to the image processing algorithm, the image processing module obtains the first horizontal displacement amount and the first vertical displacement amount according to the target position and the real-time position. By moving the first image acquisition module by the first horizontal displacement amount and the first vertical displacement amount, it is possible for the first image acquisition module to take an image that is consistent with the first reference image G1.

Similarly, the image processing module obtains a second horizontal displacement amount and a second vertical displacement amount from the second image and the pre-stored second reference image. By moving the second image acquisition module a second horizontal displacement amount and a second vertical displacement amount, the second image acquisition module may be caused to capture an image that is consistent with the second reference image.

Referring to FIGS. 19 and 20, horizontal drivers respectively drive the top rail guide wheels 703 to move along the top rail 701 in the X-axis direction (i.e. horizontal direction) and drive the ground rail guide wheels 704 to move along the ground rail 702, thereby achieving horizontal movement of the unlocking mechanism 802.

When the electric vehicle is parked in the parking space for battery swap, if there is a deviation between the parking state of the electric vehicle and the accurate battery swapping position in the horizontal direction, the unlocking mechanism is moved according to the horizontal displacement amount, so that the unlocking mechanism can match the position of the battery bracket of the electric vehicle in the horizontal direction, and has a higher accuracy, which provides a guarantee for accurate unlocking.

Referring to FIGS. 19 and 20, the first chain 706 moves the first sprocket 611 in the vertical direction (i.e. the Z-axis direction) by being driven by the first vertical driver 61, and the second chain 621 moves the second sprocket 622 in the vertical direction by being driven by the second vertical driver 62 to move the battery swapping actuating mechanism 803 in the vertical direction.

When the electric vehicle is parked in the parking space to battery swap, if there is a deviation between the parking state of the electric vehicle and the accurate battery swapping position in the vertical direction, the unlocking mechanism is moved according to the vertical displacement amount, so that the unlocking mechanism can match the position of the battery bracket of the electric vehicle in the vertical direction, and has a higher accuracy, which provides a guarantee for accurate unlocking.

The image processing module obtains a rotation angle amount based on the depth of field value of the first position in the first image and the depth of field value of the second position in the second image. Referring to FIG. 21, the rotation driver 812 drives the turntable 811 according to the amount of battery swapping actuating mechanism 803 according to the rotation angle amount.

When the electric vehicle is parked in the parking space for battery swap, if there is an angular deviation between the parking state of the electric vehicle and the accurate battery swapping position, it is difficult to align the unlocking target after the unlocking apparatus or the like is extended, or it is difficult to align the battery bracket after the battery swapping actuating mechanism is extended. According to the positioning control method of this embodiment, it is possible to obtain a parking state of the electric vehicle and an accurate angular deviation of the battery swapping position, for example, the angle θ shown in FIG. 17, by the visual positioning system, and the posture of the battery swapping device is adjusted with the angle θ as the rotation angle amount, so that the posture of the battery swapping device matches the parking state of the electric vehicle, so that the unlocking mechanism is aligned with the unlocking member on the battery bracket, thereby achieving an efficient and accurate battery swapping operation.

After the step of adjusting the position of the unlocking mechanism according to the position adjustment amount to align the unlocking mechanism with the unlocking member on the battery bracket, in step 94, the unlocking mechanism 802 is extended until it is engaged with the unlocking member and unlocked, thereby performing a battery swapping operation.

As an alternative implementation, the stretching out of the unlocking mechanism until engaging the unlocking member in place and unlocking comprises:

stretching out of the unlocking mechanism from a side of the battery swapping vehicle toward the battery swapping vehicle until engaging the unlocking member in place and unlocking.

The battery swapping operation is convenient and efficient when it is performed on the side surface of the battery swapping vehicle.

The present embodiment provides a positioning control method of a battery swapping device that can automatically and accurately obtain an accurate position of a battery swapping vehicle and a battery bracket thereof, so that the battery swapping device can be accurately positioned with the battery bracket of the battery swapping vehicle for the disassembly and assembly of the battery pack, thereby greatly improving the accuracy and efficiency of the battery exchange.

Embodiment 14

Figure 25:
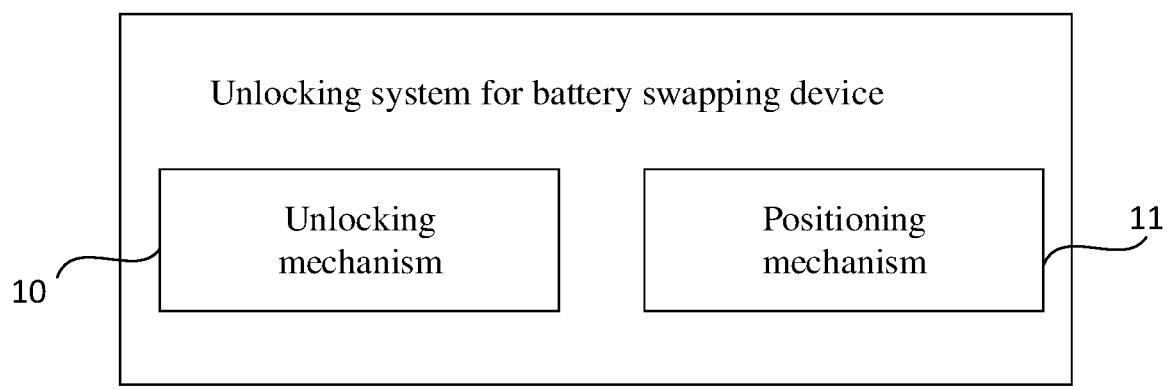
FIG. 25 is a block diagram of an unlocking system of a battery swapping device according to Embodiment 14 of the present invention.

The present embodiment provides a battery changing apparatus, and in particular, an unlocking system of the battery swapping device. FIG. 25 shows a schematic module view of the unlocking system in this embodiment, comprising an unlocking mechanism 10 and a positioning mechanism 11, wherein the positioning mechanism 11 is used for positioning the position of the unlocking mechanism 10 until it completes positioning with an unlocking member on a battery bracket, and the unlocking mechanism 10 is used for unlocking a battery pack locked on the battery bracket after the positioning mechanism 11 completes positioning.

Figure 26:
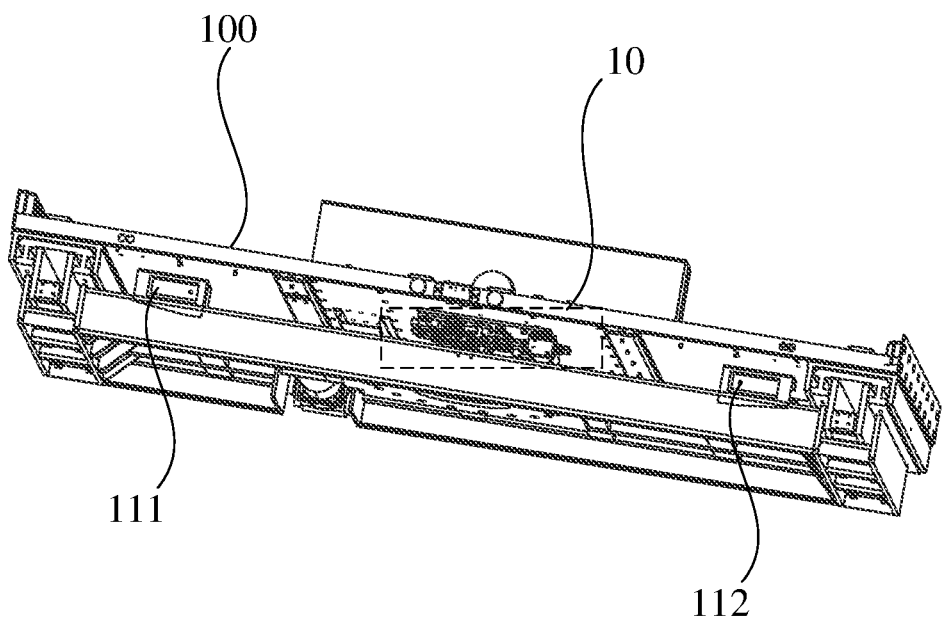
FIG. 26 is a partial structural schematic diagram of a battery swapping device according to Embodiment 14 of the present invention.

FIG. 26 is a schematic diagram of a partial structure of the battery swapping device in this embodiment, including the battery tray 100 and the unlocking mechanism 10 by which the battery pack of the battery bracket is unlocked to be removed from the electric vehicle on the battery tray 100. In order to enable the positioning mechanism 11 to position the unlocking mechanism into the aligned position, the positioning mechanism 11 may be provided on the side of the battery swapping device facing the electricity exchange position, for example, on the side of the unlocking mechanism facing the electricity exchange position.

The present embodiment positions the unlocking mechanism by the positioning mechanism, and controls the unlocking mechanism to unlock the battery pack on the battery bracket when the positioning mechanism completes positioning with the unlocking member on the battery bracket. This embodiment can further precisely adjust the position of the unlocking mechanism only by the positioning mechanism provided on the unlocking mechanism outside the vehicle without adding other detection components in the electric vehicle or the battery outer case of the electric vehicle, so that the unlocking mechanism is located at an accurate unlocking position so that the unlocking mechanism can effectively unlock the battery pack of the electric vehicle, thereby ensuring the efficiency, success and safety of the battery swap.

In this Embodiment 14, the structure and function of the positioning mechanism are identical to those of the visual positioning system of Embodiment 1.

Embodiment 15

Figure 27:
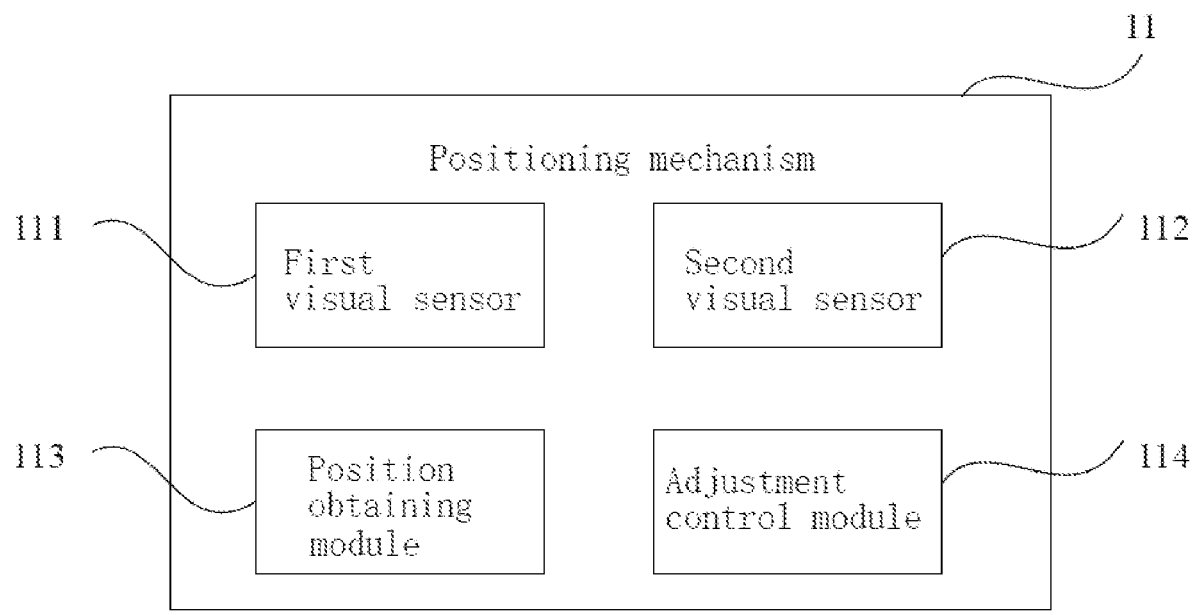
FIG. 27 is a schematic block diagram of the positioning mechanism according to Embodiment 16 of the present invention.

On the basis of Embodiment 14, this embodiment provides a battery swapping device, in particular an unlocking system for a battery swapping device. FIG. 27 shows a block diagram of the positioning module 11 in this embodiment, comprising a first visual sensor 111, a second visual sensor 112, a position obtaining module 113 and an adjustment control module 114.

A first visual sensor 111 for obtaining a first image of a first position of the battery bracket; the second visual sensor 112 is used for obtaining a second image of a second position of the battery bracket. The position obtaining module 113 is used for obtaining a position information of the battery bracket according to the first image and the second image, and obtaining a position adjustment amount according to the position information of the battery bracket and a reference position information of the battery tray. The adjustment control module 114 is used for controlling the adjustment of the position of the battery swapping device to complete the positioning with the unlocking member on the battery bracket according to the position adjustment amount. As shown in FIG. 26, the first visual sensor 111 and the second visual sensor 112 are respectively provided at different positions on the side of the unlocking mechanism facing the power change position.

Figure 28:
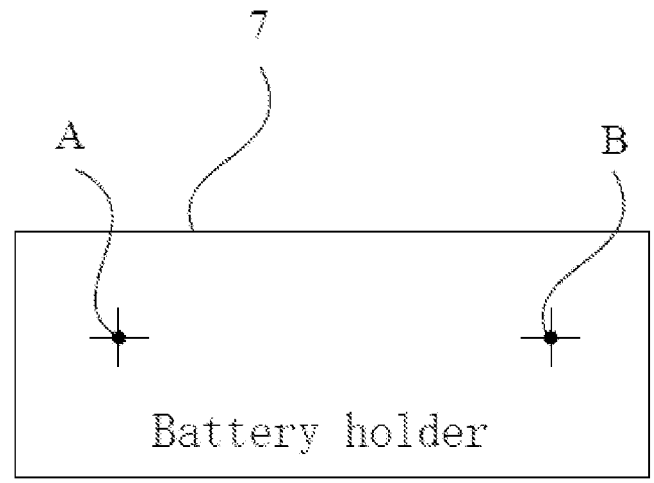
FIG. 28 is a schematic diagram of a module for positioning the positioning mechanism according to the specific scenario according to Embodiment 17 of the present invention.

Specifically, referring to FIG. 28, the first visual sensor 111 obtains a first image of the battery bracket in the direction indicated by the arrow, the first image including a first position A on the battery bracket; the second visual sensor 112 obtains a second image of the battery bracket in the direction indicated by the arrow, the second image comprises a second position B on the battery bracket. After receiving the first image and the second image, the position obtaining module 113 performs image processing to obtain a position information of the battery bracket, and processes the position information of the battery bracket and a reference position information of the battery bracket to obtain a position adjustment amount. The adjustment control module 114 then adjusts the current position of the unlocking mechanism 10 according to the obtained position adjustment amount, so that the unlocking mechanism and the unlocking member complete positioning.

The present embodiment compares the first position and the second position of the image of the battery bracket respectively captured by the two visual sensors with the reference position corresponding to the battery bracket, so that the position adjustment amount of the unlocking mechanism can be obtained, and the adjustment control module further adjusts the position of the unlocking mechanism according to the position adjustment amount, thereby improving the accuracy of positioning the unlocking mechanism before unlocking.

In this embodiment, according to the first position and the second position of the image of the battery bracket respectively captured by the two visual sensors, the first position and the second position are further compared with the reference position corresponding to the battery bracket respectively, so that the position adjustment amount of the unlocking mechanism can be obtained, and the adjustment control module further adjusts the position of the unlocking mechanism according to the position adjustment amount, thereby further improving the accuracy of positioning the unlocking mechanism before unlocking.

In this Embodiment 15, the structure and function of the position obtaining module are the same as those of the position obtaining unit in the Embodiment 1.

Embodiment 16

On the basis of Embodiment 15, this embodiment provides a battery swapping device, in particular an unlocking system for a battery swapping device. Wherein the position obtaining module 113 performs image processing according to an image obtained in real time by the first visual sensor 111 and the second visual sensor 112 and a preset reference image of the unlocking holder to obtain a position adjustment amount.

Figure 29:
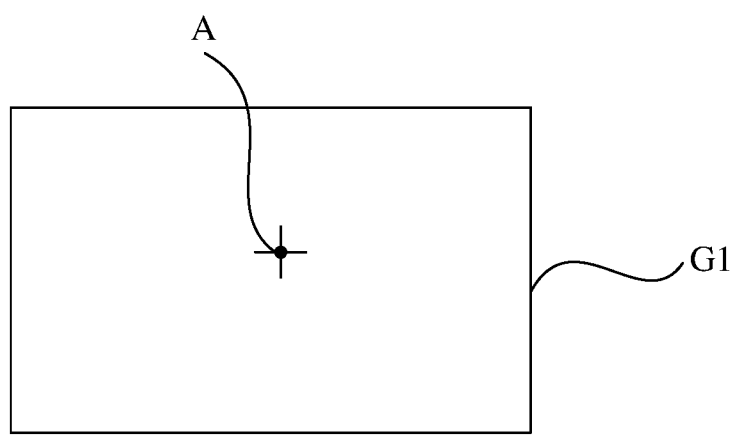
FIG. 29 is a schematic diagram of a first reference image according to Embodiment 16 of the present invention.

In an alternative implementation, the position obtaining module 113 obtains the horizontal displacement amount from the first image and the first reference image. FIG. 29 gives an illustration of the first reference image G1. The first reference image G1 is pre-stored in the position obtaining module 113. The first reference image G1 comprises a first position A on the battery bracket. By analyzing the first reference image G1, the position obtaining module 113 obtains the position of the corresponding pixel in the first reference image G1 of the first position A on the battery bracket in the first reference image G1 as a reference for positioning, which is referred to as "target position" for convenience of explanation. The process of obtaining the target position by the position obtaining module 113 can be implemented by using an algorithm disclosed in the art, which can be implemented by a person skilled in the art and will not be described in detail herein.

Figure 30:
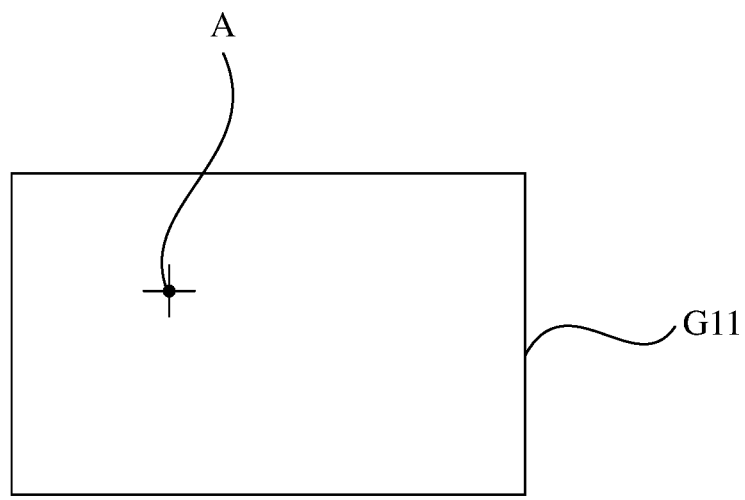
FIG. 30 is a schematic diagram of a first image according to Embodiment 16 of the present invention.

FIG. 30 gives an illustration of the first image G11. The first image G11 comprises a first position A on the battery bracket. By analyzing the first image G11, the position obtaining module 113 obtains the position of the corresponding pixel in the first image G11 of the first position A on the battery bracket in the first image G11, which is referred to as "real-time position" for convenience of explanation. The process of obtaining the target position by the position obtaining unit 113 can be implemented by using an algorithm disclosed in the art, which can be implemented by a person skilled in the art and will not be described in detail herein.

In an alternative implementation, the position obtaining module 113 obtains the horizontal displacement amount from the first image and the first reference image. According to an image processing algorithm, the position obtaining module 113 obtains the first horizontal displacement amount and the first vertical displacement amount of the first visual sensor 111 according to the target position and the real-time position. By moving the first visual sensor 111 by the first horizontal displacement amount and the first vertical displacement amount, it is possible for the first visual sensor 111 to capture an image that is consistent with the first reference image G1. The process of obtaining the first horizontal displacement amount and the first vertical displacement amount of the first visual sensor 111 by the position obtaining module 113 can be realized by using an algorithm disclosed in the art, which can be realized by a person skilled in the art and will not be described in detail herein. The position obtaining module 113 takes a first horizontal displacement amount as a horizontal displacement amount, and can realize a corresponding horizontal displacement by moving a corresponding horizontal displacement amount to match a target apparatus in a horizontal direction; similarly, by moving the corresponding amount of direct displacement, a corresponding direct displacement can be achieved to match the target apparatus in the direct direction.

In another alternative implementation, the position obtaining module 113 obtains the horizontal displacement amount from the second image and the second reference image. Similarly, the position obtaining module 113 obtains a second horizontal displacement amount and a second vertical displacement amount from the second image and the pre-stored second reference image. By moving the second visual sensor 112 by a second horizontal displacement amount and a second vertical displacement amount, it is possible for the second visual sensor 112 to capture an image that is consistent with the second reference image.

In another alternative implementation, the reference position information of the battery bracket is pre-stored in the position obtaining module 113. The position obtaining module 113 obtains a position adjustment amount according to the pre-stored reference position information of the battery bracket and the position information of the battery bracket obtained in real time. Adjusting the first visual sensor 111 and the second visual sensor 112 according to the position adjustment amount may enable the first visual sensor 111 to capture an image that is consistent with the first reference image and enable the second visual sensor 112 to capture an image that is consistent with the second reference image.

Figure 31:
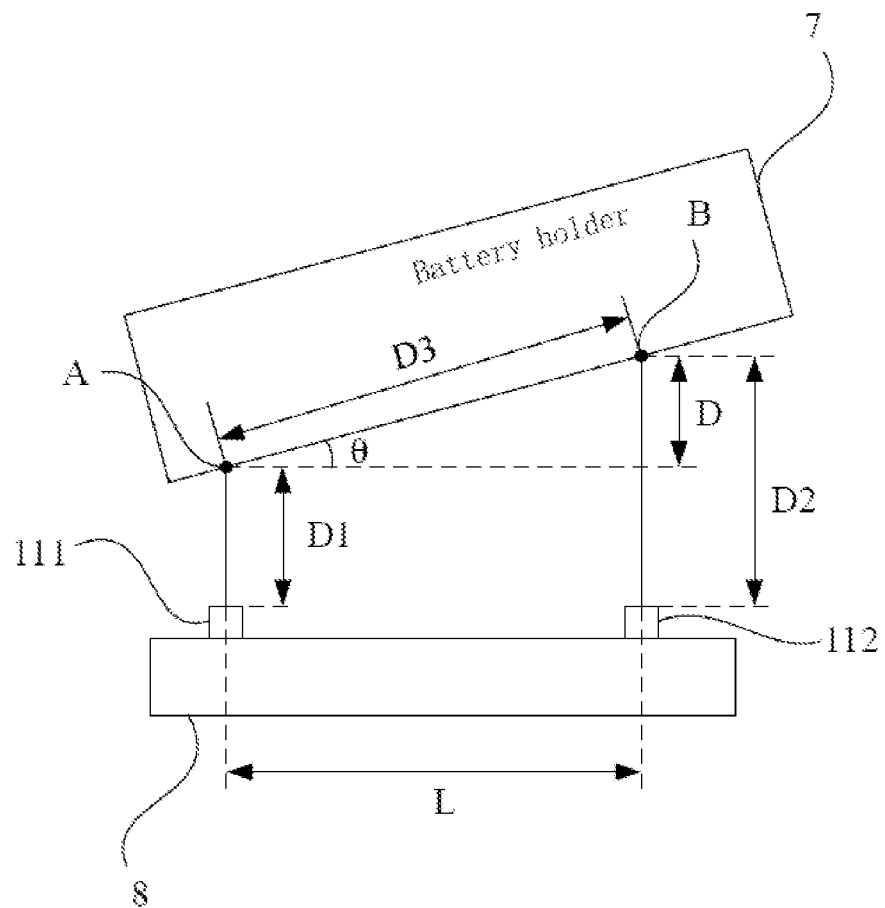
FIG. 31 is a block diagram of the relationship between the adjustment mechanism and the position of the battery bracket in a specific scenario according to Embodiment 16 of the present invention.

As an alternative implementation, referring to FIG. 31, when the first visual sensor 111 and the second visual sensor 112 are provided on the position adjustment mechanism 8, the first visual sensor 111 is provided at a position corresponding to the first position A, the second visual sensor 112 is provided at a position corresponding to the second position B, the first position A and the second position B have a first preset space D3 therebetween, and the first visual sensor 111 and the second visual sensor 112 have a second preset distance L therebetween. The position obtaining module 113 performs image processing on the first image to obtain a first depth of field and a first depth of field value D1 of a first position A in the first image; the position obtaining module 113 performs image processing on the second image to obtain a second depth of field and a second depth of field value D2 of a second position B in the second image. The specific method for obtaining the depth of field value by the position obtaining module 113 can be realized by using an algorithm disclosed in the art, which can be realized by a person skilled in the art and will not be described in detail herein. The position obtaining module 113 obtains the difference D=|D2−D1| of the two depth of field values. According to the difference D of the depth of field values, a distance L between the first visual sensor 111 and the second visual sensor 112 and the distance D3 between the first position A and the second position B, the position obtaining module 113 can obtain a rotation angle amount θ according to the trigonometric function principle. The position adjustment mechanism 8 is rotated in the corresponding direction by the rotation angle amount θ so that the battery bracket 7 and the position adjustment mechanism 8 are parallel to each other.

In this embodiment, the position obtaining module can obtain the horizontal displacement amount of the unlocking mechanism by processing the first image and the first reference image or by processing the second image and the second reference image to improve the accuracy of positioning the unlocking mechanism in the horizontal direction.

In this embodiment, the position obtaining module can obtain a first vertical displacement amount of the unlocking mechanism by processing the first image and the first reference image, and can obtain a second vertical displacement amount of the unlocking structure by processing the second image and the second reference image to improve the accuracy of positioning the unlocking mechanism in the vertical direction.

In the present invention, the position obtaining module can obtain the rotation angle amount of the unlocking mechanism by processing the first depth of field value and a second depth of field value to improve the accuracy of the angular positioning of the unlocking mechanism and further facilitate the alignment of the unlocking mechanism with the unlocking member on the battery bracket.

In this embodiment, by setting a preset space between the first position and the second position and respectively setting the first visual sensor and the second visual sensor at positions corresponding to the first position and the second position, the first image and the second image captured can respectively comprise the first position and the second position, thereby facilitating the position obtaining module to process according to the first position on the first image and the first position on the first reference image and the second position on the second image and the second position on the second reference image to obtain a more accurate position adjustment amount.

Embodiment 17

On the basis of Embodiment 16, this embodiment provides a battery swapping device, in particular an unlocking system for a battery swapping device.

The battery swapping device of this embodiment is provided at the battery swapping station, and when the electric vehicle enters the battery swapping station and is parked to a preset parking space, the adjustment control module 114 controls the battery swapping device to move to the electric vehicle, and adjusts the position of the unlocking mechanism 10 according to at least one of the horizontal displacement amount, the vertical displacement amount and the rotation angle amount obtained by the position obtaining module 113 until the unlocking mechanism 10 and the unlocking member on the battery bracket complete positioning.

Figure 32:
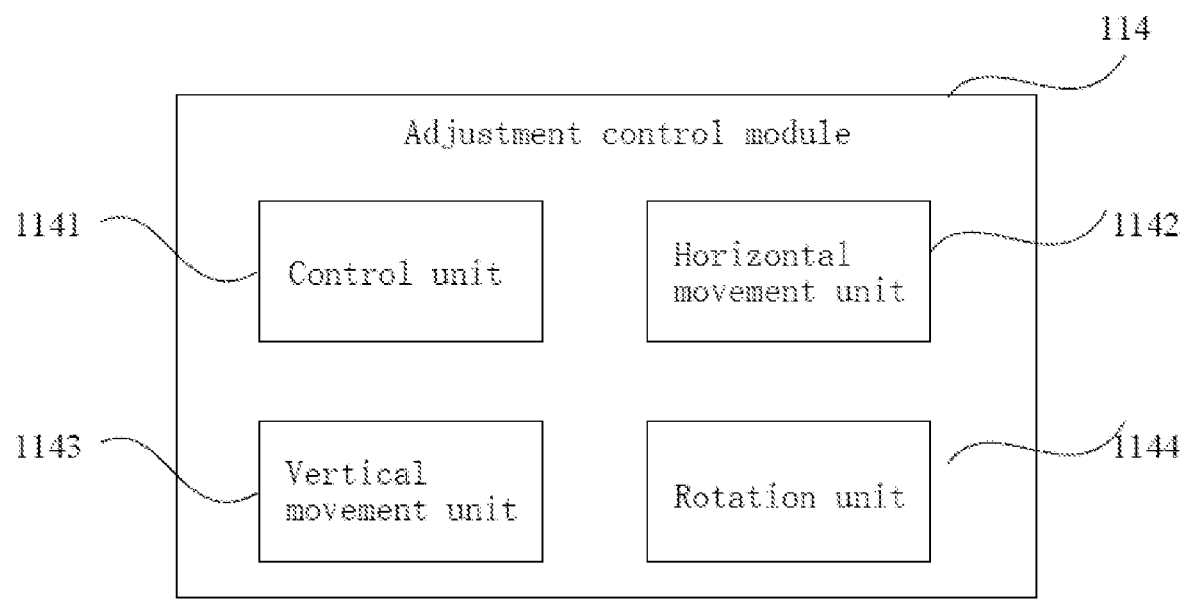
FIG. 32 is a block diagram of an adjustment control module according to Embodiment 17 of the present invention.

As shown in FIG. 32, the adjustment control module 114 specifically comprises a control unit 1141, a horizontal movement unit 1142, a vertical movement unit 1143 and a rotation unit 1144, wherein the control unit 1141 is used for correspondingly controlling the horizontal movement unit 1142, the vertical movement unit 1143 or the rotation unit 1144 to move to an adjustment position according to at least one of the horizontal displacement amount, the vertical displacement amount and the rotation angle amount.

Figure 33:
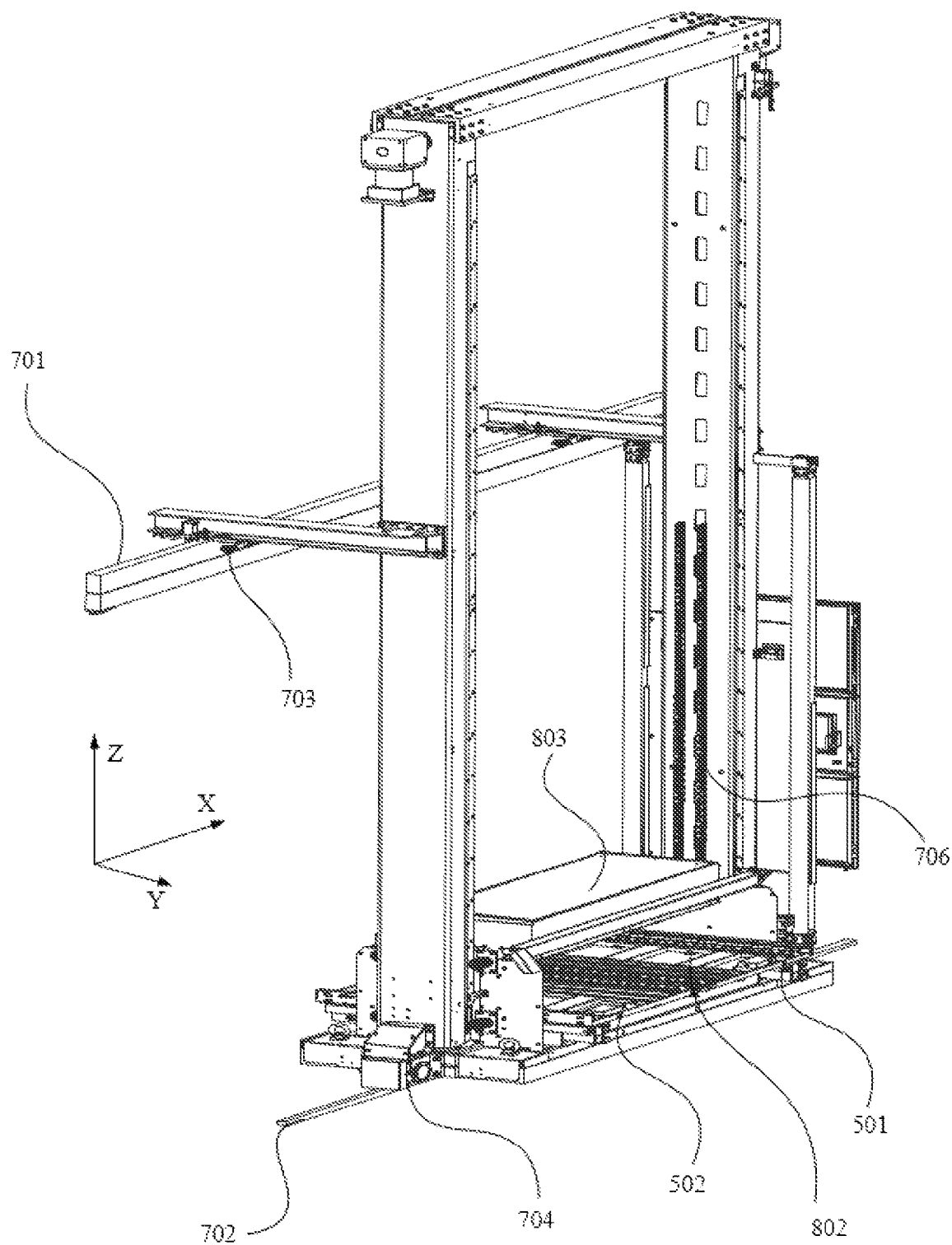
FIG. 33 is a schematic diagram of the overall structure of a battery swapping device according to Embodiment 17 of the present invention.
Figure 34:
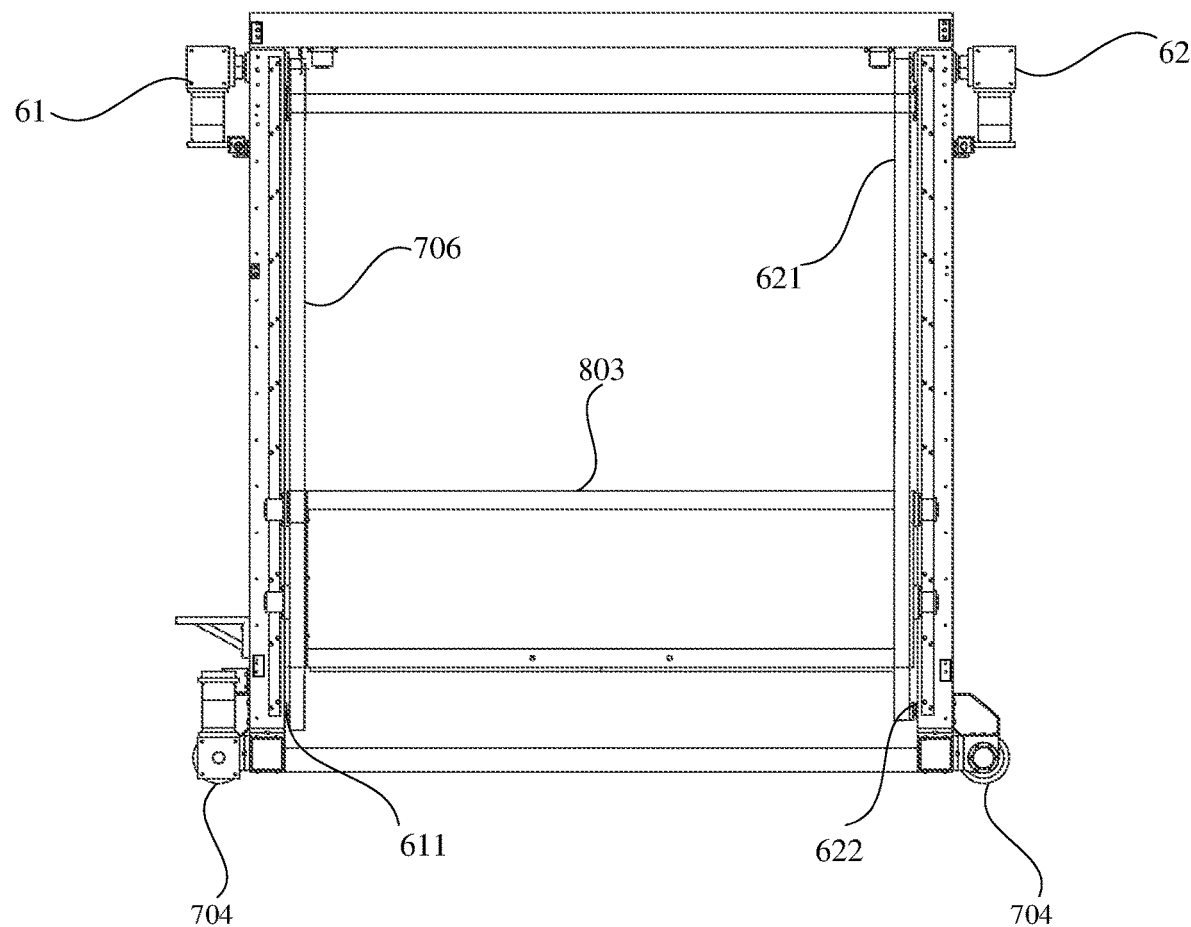
FIG. 34 is a perspective view of the overall structure of a battery swapping device according to Embodiment 17 of the present invention.

To achieve the horizontal movement, the horizontal movement unit 1142 comprises a rail, a guide wheel, and a horizontal driver for driving the guide wheel to move along the rail according to the horizontal displacement amount. As an alternative implementation, referring to FIGS. 33 and 34, the track comprises a top rail 701 and a ground rail 702, and the guide wheel comprises a top rail guide wheel 703 and a ground rail guide wheel 704. A top rail guide wheel 703 is provided corresponding to the top rail 701, and a ground rail guide wheel 704 is provided corresponding to the ground rail 702. The horizontal drivers respectively drive the top rail guide wheels 703 to move along the top rail 701 in the X-axis direction (i.e. horizontal direction) and drive the ground rail guide wheels 704 to move along the ground rail 702, thereby achieving horizontal movement of the unlocking mechanism. In FIG. 33, the X-axis, the Y-axis, and the Z-axis are perpendicular to each other. The frame of the battery swapping actuating mechanism 803 is shown in FIG. 34, and a specific structure is not shown. The specific structure of the battery swapping actuating mechanism can be realized by a person skilled in the art and will not be described in detail herein.

When the electric vehicle is parked in the parking space for battery swap, if there is a deviation between the parking state of the electric vehicle and the accurate battery swapping position in the horizontal direction, the unlocking mechanism is moved according to the horizontal displacement amount, so that the unlocking mechanism can match the position of the battery bracket of the electric vehicle in the horizontal direction, and has a higher accuracy, which provides a guarantee for accurate unlocking. The vertical displacement amount obtained by the position obtaining module 113 comprises a first vertical displacement amount and a second vertical displacement amount, wherein the first vertical displacement amount is obtained according to the first image, and the second vertical displacement amount is obtained according to the second image.

As a specific implementation, the vertical movement unit 1143 comprises a first vertical driver 61, a second vertical driver 62, a first lifting mechanism, a second lifting mechanism and a battery swapping actuating mechanism 803, wherein the first vertical driver 61 is connected to the first lifting mechanism, the second vertical driver 62 is connected to the second lifting mechanism, and the first lifting mechanism and the second lifting mechanism are respectively connected to two ends of the battery swapping actuating mechanism to drive the two ends of the battery swapping actuating mechanism to lift and move; the first vertical driver 61 is used for driving the first lifting mechanism according to a first vertical displacement amount, and the second vertical driver 62 is used for driving the second lifting mechanism according to a second vertical displacement amount.

In particular implementation, the first lifting mechanism comprises a first chain 706 and a correspondingly provided first sprocket 611, wherein the first chain 706 drives the first sprocket 611 to move in a vertical direction (i.e., a Z-axis direction) under the drive of the first vertical driver 61 to drive the battery swapping actuating mechanism 803 to move in the vertical direction. The second lifting mechanism comprises a second chain 621 and a correspondingly provided second sprocket 622, wherein the second chain 621 drives the second sprocket 622 to move in a vertical direction under the drive of the second vertical driver 62 to drive the battery swapping actuating mechanism 803 to move in the vertical direction.

When the electric vehicle is parked in the parking space to battery swap, if there is a deviation between the parking state of the electric vehicle and the accurate battery swapping position in the vertical direction, the unlocking mechanism is moved according to the vertical displacement amount, so that the unlocking mechanism can match the position of the battery bracket of the electric vehicle in the vertical direction, and has a higher accuracy, which provides a guarantee for accurate unlocking.

Figure 35:
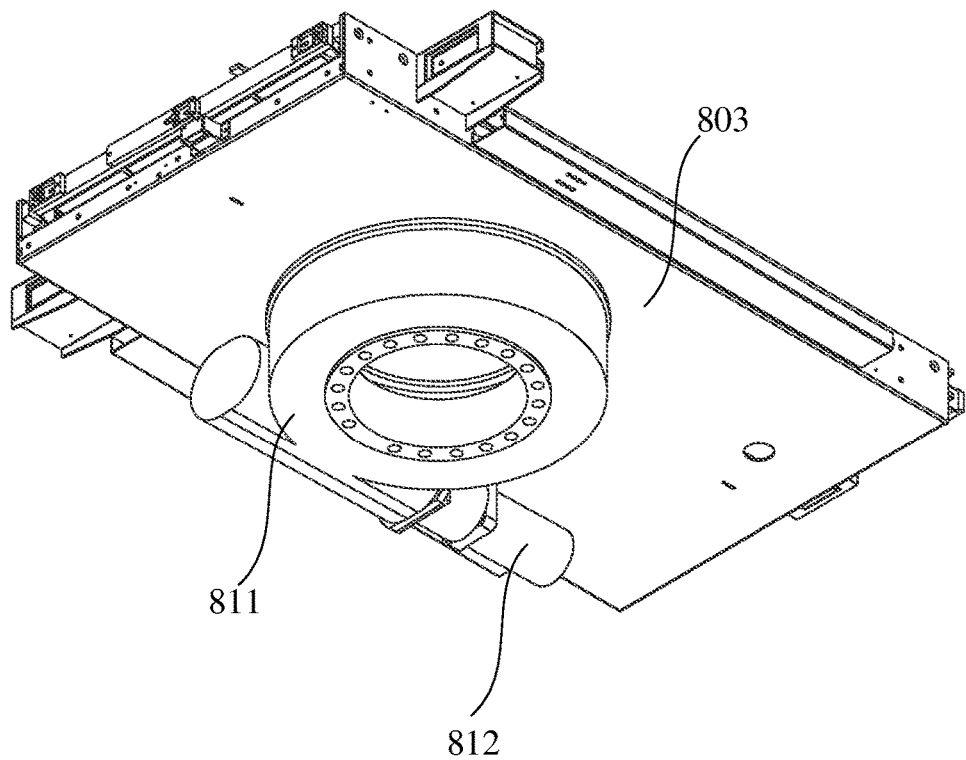
FIG. 35 is a partial front view of a battery swapping device according to Embodiment 17 of the present invention.

In an alternative implementation, referring to FIG. 35, the rotation unit 1144 comprises a turntable 811 sleeved at the bottom of the battery swapping actuating mechanism 803, and a rotation driver 812 connected to the turntable 811 and used for driving the turntable 811 to rotate the battery swapping actuating mechanism 803 according to the rotation angle amount.

When the electric vehicle is parked in the parking space for battery swap, if there is an angular deviation between the parking state of the electric vehicle and the accurate battery swapping position, it is difficult to align the unlocking target after the unlocking apparatus or the like is extended, or it is difficult to align the battery bracket after the battery swapping actuating mechanism is extended. The battery swapping device of this embodiment is capable of obtaining a parking state of the electric vehicle and an accurate angular deviation of the battery swapping position, for example, the angle θ shown in FIG. 29, by the visual positioning system, and the posture of the battery swapping device is adjusted with the angle θ as the rotation angle amount, so that the posture of the battery swapping device matches the parking state of the electric vehicle, so that the unlocking mechanism is aligned with the unlocking member on the battery bracket, thereby achieving an efficient and accurate battery swapping operation.

In this embodiment, the positioning of the unlocking mechanism is accomplished by adjusting the position adjustment mechanism in the horizontal direction, the vertical direction, or the angular direction according to at least one of the horizontal displacement amount, the vertical displacement amount, and the rotation angle amount by the position adjusting mechanism, so that the unlocking mechanism is precisely aligned with the unlocking member on the battery bracket.

In this embodiment, the control unit controls the horizontal movement unit to adjust the horizontal position of the unlocking mechanism according to the horizontal displacement amount, controls the vertical movement unit to adjust the vertical position of the unlocking mechanism according to the vertical displacement amount, and controls the rotation unit to adjust the angular position of the unlocking mechanism according to the rotation angle amount, so that the accurate positioning of the unlocking mechanism in the horizontal, vertical and angular directions can be completed, and the accuracy of positioning the unlocking mechanism can be further improved by adjusting the position in multiple dimensions.

In this embodiment, the movement of the unlocking mechanism in the horizontal direction can be automatically driven by the horizontal driver according to the horizontal displacement amount, and the efficiency and stability of the movement of the unlocking structure in the horizontal direction can be improved by the cooperation of the rail and the guide rail.

In this embodiment, the first vertical driver and the second vertical driver can automatically drive the first lifting mechanism and the second lifting mechanism to lift according to the first vertical displacement amount and the second vertical displacement amount, respectively to drive the two ends of the battery swapping actuating mechanism to lift, thereby further driving the two ends of the unlocking mechanism connected thereto to lift to adjust the position of the unlocking mechanism in the vertical direction, and further improving the stability of the unlocking mechanism when adjusting the position in the vertical direction.

In this embodiment, the rotation driver can automatically drive the turntable to rotate according to the rotation angle amount to drive the battery swapping actuating mechanism to rotate, thereby further driving the unlocking mechanism connected thereto to rotate to adjust the position of the unlocking mechanism in the angle, and further improving the stability of the unlocking mechanism when adjusting the angle.

Embodiment 18

Figure 36:
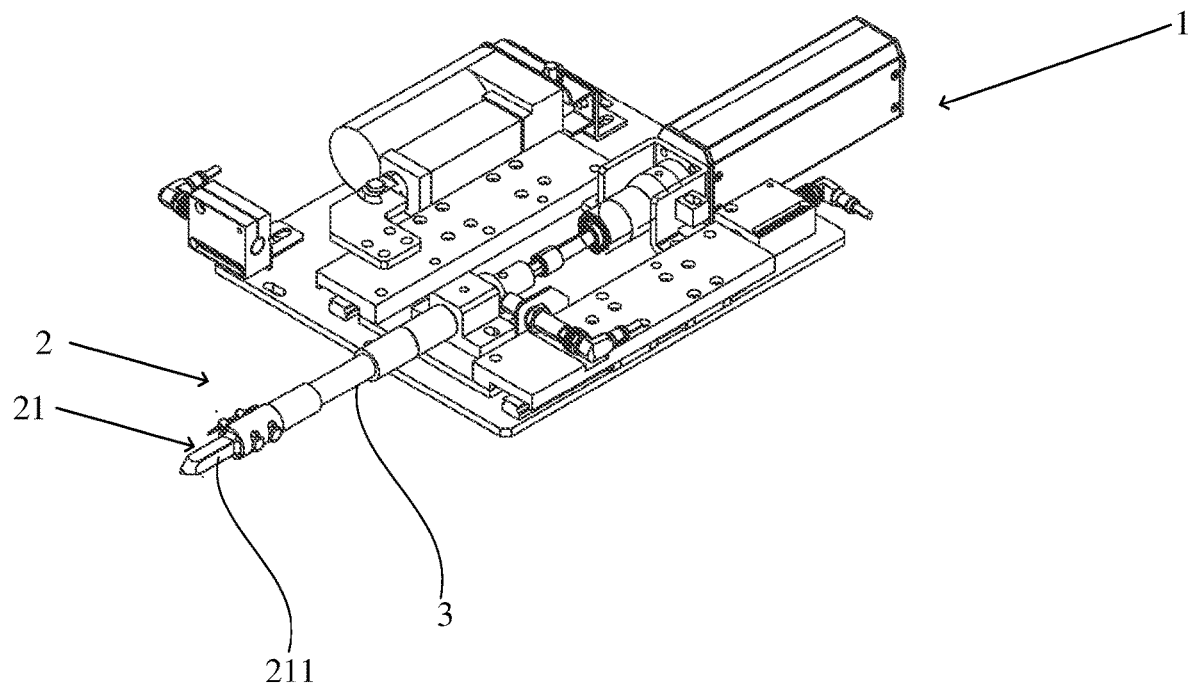
FIG. 36 is a schematic diagram of the structure of the unlocking mechanism according to Embodiment 18 of the present invention.

On the basis of any of Embodiments 14-17, this embodiment provides a battery swapping device, in particular an unlocking system for a battery swapping device. FIG. 36 shows a detailed structural diagram of the unlocking mechanism 10, comprising a drive mechanism 1 and an unlocking rod 2, wherein the unlocking rod 2 is used for driving the locking member on the battery bracket to rotate to unlock the battery pack, and the drive mechanism 1 drives the unlocking rod 2 to rotate to drive the locking member to rotate.

The drive mechanism 1 is mounted and connected to the protruding mechanism of the battery tray 100, and the unlocking rod 2 and the unlocking mating member of the locking member are matched and connected to each other to realize the unlocking of the battery pack. An unlocking mating member is provided on the battery bracket, the unlocking rod 2 is matched and connected to the unlocking mating member, and the unlocking mating member is connected to the locking member on the battery bracket; the unlocking rod 2 is driven to rotate by the drive mechanism 1, and the rotation of the unlocking rod 2 will drive the unlocking mating member to also rotate together and drive the locking member to rotate, thereby achieving the unlocking or locking of the locking member. The drive mechanism 1 drives the unlocking rod 2 to rotate to drive the locking member to rotate, thereby unlocking the battery pack, and at the same time, improving the accuracy of unlocking and further improving the battery swapping efficiency; at the same time, even if the touch occurs, the unlocking of the locking member will not be caused, thus effectively avoiding the occurrence of mis-operation and greatly improving the safety and stability of the battery swapping device.

Wherein the unlocking mechanism 10 further comprises an elastic member 3, two ends of the elastic member 3 are respectively connected to the drive mechanism 1 and the unlocking rod 2, and the elastic member is adapted to the radial displacement of the unlocking rod 2. With the drive mechanism 1 immobilized, the unlocking mechanism 10 is made more stable during unlocking by the fact that the elastic member 3 can be displaced in the radial direction so that the unlocking rod 2 can be in place inserted into the unlocking mating member.

Wherein the unlocking rod 2 comprises an insertion end 21, an outer surface of the insertion end 21 has at least one abutting surface 211, an unlocking sleeve is provided on the battery bracket, the unlocking sleeve is connected to the unlocking member, the insertion end 21 is used to be inserted into the unlocking sleeve, and the abutting surface 211 matches an inner wall surface of the unlocking sleeve to drive the unlocking sleeve to rotate to achieve unlocking. When the unlocking rod 2 rotates, the abutting surface 211 mates with the inner wall surface of the unlocking mating member, so that the abutting surface 211 will exert a force on the unlocking mating member and drive the unlocking mating member to rotate, thereby driving the locking member to rotate to unlock the battery pack. By applying a force to the inner wall surface of the unlocking mating member by the abutting surface 211 to drive the unlocking mating member to rotate, the rotational stability is high. In this embodiment, the number of the abutting surfaces 211 is four, and the four abutting surfaces 211 enclose a square structure with each other, so that the rotational stability is higher. Of course, in other embodiments, the number of abutting surfaces 211 may not be limited, and the plurality of abutting surfaces 211 may be non-circular in shape to rotate the unlocking mating member.

In this embodiment, the unlocking of the battery pack is achieved by driving the unlocking rod to rotate via the drive mechanism to automatically drive the locking member to rotate, and at the same time, the accuracy of unlocking is improved and the battery swapping efficiency is further improved; at the same time, even if the touch occurs, the unlocking of the locking member will not be caused, thus effectively avoiding the occurrence of mis-operation and greatly improving the safety and stability of the battery swapping device.

In this embodiment, the stability of the unlocking mechanism during unlocking is further improved by the fact that the unlocking rod can be in place inserted into the unlocking mating member by means of the elastic member being displaceable in the radial direction.

In this embodiment, the unlocking mating member is driven to rotate by applying a force to the inner wall surface facing the unlocking mating member at an insertion end of the unlocking rod, thereby improving the rotational stability.

Embodiment 19

Figure 37:
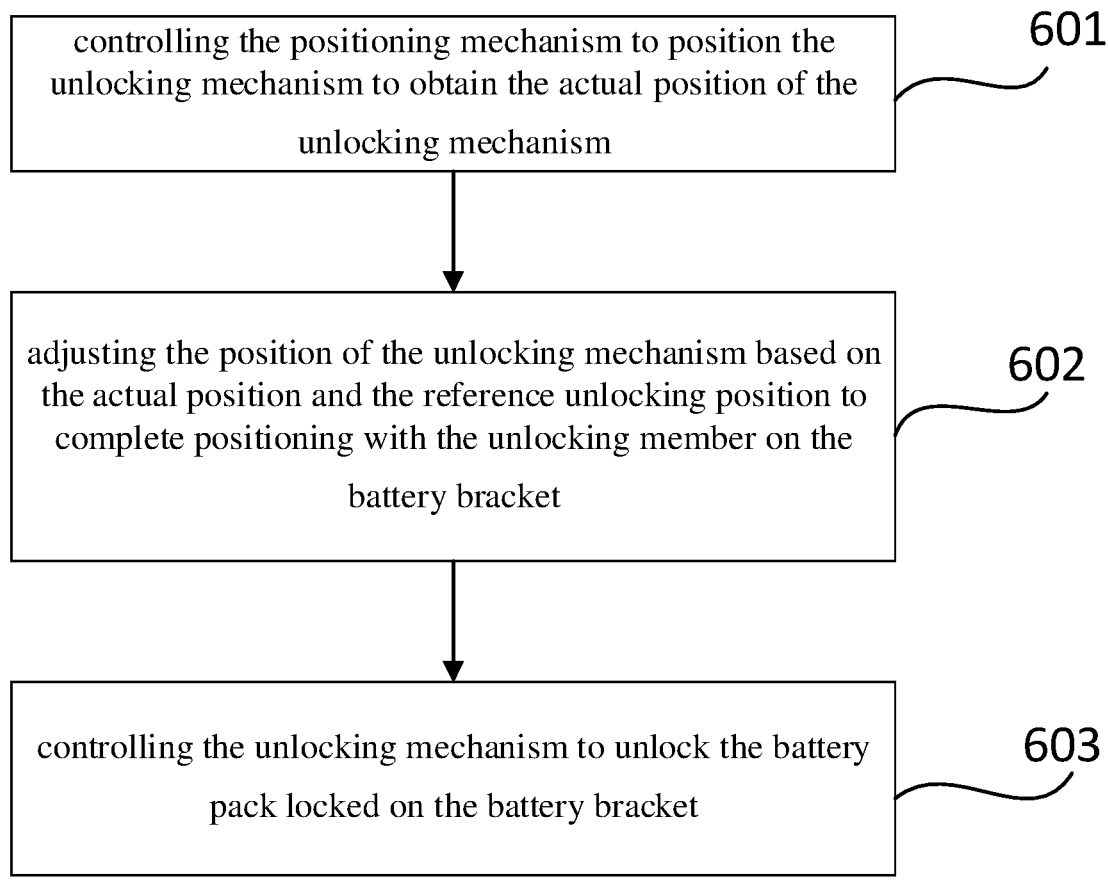
FIG. 37 is a flow diagram of an unlocking method of the battery swapping device according to Embodiment 19 of the present invention.

The present embodiment provides a battery swapping control method, in particular an unlocking method of a battery swapping device, as shown in FIG. 37, comprising:
  step 601, controlling the positioning mechanism to position the unlocking mechanism to obtain the actual position of the unlocking mechanism;
  step 602, adjusting the position of the unlocking mechanism based on the actual position and the reference unlocking position to complete positioning with the unlocking member on the battery bracket; and
  step 603, controlling the unlocking mechanism to unlock the battery pack locked on the battery bracket.

FIG. 26 is a partial structural schematic diagram showing a battery swapping device according to this embodiment, which is identical to any one of Embodiments 14 to 18, and will not be described again.

In this embodiment, when the positioning unlocking mechanism and the unlocking member on the battery bracket are controlled to complete positioning, the unlocking mechanism is controlled to unlock the battery pack on the battery bracket, so that the position information of the battery bracket can be accurately obtained, and the position of the unlocking mechanism is further accurately adjusted so that the unlocking mechanism is located at an accurate unlocking position, so that the unlocking mechanism can effectively unlock the battery pack of the electric vehicle, thereby ensuring the efficiency, success and safety of the battery swap.

Embodiment 20

Figure 38:
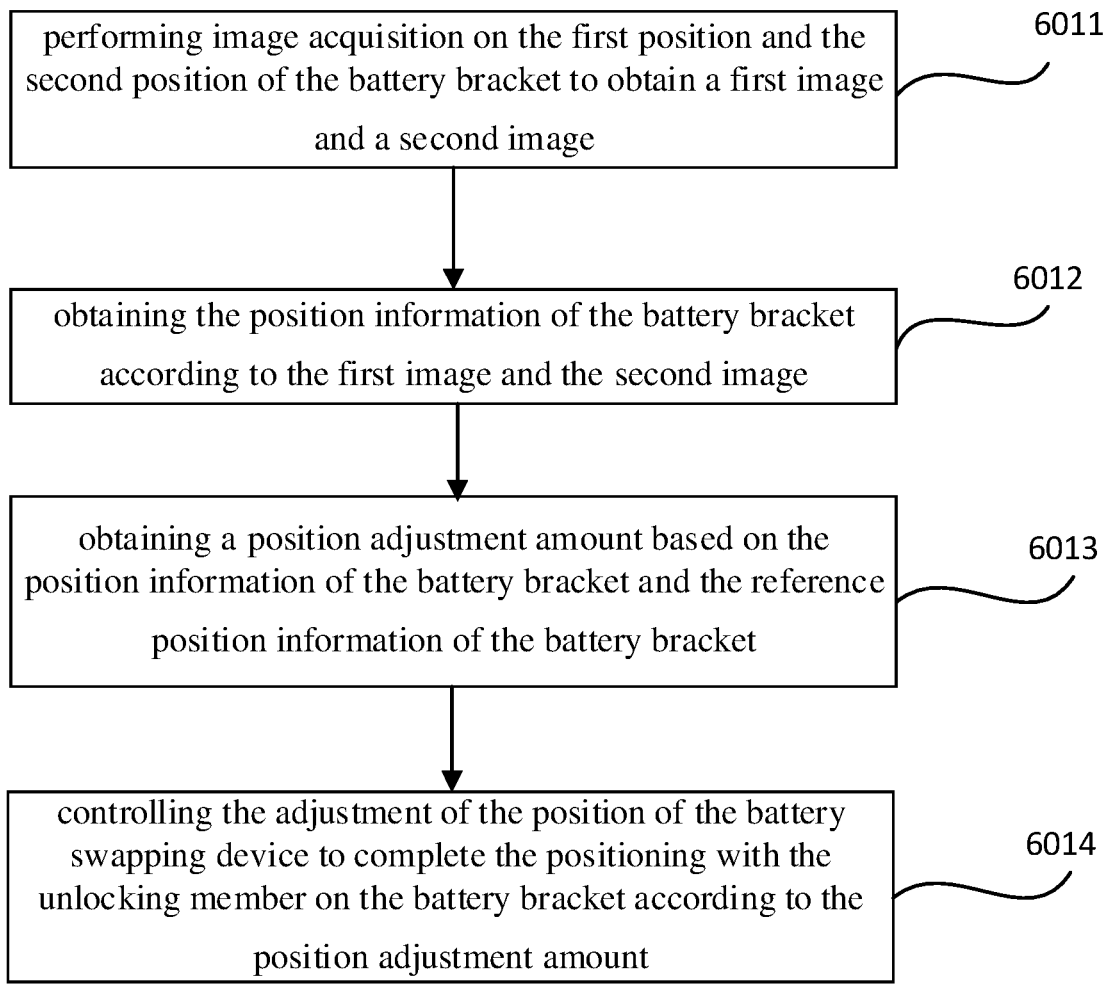
FIG. 38 is a flow diagram of an implementation of step 601 according to Embodiment 20 of the present invention.

On the basis of Embodiment 19, this embodiment provides a battery swapping control method, in particular a method for unlocking a battery swapping device. Specifically, as shown in FIG. 38, step 601 comprises:
  step 6011, performing image acquisition on the first position and the second position of the battery bracket to obtain a first image and a second image;
  step 6012, obtaining the position information of the battery bracket according to the first image and the second image;
  step 6013, obtaining a position adjustment amount based on the position information of the battery bracket and the reference position information of the battery bracket; and
  step 6014, controlling the adjustment of the position of the battery swapping device to complete the positioning with the unlocking member on the battery bracket according to the position adjustment amount.

Specifically, referring to FIG. 28, in step 6011, the first visual sensor 111 obtains a first image of the battery bracket in the direction indicated by the arrow, the first image including a first position A on the battery bracket, and the second visual sensor 112 obtains a second image of the battery bracket in the direction indicated by the arrow, the second image including a second position B on the battery bracket. In step 6012, image processing is performed according to the first image and the second image to obtain a position information of the battery bracket; in step 6013, the position information of the battery bracket and a reference position information of the battery bracket are processed to obtain a position adjustment amount; and in step 6014, the current position of the unlocking mechanism 10 is adjusted according to the obtained position adjustment amount, so that the unlocking mechanism and the unlocking member complete positioning.

The present embodiment compares the first position and the second position of the captured image of the battery bracket with the reference position corresponding to the battery bracket, so that the position adjustment amount of the unlocking mechanism can be obtained, and further adjusts the position of the unlocking mechanism according to the position adjustment amount, thereby improving the accuracy of positioning the unlocking mechanism before unlocking.

In this embodiment, after the first position and the second position of the image of the battery bracket are respectively captured, the first position and the second position are respectively compared with the reference position corresponding to the battery bracket, so that the position adjustment amount of the unlocking mechanism can be obtained, and the position of the unlocking mechanism is further adjusted according to the position adjustment amount, thereby further improving the accuracy of positioning the unlocking mechanism before unlocking.

Embodiment 21

On the basis of Embodiment 20, this embodiment provides a battery swapping control method, in particular a method for unlocking a battery swapping device. Specifically, before step 601, the method may further comprise the steps of: controlling the unlocking mechanism 10 to move to a coarse positioning position according to a preset value.

The moving slide moves in a horizontal direction, in a vertical direction, or in both horizontal and vertical directions, thereby controlling the unlocking mechanism 10 to move to a preset coarse positioning position. In specific implementations, the battery swapping device is provided in a battery swapping station. When the vehicle enters the battery swapping station to swap the battery, the vehicle is parked to the corresponding parking space. The preset coarse positioning position corresponds to a corresponding parking space. When the unlocking mechanism 10 is moved to the preset coarse positioning position, the positional relationship between the unlocking mechanism 10 and the battery bracket of the vehicle has reached the estimated range. Next, the positioning of the battery bracket according to the above-described visual positioning system enables the unlocking mechanism 10 and the unlocking member on the battery bracket to achieve accurate positioning.

Alternatively, in order to accurately position the unlocking mechanism 10 in the horizontal direction, step 6013 may specifically comprise: obtaining a horizontal displacement amount according to a first image and a first reference image corresponding to a first position or a second image and a second reference image corresponding to a second position.

Alternatively, in order to accurately position the unlocking mechanism 10 in the vertical direction, step 6013 may specifically comprise: respectively obtaining a first vertical displacement amount and a second vertical displacement amount according to the first image and the first reference image and the second image and the second reference image.

Alternatively, in order to accurately position the angle of the unlocking mechanism 10, step 6013 may specifically comprise: obtaining a rotation angle amount based on the depth of field value of the first position in the first image and the depth of field value of the second position in the second image.

As an alternative implementation, referring to FIGS. 28 and 29, in step 6013, the position of the corresponding pixel in the first reference image G1 at the first position A on the target apparatus in the first reference image G1 is obtained by analyzing the first reference image G1 as a reference for positioning, for convenience of explanation, referred to as "target position". By analyzing the first image G11, the position of the corresponding pixel in the first image G11 of the first position A on the target apparatus in the first image G11 is obtained, for convenience of explanation, referred to as "real-time position". According to the image processing algorithm, a first horizontal displacement amount and a first vertical displacement amount of the first visual sensor 111 are obtained according to the target position and the real-time position. By moving the first visual sensor 111 by the first horizontal displacement amount and the first vertical displacement amount, it is possible for the first visual sensor 111 to capture an image that is consistent with the first reference image G1.

Similarly, a second horizontal displacement amount and a second vertical displacement amount are obtained from the second image and the pre-stored second reference image. By moving the second visual sensor 112 by a second horizontal displacement amount and a second vertical displacement amount, it is possible for the second visual sensor 112 to capture an image that is consistent with the second reference image.

As an alternative implementation, referring to FIG. 31, when the first visual sensor 111 and the second visual sensor 112 are provided on the position adjustment mechanism 8, the first visual sensor 111 is provided at a position corresponding to the first position A, the second visual sensor 112 is provided at a position corresponding to the second position B, the first position A and the second position B have a first preset space D3 therebetween, and the first visual sensor 111 and the second visual sensor 112 have a second preset distance L therebetween. In step 6013, image processing is performed on the first image to obtain a first depth of field and a first depth of field value D1 of a first position A in the first image; image processing is performed on the second image to obtain a second depth of field and a second depth of field value; and a depth of field value D2 of a second position B in the second image. The specific method for obtaining the depth of field value by the position obtaining module 113 can be realized by using an algorithm disclosed in the art, which can be realized by a person skilled in the art and will not be described in detail herein. The position obtaining module 113 obtains the difference D=|D2-D1| of the two depth of field values. According to the difference D of the depth of field values, a distance L between the first visual sensor 111 and the second visual sensor 112 and the distance D3 between the first position A and the second position B, the position obtaining module 113 can obtain a rotation angle amount θ according to the trigonometric function principle. The position adjustment mechanism 8 is rotated in the corresponding direction by the rotation angle amount θ so that the battery bracket 7 and the position adjustment mechanism 8 are parallel to each other.

In this embodiment, the horizontal displacement amount of the unlocking mechanism can be obtained by processing the first image and the first reference image or by processing the second image and the second reference image, thereby improving the accuracy of positioning the unlocking mechanism in the horizontal direction.

In this embodiment, the vertical displacement amount of the unlocking mechanism can be obtained by processing the obtained first image and second image, thereby improving the accuracy of positioning the unlocking mechanism in the vertical direction.

In this embodiment, a first vertical displacement amount of the unlocking structure can be obtained by processing the first image and the first reference image, and a second vertical displacement amount of the unlocking mechanism can be obtained by processing the second image and the second reference image, thereby improving the accuracy of positioning the unlocking mechanism in the vertical direction.

In this embodiment, the rotation angle amount of the unlocking mechanism can be obtained by processing the first and second depth of and the second depth of field value, thereby improving the accuracy of the angular positioning of the unlocking mechanism and further facilitating the alignment of the unlocking mechanism with the unlocking member on the battery bracket.

Embodiment 22

On the basis of Embodiment 21, this embodiment provides a battery swapping control method, in particular a method for unlocking a battery swapping device. Specifically, referring to FIGS. 33 and 34, in step 6014, the horizontal driver drives the top rail guide wheel 703 to move along the top rail 701 in the X-axis direction (i.e. the horizontal direction) and drives the ground rail guide wheel 704 to move along the ground rail 702 according to the horizontal displacement amount, the horizontal movement of the unlocking mechanism 10.

Referring to FIGS. 33 and 34, in step 6014, the first chain 706 drives the first sprocket 611 to move in the vertical direction (i.e., the Z-axis direction) according to a first vertical displacement amount under the drive of the first vertical driver 61, and the second chain 621 drives the second sprocket 622 to move in the vertical direction according to a second vertical displacement amount under the drive of the second vertical driver 62 to drive the battery swapping actuating mechanism 803 to move in the vertical direction.

In step 6013, a rotation angle amount is obtained according to the depth of field value of the first position in the first image and the depth of field value of the second position in the second image. Referring to FIG. 33, in step 6014, the rotation driver 812 drives the turntable 811 to rotate the battery swapping actuating mechanism 803 according to the rotation angle amount.

In this embodiment, the positioning of the unlocking mechanism in the horizontal direction, the vertical direction or the angular direction is adjusted according to at least one of the horizontal displacement amount, the vertical displacement amount and the rotation angle amount, so that the accurate positioning of the unlocking mechanism in the horizontal direction, the vertical direction and the angular direction can be achieved, and the accuracy of the positioning of the unlocking mechanism is further improved by adjusting the position in multiple dimensions, so that the unlocking mechanism is accurately aligned with the unlocking member on the battery bracket.

Embodiment 23

Figure 39:
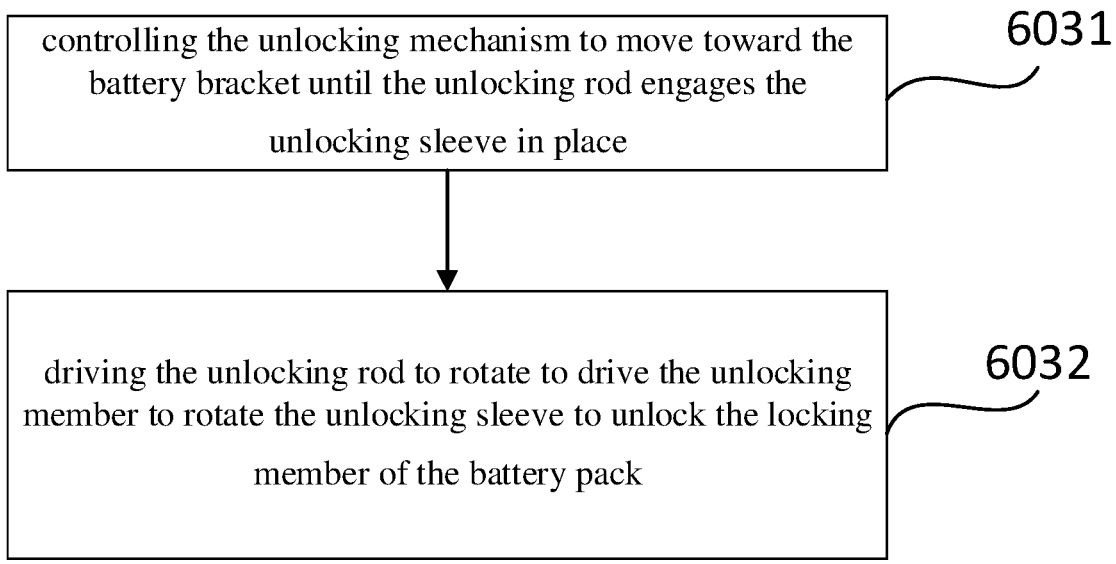
FIG. 39 is a schematic diagram of the implementation of step 603 of Embodiment 23 of the present invention.

On the basis of any of the embodiments 19-22, this embodiment provides a battery swapping control method, in particular a method for unlocking a battery swapping device. As shown in FIG. 39, step 603 specifically comprises:

6031, controlling the unlocking mechanism 10 to move toward the battery bracket until the unlocking rod engages the unlocking sleeve in place; and 6032, driving the unlocking rod to rotate to drive the unlocking member to rotate the unlocking sleeve to unlock the locking member of the battery pack.

FIG. 36 shows a detailed structural diagram of the unlocking mechanism 10, comprising a drive mechanism 1 and an unlocking rod 2, wherein the drive mechanism 1 drives the unlocking rod 2 to rotate to rotate the locking member to unlock the locking member of the battery pack to further unlock the battery pack.

The drive mechanism 1 is mounted and connected to the protruding mechanism of the battery tray 100, and the unlocking rod 2 and the unlocking mating member of the locking member are matched and connected to each other to realize the unlocking of the battery pack. An unlocking mating member is provided on the battery bracket, the unlocking rod 2 is matched and connected to the unlocking mating member, and the unlocking mating member is connected to the locking member on the battery bracket; the unlocking rod 2 is driven to rotate by the drive mechanism 1, and the rotation of the unlocking rod 2 will drive the unlocking mating member to also rotate together and drive the locking member to rotate, thereby achieving the unlocking or locking of the locking member. The drive mechanism 1 drives the unlocking rod 2 to rotate to drive the locking member to rotate, thereby unlocking the battery pack, and at the same time, improving the accuracy of unlocking and further improving the battery swapping efficiency; at the same time, even if the touch occurs, the unlocking of the locking member will not be caused, thus effectively avoiding the occurrence of mis-operation and greatly improving the safety and stability of the battery swapping device.

Wherein the unlocking mechanism 10 further comprises an elastic member 3, two ends of the elastic member 3 are respectively connected to the drive mechanism 1 and the unlocking rod 2, and the elastic member is adapted to the radial displacement of the unlocking rod 2. With the drive mechanism 1 immobilized, the unlocking mechanism 10 is made more stable during unlocking by the fact that the elastic member 3 can be displaced in the radial direction so that the unlocking rod 2 can be in place inserted into the unlocking mating member.

Wherein the unlocking rod 2 comprises an insertion end 21, an outer surface of the insertion end 21 has at least one abutting surface 211, an unlocking sleeve is provided on the battery bracket, the unlocking sleeve is connected to the unlocking member, the insertion end 21 is used to be inserted into the unlocking sleeve, and the abutting surface 211 matches an inner wall surface of the unlocking sleeve to drive the unlocking sleeve to rotate to achieve unlocking. When the unlocking rod 2 rotates, the abutting surface 211 mates with the inner wall surface of the unlocking mating member, so that the abutting surface 211 will exert a force on the unlocking mating member and drive the unlocking mating member to rotate, thereby driving the locking member to rotate to unlock the battery pack. By applying a force to the inner wall surface of the unlocking mating member by the abutting surface 211 to drive the unlocking mating member to rotate, the rotational stability is high. In this embodiment, the number of the abutting surfaces 211 is four, and the four abutting surfaces 211 enclose a square structure with each other, so that the rotational stability is higher. Of course, in other embodiments, the number of abutting surfaces 211 may not be limited, and the plurality of abutting surfaces 211 may be non-circular in shape to rotate the unlocking mating member.

In this embodiment, by controlling the unlocking mechanism to move towards the battery bracket until the unlocking rod and the unlocking sleeve engage in place, the stability of subsequent rotation is improved, and by driving the unlocking rod to rotate and automatically driving the unlocking member to rotate the unlocking sleeve, the locking member of the battery pack can be unlocked, thereby unlocking the battery pack. Meanwhile, the accuracy of unlocking is improved, and the battery swapping efficiency is further improved; at the same time, even if the touch occurs, the unlocking of the locking member will not be caused, thus effectively avoiding the occurrence of mis-operation and greatly improving the efficiency and safety and stability of the battery swapping device.

While particular embodiments of the present invention have been described, it will be understood by a person skilled in the art that these are merely illustrative and that various changes and modifications may be made without departing from the principles and spirit of the invention. Accordingly, the protection sought herein is as set forth in the claims below.

What is claimed is:

1. A visual positioning system, is applied to a battery swapping device, wherein the visual positioning system comprising a first visual sensor, a second visual sensor and a position obtaining unit, and a position adjustment mechanism comprising a vertical movement unit;
   the first visual sensor is used for obtaining a first image of a first position of a target apparatus;
   the second visual sensor is used for obtaining a second image of a second position of the target apparatus;
   the position obtaining unit is used for obtaining a position information of the target apparatus according to the first image and the second image, and further obtains a position adjustment amount based on the position information and a reference position information of the target apparatus,
   the position adjustment amount comprises a first vertical displacement amount and a second vertical displacement amount; and
   the position adjustment mechanism configured to use the first vertical displacement amount and the second vertical displacement amount to independently adjust two ends of the battery swapping device until the battery swapping device is aligned with the target apparatus,
   wherein the target apparatus comprises a battery bracket.

2. The visual positioning system according to claim 1, wherein the position adjustment amount comprises a horizontal displacement amount;
   the position obtaining unit obtains the horizontal displacement amount according to the first image and a first reference image, or the position obtaining unit obtains the horizontal displacement amount according to the second image and a second reference image; and the first reference image is a reference image comprising the first position and the second reference image is a reference image comprising the second position.

3. The visual positioning system according to claim 1, wherein the position obtaining unit obtains the first vertical displacement amount according to the first image and a first reference image, and the position obtaining unit obtains the second vertical displacement amount according to the second image and a second reference image; and the first reference image is a reference image comprising the first position and the second reference image is a reference image comprising the second position.

4. The visual positioning system according to claim 1, wherein the position adjustment amount comprises a rotation angle amount;
   the position obtaining unit obtains the rotation angle amount according to a first depth of field value and a second depth of field value; the first depth of field value a depth of field value of the first position in the first image, and the second depth of field value a depth of field value of the second position in the second image.

5. The visual positioning system according to claim 1, wherein the first position and the second position have a preset space therebetween, the first visual sensor is provided at a position corresponding to the first position, and the second visual sensor is provided at a position corresponding to the second position.

6. The visual positioning system according to claim 1, wherein the position adjustment amount further comprises a horizontal displacement amount;
   the position obtaining unit obtains the horizontal displacement amount according to the first image and a first reference image, or the position obtaining unit obtains the horizontal displacement amount according to the second image and a second reference image; and the first reference image is a reference image comprising the first position and the second reference image is a reference image comprising the second position; and
   the position adjustment amount further comprises a rotation angle amount;
   the position obtaining unit obtains the rotation angle amount according to a first depth of field value and a second depth of field value; the first depth of field value a depth of field value of the first position in the first image, and the second depth of field value a depth of field value of the second position in the second image.

7. The visual positioning system according to claim 1, wherein further comprising at least two distance sensors;
   the at least two distance sensors are respectively used for acquiring a distance between a battery swapping device and the target apparatus and at least obtaining a first distance and a second distance;
   the position adjustment amount comprises a rotation angle amount, and the position obtaining unit is further used for obtaining the rotation angle amount according to at least the first distance and the second distance;
   the target apparatus is a battery swapping vehicle; and
   the position obtaining unit is an image processing module.

8. A battery swapping device, wherein the battery swapping device is the same as the battery swapping device in claim 1, comprising the visual positioning system according to claim 1 for positioning to align the battery swapping device with the battery bracket on which the battery pack is locked.

9. The battery swapping device according to claim 8, wherein the battery swapping device is configured to move from a side of the electric vehicle and along the length direction of the body of the electric vehicle, and to remove and install the battery from the side of the electric vehicle after the positioning is completed.

10. The battery swapping device according to claim 8, wherein further comprising an unlocking mechanism for unlocking the battery pack locked on the battery bracket.

11. The battery swapping device according to claim 10, wherein the position adjustment mechanism is used for adjusting a position of the unlocking mechanism according to at least one of a horizontal displacement amount, a vertical displacement amount and a rotation angle amount obtained by the visual positioning system until the unlocking mechanism completes positioning with an unlocking member on the battery bracket.

12. The battery swapping device according to claim 11, wherein the position adjustment mechanism comprises a control unit, a horizontal movement unit, and a rotation unit, the control unit is communicatively connected to the visual positioning system to correspondingly control the horizontal movement unit, the vertical movement unit, or the rotation unit to move to an adjustment position according to at least one of the horizontal displacement amount, the vertical displacement amount, and the rotation angle amount.

13. The battery swapping device according to claim 12, wherein the vertical displacement amount comprises a first vertical displacement amount and a second vertical displacement amount;

the vertical movement unit comprises a first lifting mechanism and a second lifting mechanism; and the first lifting mechanism is used for lifting according to the first vertical displacement amount, and the second lifting mechanism is used for lifting according to the second vertical displacement amount.

14. The battery swapping device according to claim 12, wherein the vertical displacement amount comprises a first vertical displacement amount and a second vertical displacement amount;

the vertical movement unit comprises a first vertical driver, a second vertical driver, a first lifting mechanism, a second lifting mechanism and a battery swapping actuating mechanism, the first vertical driver is connected to the first lifting mechanism, the second vertical driver is connected to the second lifting mechanism, the first lifting mechanism and the second lifting mechanism are respectively connected to two ends of the battery swapping actuating mechanism to drive the two ends of the battery swapping actuating mechanism to lift and move; and the first vertical driver is used for driving the first lifting mechanism according to the first vertical displacement amount, and the second vertical driver is used for driving the second lifting mechanism according to the second vertical displacement amount.

15. The battery swapping device according to claim 14, wherein the rotation unit comprises a turntable and a rotation driver, the turntable is sleeved at the bottom of the battery swapping actuating mechanism, the rotation driver is connected to the turntable and used for driving the turntable to rotate the battery swapping actuating mechanism according to the rotation angle amount.

16. The battery swapping device according to claim 12, wherein the horizontal movement unit comprises a rail, a guide wheel, and a horizontal driver for driving the guide wheel to move along the rail according to the horizontal displacement amount.

17. The battery swapping device according to claim 11, wherein further comprising an adjustment control module for controlling the position adjustment mechanism to adjust the position of the unlocking mechanism according to the position adjustment amount until the unlocking mechanism completes positioning with an unlocking member on the battery bracket.

18. The battery swapping device according to claim 10, wherein the unlocking mechanism comprises: a drive mechanism and an unlocking rod, and the unlocking rod is used for driving the unlocking member on the battery bracket to rotate to unlock the battery pack; and the drive mechanism is used for driving the unlocking rod to rotate to drive the unlocking member to rotate.

19. The battery swapping device according to claim 18, wherein the unlocking mechanism further comprises an elastic member, both ends of the elastic member are respectively connected to the drive mechanism and the unlocking rod, and the elastic member is adapted to a radial displacement of the unlocking rod, and the drive mechanism drives the unlocking rod to rotate along the axis of the unlocking rod through the elastic member.

20. The battery swapping device according to claim 18, wherein the unlocking rod comprises an insertion end, an outer surface of the insertion end has at least one abutting surface, the battery bracket is provided with an unlocking sleeve, the unlocking sleeve is connected to the unlocking member, the insertion end is used for inserting into the unlocking sleeve, and the abutting surface matches an inner wall surface of the unlocking sleeve to drive the unlocking sleeve to rotate to achieve unlocking.

21. A battery swapping control method, wherein the battery swapping control method comprises the steps of:

obtaining a position information of a battery bracket;

obtaining a position adjustment amount according to the position information and a corresponding reference position information; and adjusting the position of an unlocking mechanism according to the position adjustment amount to align the unlocking mechanism with an unlocking member on the battery bracket; wherein, the step of obtaining a position information of a battery bracket comprises:

obtaining a first image of a first position of the battery bracket;

obtaining a second image of a second position of the battery bracket; and obtaining the position information of the battery bracket according to the first image and the second image, the step of obtaining a position adjustment amount according to the position information and a corresponding reference position information comprises:

respectively obtaining a first vertical displacement amount and a second vertical displacement amount according to the first image and the first reference image and the second image and the second reference image, wherein the adjusting the position of the unlocking mechanisms further comprises using the first vertical displacement amount and the second vertical displacement amount to adjust a position of the unlocking mechanism from both ends of the battery swapping device to align the unlocking mechanism with the unlocking member.

22. The battery swapping control method according to claim 21, wherein the step of obtaining a position adjustment amount according to the position information and a corresponding reference position information further comprises:

obtaining a horizontal displacement amount according to the first image and a first reference image corresponding to the first position or a second image and a second reference image corresponding to the second position; or obtaining a rotation angle amount according to a depth of field value of the first position in the first image and a depth of field value of the second position in the second image.

23. The battery swapping control method according to claim 22, wherein the step of adjusting the position of the unlocking mechanism according to the position adjustment amount to align the unlocking mechanism with an unlocking member on the battery bracket comprises:

adjusting the position of the unlocking mechanism according to the horizontal displacement amount or the first vertical displacement amount or the second vertical displacement amount or the rotation angle amount until the unlocking mechanism and the unlocking member on the battery bracket complete the positioning.

24. The battery swapping control method according to claim 21, wherein before the step of obtaining a position information of a battery bracket, the method further comprises the following steps:

controlling the unlocking mechanism to move to a coarse positioning position according to a preset value.

25. The battery swapping control method according to claim 21, wherein after the step of adjusting the position of the unlocking mechanism according to the position adjustment amount to align the unlocking mechanism with an unlocking member on the battery bracket, the method further comprises:

stretching out of the unlocking mechanism until engaging the unlocking member in place and unlocking.

26. The battery swapping control method according to claim 25, wherein the stretching out of the unlocking mechanism until engaging the unlocking member in place and unlocking comprises:

stretching out of the unlocking mechanism from a side of the battery swapping vehicle toward the battery swapping vehicle until engaging the unlocking member in place and unlocking.

27. The battery swapping control method according to claim 25, wherein the stretching out of the unlocking mechanism until engaging the unlocking member in place and unlocking comprises:

controlling the unlocking mechanism to move toward the battery bracket until an unlocking rod engages the unlocking sleeve in place; and driving the unlocking rod to rotate to drive the unlocking member unlocking sleeve to rotate to unlock a locking member of a battery pack.

* * * * *